US011806947B2

(12) United States Patent
Suriyaarachchi et al.

(10) Patent No.: US 11,806,947 B2
(45) Date of Patent: Nov. 7, 2023

(54) FORMING SYSTEM AND METHOD FOR FORMING A CONTOURED COMPOSITE STRUCTURE

(71) Applicant: The Boeing Company, Chicago, IL (US)

(72) Inventors: Raviendra S. Suriyaarachchi, Kirkland, WA (US); Darrell Darwin Jones, Mill Creek, WA (US); Antonio Martinez, Murcia (ES); Valentín Forte, Murcia (ES)

(73) Assignee: The Boeing Company, Arlington, VA (US)

( * ) Notice: Subject to any disclaimer, the term of this patent is extended or adjusted under 35 U.S.C. 154(b) by 26 days.

(21) Appl. No.: 17/583,165

(22) Filed: Jan. 24, 2022

(65) Prior Publication Data
US 2022/0242064 A1    Aug. 4, 2022

(30) Foreign Application Priority Data

Jan. 29, 2021   (EP) ..................................... 21382074

(51) Int. Cl.
*B29C 70/38*       (2006.01)
*B29C 70/44*       (2006.01)
(Continued)

(52) U.S. Cl.
CPC ............ *B29C 70/38* (2013.01); *B29C 70/446* (2013.01); *B29C 70/541* (2013.01); *B29D 99/0003* (2013.01); *B29L 2031/3076* (2013.01)

(58) Field of Classification Search
None
See application file for complete search history.

(56) References Cited

U.S. PATENT DOCUMENTS 6,625,866 B2    9/2003  Stone et al.
7,527,759 B2    5/2009  Lee et al.
(Continued)

FOREIGN PATENT DOCUMENTS

EP    2014448 A2    1/2009
EP    3162544 A1    5/2017
(Continued)

OTHER PUBLICATIONS

European Patent Office Extended European Search Report, dated Jul. 9, 2021, regarding EP Application No. 21382074.9, 10 pages.
(Continued)

*Primary Examiner* — Barbara J Musser

(57) ABSTRACT

There is provided a forming system for forming a contoured composite structure having a complex curved configuration. The forming system includes a receiving station having a receiving assembly to receive a composite charge to be formed. The forming system includes a forming station having a forming assembly. The forming assembly includes a gantry assembly, an upper die assembly movably coupled to the gantry assembly, a lower die assembly coupled to a floor support beam positioned between the gantry assembly, and one or more pick-and-place devices movably coupled to the gantry assembly. The upper die assembly is separate from, and independently movable with respect to, the lower die assembly. The pick-and-place device(s) are designed to move the composite charge, and the contoured composite structure. The forming system includes a tray station having a tray assembly designed to receive the contoured composite structure from the forming station.

20 Claims, 37 Drawing Sheets

(51) Int. Cl.
B29C 70/54 (2006.01)
B29D 99/00 (2010.01)
B29L 31/30 (2006.01)

(56) References Cited

U.S. PATENT DOCUMENTS

| | | | |
|---|---|---|---|
| 7,655,168 B2 | 2/2010 | Jones et al. | |
| 7,708,546 B2 | 5/2010 | Lee et al. | |
| 8,465,613 B2 | 6/2013 | Rotter et al. | |
| 8,557,165 B2* | 10/2013 | Jones | B29C 33/308 |
| | | | 264/320 |
| 8,601,694 B2 | 12/2013 | Brennan et al. | |
| 8,997,642 B2 | 4/2015 | Stewart et al. | |
| 9,162,380 B2 | 10/2015 | Jones et al. | |
| 9,561,602 B2 | 2/2017 | Jones et al. | |
| 10,399,284 B2 | 9/2019 | Prause et al. | |
| 10,532,828 B2 | 1/2020 | Halbritter et al. | |
| 11,059,235 B2 | 7/2021 | Kendall et al. | |
| 2004/0093731 A1 | 5/2004 | Sarh | |
| 2006/0231981 A1 | 10/2006 | Lee et al. | |
| 2009/0000726 A1* | 1/2009 | McCowin | B29C 70/44 |
| | | | 156/212 |
| 2010/0102482 A1 | 4/2010 | Jones et al. | |
| 2013/0340928 A1 | 12/2013 | Rotter et al. | |
| 2014/0203477 A1 | 7/2014 | Chapman et al. | |
| 2014/0314996 A1 | 10/2014 | Stewart | |
| 2016/0339682 A1 | 11/2016 | Bahe et al. | |
| 2017/0057100 A1 | 3/2017 | Shaw et al. | |
| 2019/0291306 A1 | 9/2019 | Hannan et al. | |
| 2020/0101677 A1 | 4/2020 | Kendall et al. | |
| 2020/0180239 A1 | 6/2020 | Prause et al. | |
| 2020/0231267 A1 | 7/2020 | Rotter et al. | |
| 2020/0398503 A1 | 12/2020 | Kendall et al. | |
| 2021/0179292 A1 | 6/2021 | Ahn et al. | |
| 2021/0260795 A1 | 8/2021 | Plummer et al. | |
| 2021/0260840 A1 | 8/2021 | Knutson et al. | |
| 2021/0276285 A1 | 9/2021 | Heath et al. | |

FOREIGN PATENT DOCUMENTS

| | | |
|---|---|---|
| EP | 3677397 A1 | 7/2020 |
| EP | 3683029 A2 | 7/2020 |
| EP | 3693155 A1 | 8/2020 |

OTHER PUBLICATIONS

European Patent Office Extended European Search Report, dated Dec. 1, 2021, regarding EP Application No. 21180643.5, 8 pages.
European Patent Office Extended European Search Report, dated Dec. 17, 2021, regarding EP Application No. 21183660.6, 8 pages.

* cited by examiner

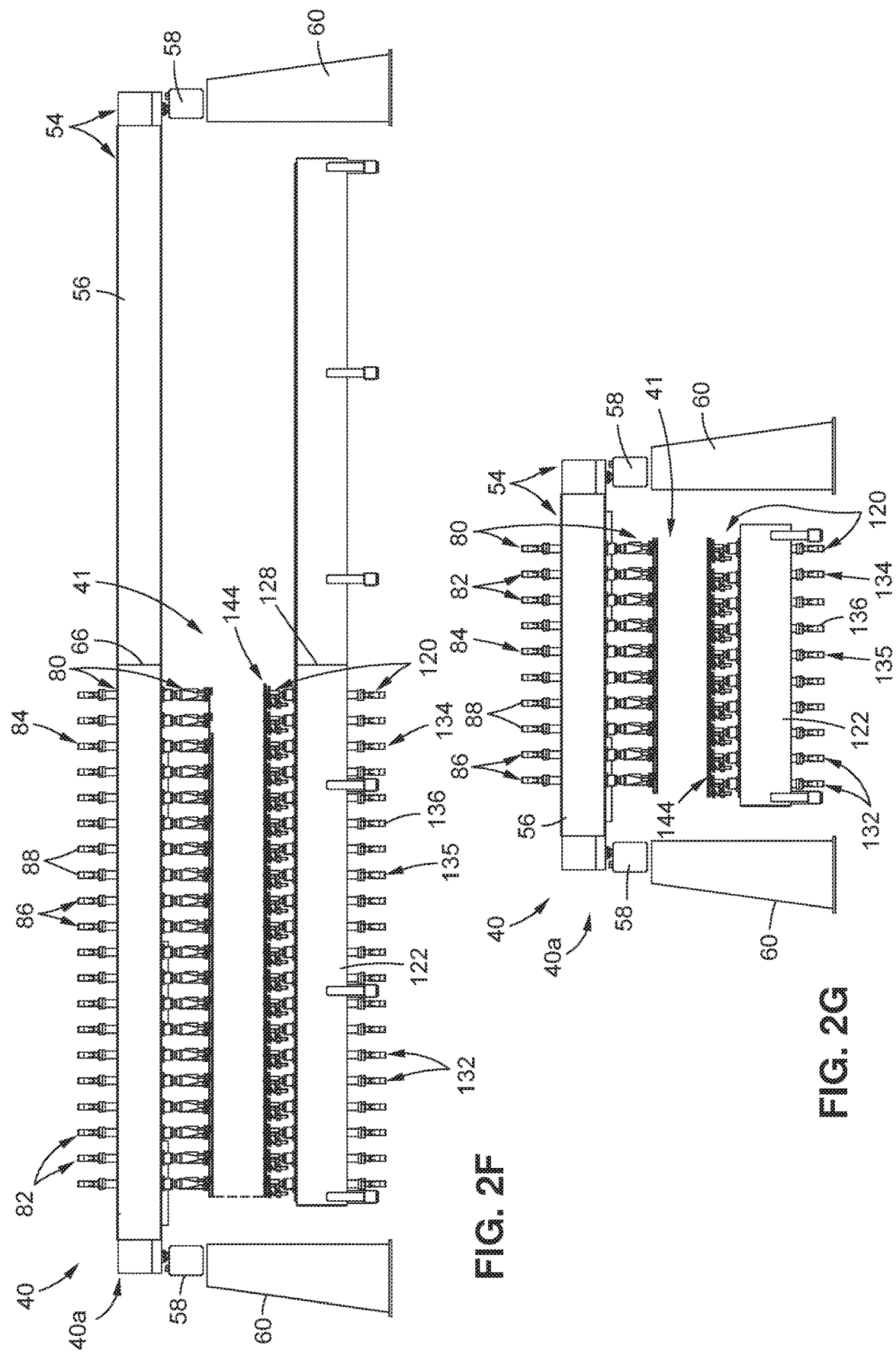

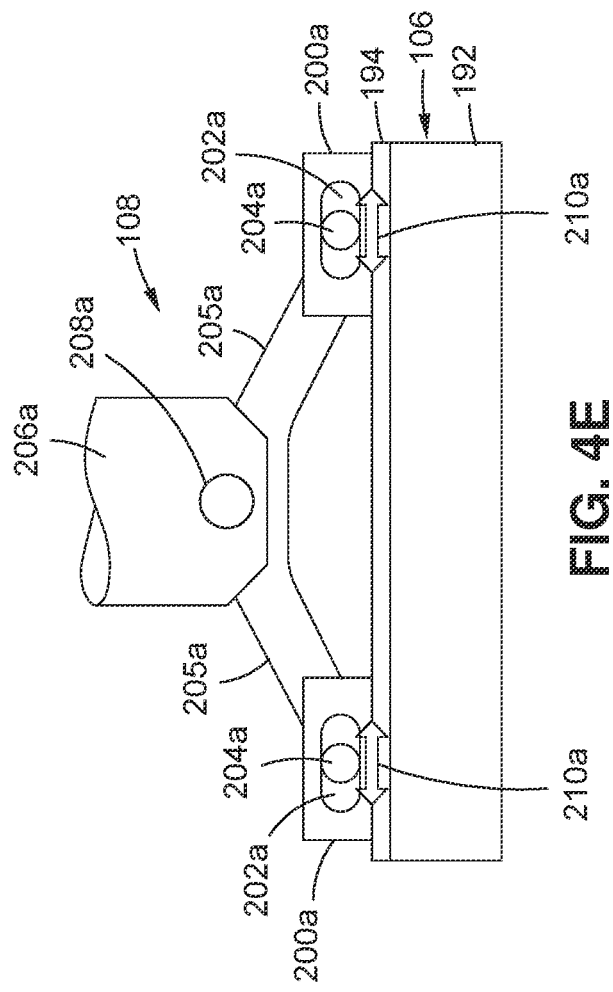
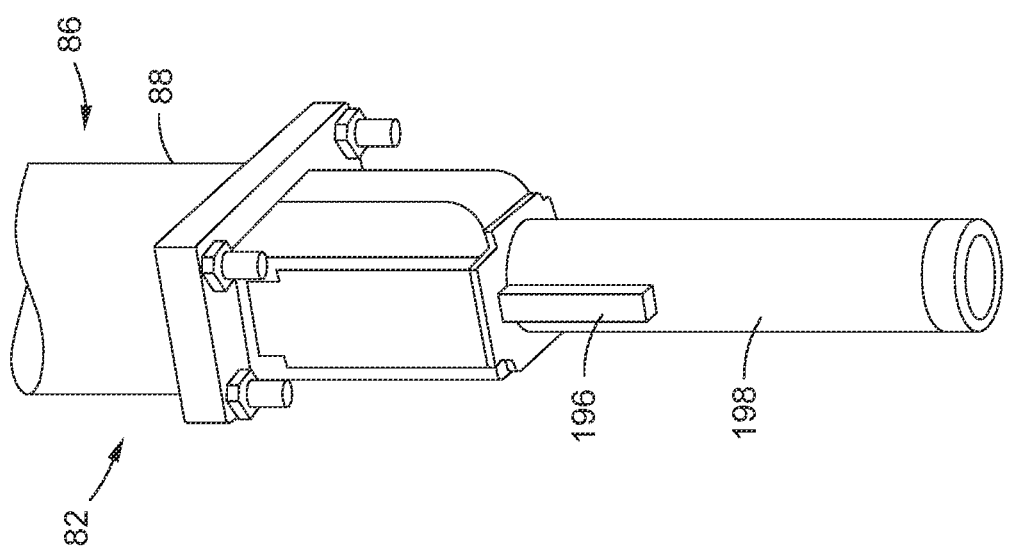

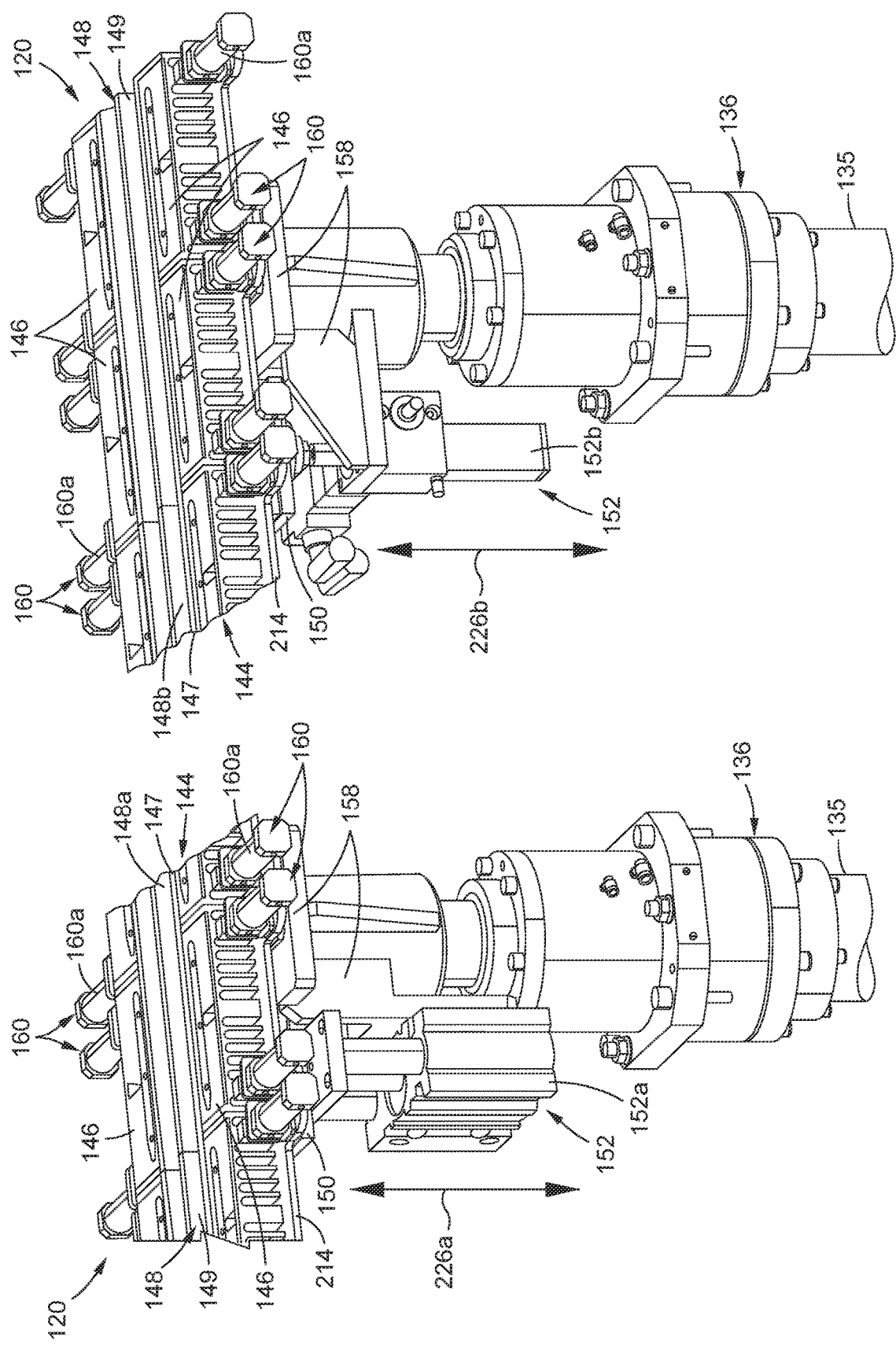

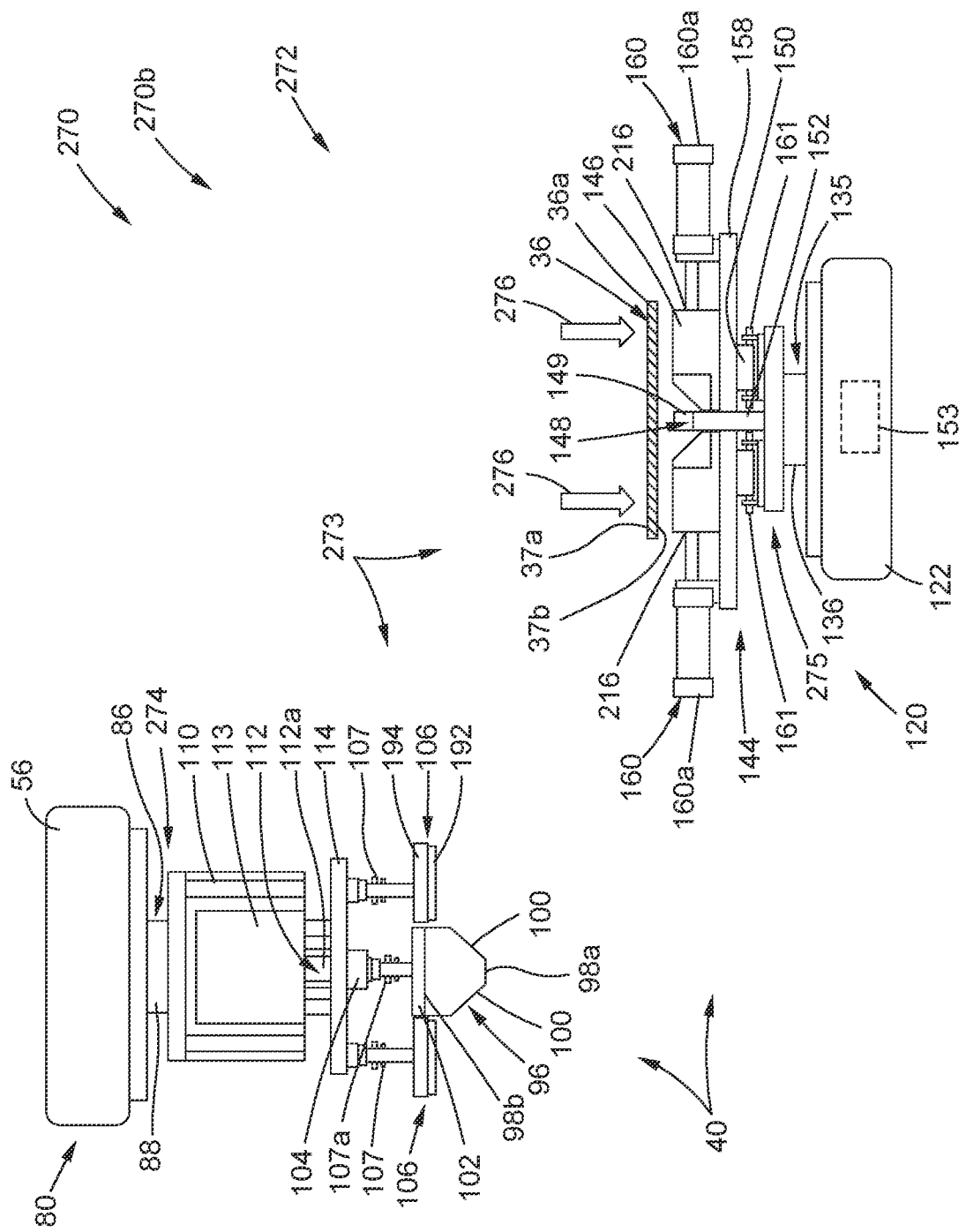

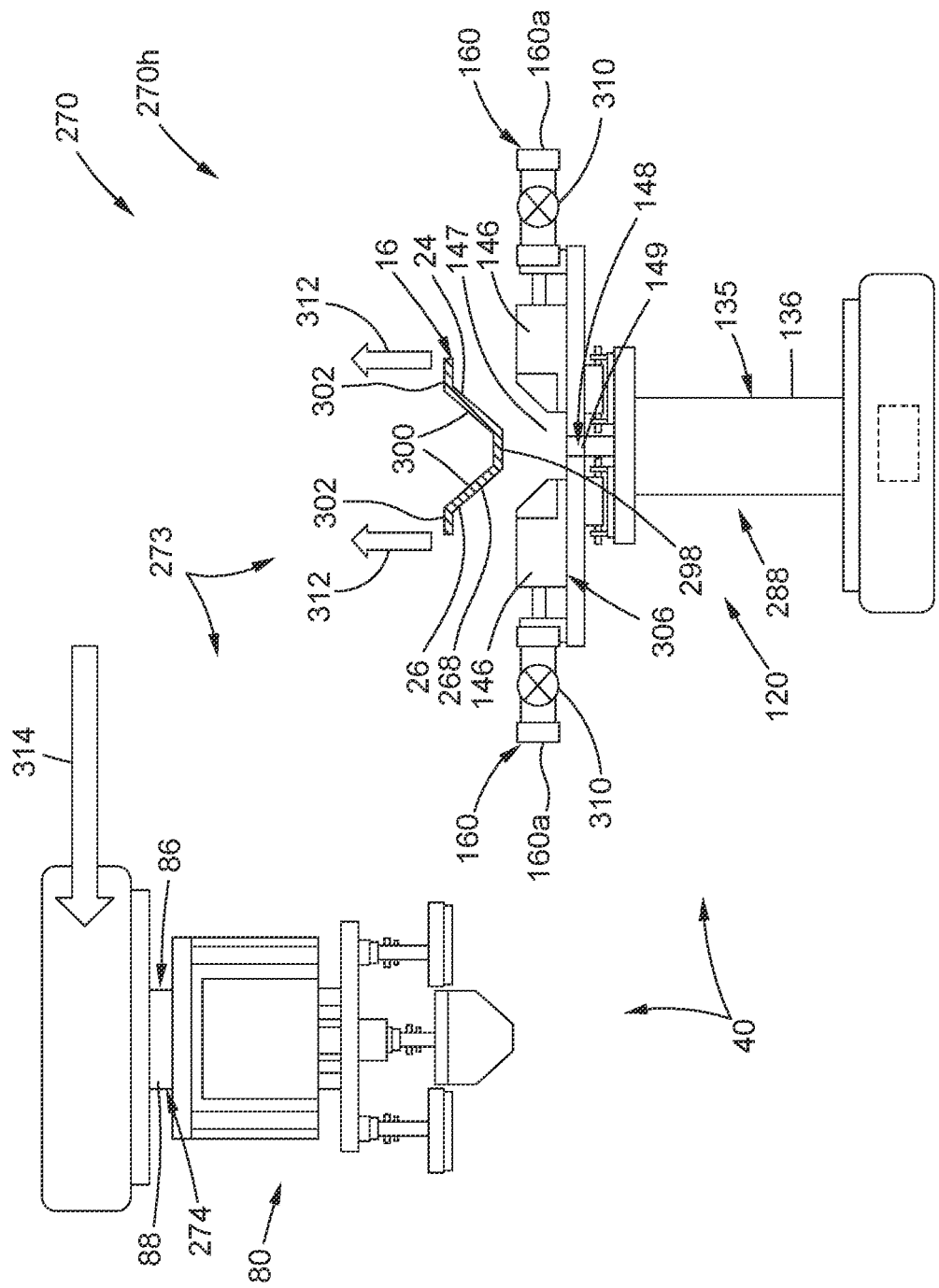

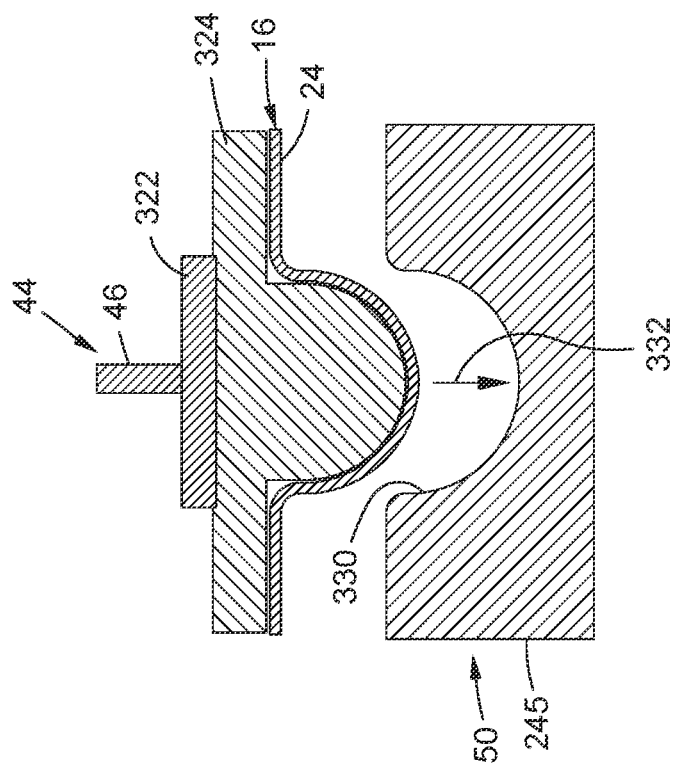
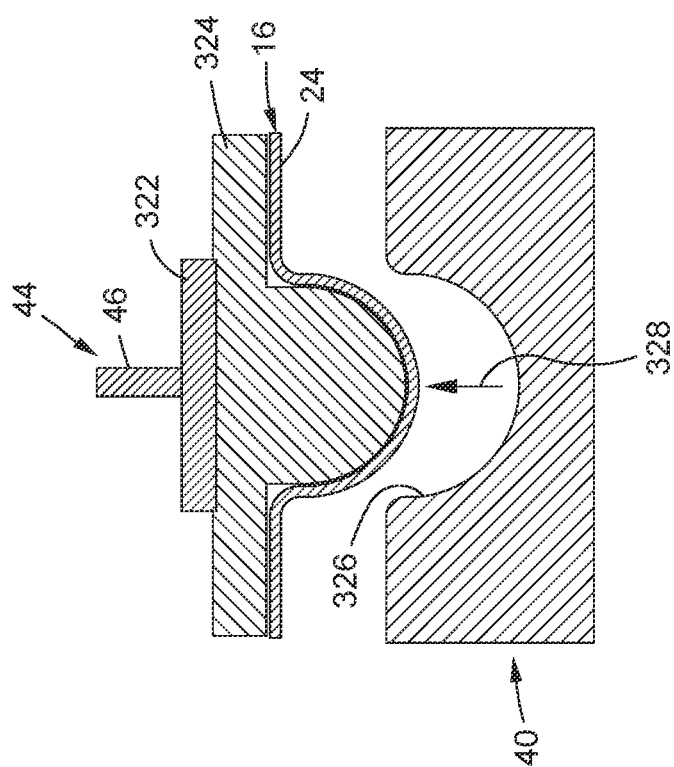

FORMING SYSTEM AND METHOD FOR FORMING A CONTOURED COMPOSITE STRUCTURE

FIELD

The disclosure relates generally to the fabrication of composite structures, such as those used in the aircraft industry, and relates more particularly, to a system and method for forming three-dimensional contoured composite structures, such as stringers, for aircraft and other vehicles or structures.

BACKGROUND

Composite structures may be used in a wide variety of applications, including in the manufacture of aircraft, due to their high strength-to-weight ratios, corrosion resistance and other favorable properties. In particular, in aircraft manufacturing, composite structures may be used to form the fuselage, wings, tail sections, and other parts of the aircraft. Such composite structures may be formed from composite laminates comprising multiple stacked composite plies, or layers, laminated together.

Composite structural members, such as stringers, stiffener members, and the like, may require complex contours tailored to particular applications. Such composite structural members may be formed using a forming machine having an upper die apparatus and a lower die apparatus that compress and form a flat composite laminate charge into a desired composite structure having a complex curved configuration with complex contours along its length.

Known forming machines exist for forming flat composite laminate charges into contoured composite structures, such as stringers. However, with certain known forming machines, the upper die apparatus and the lower die apparatus are joined together, for example, with clamping devices, such as C-clamps, and the upper die apparatus is static and not movable. Such C-clamp forming machines typically allow a formed stringer to exit only from the front of the machine and not from the back of the machine. Thus, a formed stringer must first be removed from the machine and from the forming area, or station, before a composite charge can be received by the machine for forming a new stringer. This may result in a less efficient and less continuous forming process flow, and may increase the overall manufacturing time. Moreover, such C-clamp forming machines typically have a large footprint and may take up considerable space.

In addition, known forming methods for forming flat composite laminate charges into contoured composite structures, such as stringers, may require several manufacturing cells and complex equipment to form stringers having complex curvature and configurations. This may result in a less repeatable and less flexible forming process, and may increase manufacturing costs.

Accordingly, there is a need for a system and method for forming contoured composite structures, such as stringers, and the like, that provide a forming machine or apparatus having upper and lower die assemblies that do not have to be joined together and that are independently movable with respect to each other, that provide for a single manufacturing cell with less complex equipment, and that provide advantages over known systems and methods.

SUMMARY

Example implementations of the present disclosure provide an improved forming system and method for forming contoured composite structures, using a forming cell that allows for continuous processing, and using a forming assembly having separate upper and lower die assemblies. As discussed in the below detailed description, versions of the improved forming system and method may provide significant advantages over known systems and methods.

In a version of the disclosure, there is provided a forming system for forming a contoured composite structure having a complex curved configuration. The forming system comprises a receiving station having a receiving assembly designed to receive a composite charge to be formed.

The forming system further comprises a forming station having a forming assembly. The forming assembly comprises a gantry assembly. The forming assembly further comprises an upper die assembly movably coupled to the gantry assembly. The upper die assembly comprises a plurality of upper actuator assemblies coupled to a pair of lateral pressure plates, and a male die disposed between the pair of lateral pressure plates.

The forming assembly further comprises a lower die assembly coupled to a floor support beam positioned between the gantry assembly. The upper die assembly is separate from, and independently movable with respect to, the lower die assembly. The lower die assembly comprises a plurality of lower actuator assemblies designed to be vertically aligned with the plurality of upper actuator assemblies during forming of the composite charge into the contoured composite structure. The plurality of lower actuator assemblies is coupled to a lower pallet having a presser apparatus disposed between pairs of die blocks.

The forming assembly further comprises one or more pick-and-place devices movably coupled to the gantry assembly. The one or more pick-and-place devices are designed to move the composite charge, and the contoured composite structure formed from the composite charge. The forming system further comprises a tray station having a tray assembly designed to receive the contoured composite structure from the forming station.

In another version of the disclosure, there is provided a method for forming a contoured composite structure having a hat shape. The method comprises providing a forming system. The forming system comprises a receiving station having a receiving assembly. The forming system further comprises a forming station having a forming assembly.

The forming assembly comprises a gantry assembly. The forming assembly further comprises an upper die assembly movably coupled to the gantry assembly. The upper die assembly comprises a plurality of upper actuator assemblies coupled to a pair of lateral pressure plates, and a male die disposed between the pair of lateral pressure plates. The forming assembly further comprise a lower die assembly coupled to a floor support beam positioned between the gantry assembly. The lower die assembly comprises a plurality of lower actuator assemblies coupled to a lower pallet having a presser apparatus disposed between pairs of die blocks. The upper die assembly is separate from, and independently movable with respect to, the lower die assembly. The forming assembly further comprises one or more pick-and-place devices movably coupled to the gantry assembly. The forming system further comprises a tray station having a tray assembly.

The method further comprises delivering, to the receiving assembly at the receiving station, a composite charge to be formed into the contoured composite structure. The method further comprises using one of the one or more pick-and-place devices to remove the composite charge from the receiving assembly, and to move the composite charge onto the lower die assembly of the forming assembly.

The method further comprises securing the composite charge between the lower die assembly and the upper die assembly. The method further comprises using the forming assembly to coordinate the plurality of upper actuator assemblies and the plurality of lower actuator assemblies, to define a predetermined complex contour in the composite charge. The method further comprises using the forming assembly to press a central portion of the composite charge, to form the contoured composite structure having the hat shape. The method further comprises using one of the one or more pick-and-place devices to remove the contoured composite structure from the lower die assembly of the forming assembly, and to move the contoured composite structure onto the tray assembly at the tray station.

In another version of the disclosure, there is provided a forming system for forming an aircraft stringer for an aircraft. The aircraft stringer has a complex curved configuration. The forming system comprises a receiving station having a receiving assembly designed to receive a composite charge to be formed into the aircraft stringer having the complex curved configuration.

The forming system further comprises a forming station having a forming assembly. The forming assembly comprises a gantry assembly comprising a movable upper crossbeam movably coupled to a pair of side beams mounted on a plurality of side support members. Each side beam has one or more tracks extending along a length of each side beam, wherein the movable upper crossbeam is movable along the one or more tracks of each side beam.

The forming assembly further comprises an upper die assembly movably coupled to the movable upper crossbeam. The upper die assembly comprises a plurality of upper actuator assemblies coupled to a pair of lateral pressure plates, and a male die disposed between the pair of lateral pressure plates.

The forming assembly further comprises a lower die assembly coupled to a floor support beam positioned between the plurality of side support members of the gantry assembly. The upper die assembly is separate from, and independently movable with respect to, the lower die assembly, and the lower die assembly comprises a plurality of lower actuator assemblies designed to be vertically aligned with the plurality of upper actuator assemblies during forming of the composite charge into the aircraft stringer. The plurality of lower actuator assemblies are coupled to a lower pallet having a presser apparatus disposed between pairs of die blocks.

The forming assembly further comprises one or more pick-and-place devices movably coupled to the pair of side support beams of the gantry assembly, via one or more pick-and-place movable beams. The one or more pick-and-place devices are designed to move the composite charge, and the aircraft stringer formed from the composite charge.

The forming system further comprises a tray station having a kitting tray designed to receive the aircraft stringer from the forming station, via one of the one or more pick-and-place devices.

The features, functions, and advantages that have been discussed can be achieved independently in various versions of the disclosure or may be combined in yet other versions further details of which can be seen with reference to the following description and drawings.

Further, the disclosure comprises embodiments according to the following examples:

Example 1. A forming system (10) for forming an aircraft stringer (28) for an aircraft (350a), the aircraft stringer (28) having a complex curved configuration (22a), the forming system (10) comprising: a receiving station (32) having a receiving assembly (34) designed to receive a flat composite charge (36a) to be formed into the aircraft stringer (28) having the complex curved configuration (22a); a forming station (12) having a forming assembly (40) comprising: a gantry assembly (54) comprising a movable upper crossbeam (56) movably coupled to a pair of side beams (58) mounted on a plurality of side support members (60), each side beam (58) having one or more tracks (68) extending along a length (70) of each side beam (58), wherein the movable upper crossbeam (56) is movable along the one or more tracks (68) of each side beam (58); an upper die assembly (80) movably coupled to the movable upper crossbeam (56), the upper die assembly (80) comprising a plurality of upper actuator assemblies (82) coupled to a pair of lateral pressure plates (106), and a male die (96) disposed between the pair of lateral pressure plates (106); a lower die assembly (120) coupled to a floor support beam (122) positioned between the plurality of side support members (60) of the gantry assembly (54), the upper die assembly (80) separate from, and independently movable with respect to, the lower die assembly (120), and the lower die assembly (120) comprising a plurality of lower actuator assemblies (132) designed to be vertically aligned with the plurality of upper actuator assemblies (82) during forming of the composite charge (36) into the aircraft stringer (28), and the plurality of lower actuator assemblies (132) coupled to a lower pallet (144) having a presser apparatus (148) disposed between pairs of die blocks (146); and one or more pick-and-place devices (44) movably coupled to the pair of side beams (58) of the gantry assembly (54), via one or more pick-and-place movable beams (244), the one or more pick-and-place devices (44) designed to move the composite charge (36), and the aircraft stringer (28) formed from the composite charge (36); and a tray station (48) having a kitting tray (245) designed to receive the aircraft stringer (28) from the forming station (12), via one of the one or more pick-and-place devices (44).

Example 2. The forming system (10) of example 1, wherein the plurality of upper actuator assemblies (82) comprise an upper pogo array (84), and the plurality of lower actuator assemblies (132) comprise a lower pogo array (134), and further wherein the upper pogo array (84) and the lower pogo array (134) are designed to move in sync, to define a predetermined complex contour (20b) of the aircraft stringer (28), as the composite charge (36) is formed into the aircraft stringer (28).

Example 3. The forming system (10) of example 2, wherein the upper pogo array (84) comprises a plurality of upper pogos (88), each having one or more upper seesaw assemblies (108), and the lower pogo array (134) comprises a plurality of lower pogos (136), each having one or more lower seesaw assemblies (162).

Example 4. The forming system (10) of examples 1-3, wherein the one or more pick-and-place devices (44) comprise one or more of, a two-dimensional pick-and-place device (45) designed to move the composite charge (36) from the receiving station (32) to the forming station (12), and a three-dimensional pick-and-place device (46) designed to move the composite charge (36) from the receiving station (32) to the forming station (12), and designed to move the aircraft stringer (28) formed by the forming assembly (40), from the forming station (12) to the tray station (48).

Example 5. The forming system (10) of examples 1-4, wherein the presser apparatus (148) comprises one of, a pneumatically controlled presser apparatus (148a), and an electrically controlled presser apparatus (148b).

BRIEF DESCRIPTION OF THE DRAWINGS

The disclosure can be better understood with reference to the following detailed description taken in conjunction with the accompanying drawings which illustrate preferred and exemplary versions, but which are not necessarily drawn to scale. The drawings are examples and not meant as limitations on the description or claims.

FIG. 2F is an illustration of a front view of another version of a forming assembly;

FIG. 2G is an illustration of a front view of yet another version of a forming assembly;

FIG. 4D is an illustration of a left side perspective view of a linear guide of an upper actuator assembly;

FIG. 4E is an illustration of a front view of an upper seesaw assembly that may be used in the upper actuator assembly of FIG. 4C;

FIG. 6A is an illustration of an enlarged front perspective view of a version of a lower die assembly with a pneumatically controlled presser apparatus;

FIG. 6B is an illustration of an enlarged front perspective view of another version of a lower die assembly with an electrically controlled presser apparatus;

FIG. 10A is an illustration of a pre-forming step of a forming process showing a side view of an exemplary version of a forming assembly with an upper die assembly and a lower die assembly in an unaligned positioned;

FIG. 10H is an illustration of a post-forming step of the forming process showing a side view of the upper die assembly and the lower die assembly of the forming assembly, where the upper die assembly and the lower die assembly are in the unaligned position, and the contoured composite structure formed by the forming process is removed from the lower die assembly;

FIG. 12A is schematic illustration of a side view of a pick-and-place device moving a contoured composite structure out of a forming assembly;

FIG. 12B is a schematic illustration of a side view of the pick-and-place device of FIG. 12A moving the contoured composite structure onto a tray assembly;

The figures shown in this disclosure represent various aspects of the versions presented, and only differences will be discussed in detail.

DETAILED DESCRIPTION

Disclosed versions or embodiments will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

This specification includes references to "one version" or "a version". The instances of the phrases "in one version" or "in a version" do not necessarily refer to the same version. Particular features, structures, or characteristics may be combined in any suitable manner consistent with this disclosure.

As used herein, "comprising" is an open-ended term, and as used in the claims, this term does not foreclose additional structures or steps.

As used herein, "designed to" or "configured to" means various parts or components may be described or claimed as "designed to" or "configured to" perform a task or tasks. In such contexts, "designed to" or "configured to" is used to connote structure by indicating that the parts or components include structure that performs those task or tasks during operation. As such, the parts or components can be said to be configured to perform the task even when the specified part or component is not currently operational (e.g., is not on).

As used herein, the terms "first", "second", etc., are used as labels for nouns that they precede, and do not imply any type of ordering (e.g., spatial, temporal, logical, etc.).

As used herein, an element or step recited in the singular and preceded by the word "a" or "an" should be understood as not necessarily excluding the plural of the elements or steps.

Figure 1:
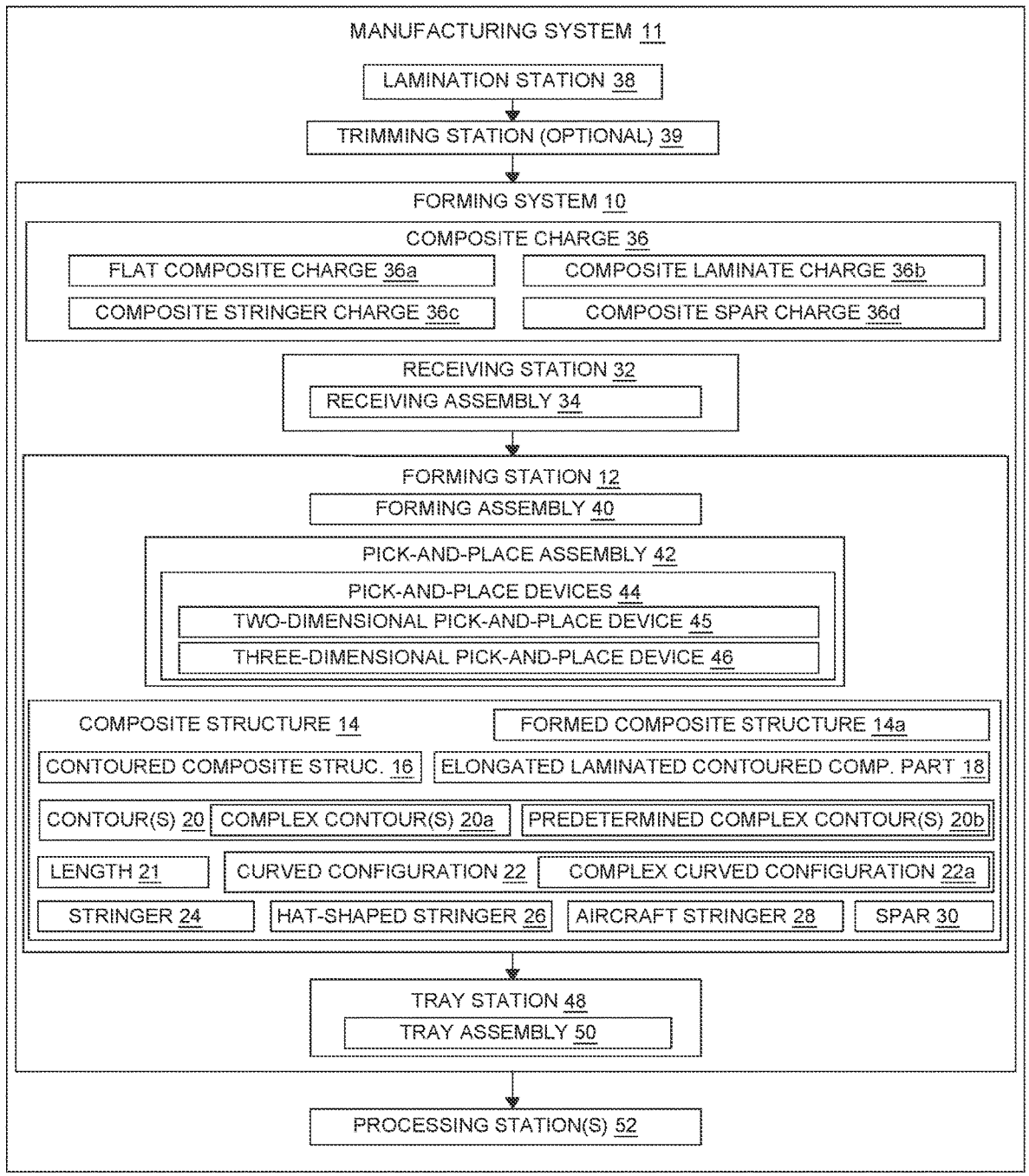
FIG. 1 is an illustration of a functional block diagram showing an exemplary version of a forming system of the disclosure for a manufacturing system.

Now referring to the Figures, FIG. 1 is an illustration of a functional block diagram showing an exemplary version of a forming system 10 of the disclosure, as part of a manufacturing system 11 for manufacturing composite structures 14, such as contoured composite structures 16. The forming system 10 is automated. The blocks in FIG. 1 represent elements, and lines connecting the various blocks do not imply any particular dependency of the elements. Furthermore, the connecting lines shown in the various Figures contained herein are intended to represent example functional relationships and/or physical couplings between the various elements, but it is noted that other alternative or additional functional relationships or physical connections may be present in versions disclosed herein.

As shown in FIG. 1, the forming system 10 includes a forming station 12 having a forming assembly 40. The forming system 10 may also be referred to as a forming cell 13 (see FIGS. 2A, 7A, 8A). The forming system 10 is designed to form, and forms, the composite structure 14, such as a formed composite structure 14, and in particular, is suited to form the contoured composite structure 16, for example, an elongated laminated contoured composite part 18. The contoured composite structure 16 has one or more contours 20 (see FIG. 1), such as one or more complex contours 20a (see FIG. 1) along its length 21 (see FIG. 1). The one or more complex contours 20a may comprise one or more predetermined complex contours (see FIG. 1). The one or more contours 20, such as the one or more complex contours 20a, may include curves, angles, flanges, high contours, and the like. The contoured composite structure 16 has a curved configuration 22 (see FIG. 1), such as a complex curved configuration 22a (see FIG. 1). The contoured composite structure 16, for example, the elongated laminated contoured composite part 18, can be used in a variety of industries and applications including, but not limited to, the manufacture of aircraft 350a (see FIG. 14) and other aerospace structures and vehicles.

As shown in FIG. 1, the composite structure 14, such as the contoured composite structure 16, may comprise one or more of, a stringer 24, including a hat-shaped stringer 26, an aircraft stringer 28, or another suitable stringer, a spar 30, or another suitable contoured composite structure. The aircraft stringer 28 may comprise a fuselage stringer for fuselage 352 (see FIG. 14), a keel stringer, a wing stringer for wings 354 (see FIG. 14), a stabilizer stringer for a vertical stabilizer 360 (see FIG. 14) or horizontal stabilizers 362 (see FIG. 14) of the empennage 358 (see FIG. 14), or another suitable stringer or stiffener member.

As used herein, "contoured composite structures" mean a wide variety of complex contoured and highly contoured composite structures and parts having steep or severe contours, such as complex contours, along their length and having a final three-dimensional geometry. As used herein, "contours" and "complex contours" mean a constant or varying contour, or curvature, in the direction of the length of the composite charge that is steep or severe, and having a three-dimensional geometry.

As shown in FIG. 1, the forming system 10 comprises a receiving station 32 having a receiving assembly 34 designed to receive a composite charge 36, to be formed into the contoured composite structure 16. As shown in FIG. 1, the composite charge 36 may comprise a flat composite charge 36a, a composite laminate charge 36b, a composite stringer charge 36c, a composite spar charge 36d, or another suitable composite charge. The composite charge 36 can be formed to a desired shape, such as a complex curved configuration 22a, of the contoured composite structure 16, by a cold forming process with pressure.

The composite charge 36 comprises a plurality of plies of composite materials, such as prepreg materials, which may be knitted or woven fabrics preimpregnated with a resin material, such as a resin binder, for example, carbon fiber epoxy prepreg materials. The composite material may comprise carbon fiber reinforced polymer (CFRP) materials, including plastic or thermoplastic materials known in the art composite part manufacturing. The plurality of plies may comprise unidirectional or bidirectional fiber reinforcement impregnated with, and held in, a suitable resin matrix, such as a thermoset or a thermoplastic, i.e., prepregs. Dry composite charges may be formed from fabrics that have been pre-treated with resin materials, or may be formed from dry fabric plies having tackifiers that tack the fabric plies together in a desired shape and/or alignment prior to resin infusion. The composite charge 36 is typically formed into the contoured composite structure 16 having the desired configuration, such as the complex curved configuration 22a, while the composite material of the composite charge 36 is in a green, or uncured, condition and then later cured while supported in the desired configuration.

The receiving assembly 34, discussed in further detail below, may receive the composite charge 36 from a lamination station 38 (see FIG. 1) of the manufacturing system 11, or from a trimming station 39 (see FIG. 1) of the manufacturing system 11. The composite charge 36, such as the composite laminate charge 36b, may be created or laid-up at the lamination station 38, which may be adjacent to the trimming station 39, and/or adjacent to the receiving station 32 of the forming system 10. Alternatively, the composite charge 36, such as the composite laminate charge 36b, may already be laid up and delivered to the receiving station 32. The composite charge 36 may comprise any number of layers or plies of composite material and may be trimmed at the trimming station 39 to define the outer perimeter of the composite charge 36, such as the composite laminate charge 36b.

As shown in FIG. 1, the forming system 10 comprises the forming station 12 having a forming assembly 40, discussed in further detail below. The forming assembly 40 of the forming station 12 further comprises a pick-and-place assembly 42 (see FIG. 1) comprising one or more pick-and-place devices 44 (see FIG. 1), for example, a two-dimensional pick-and-place device (2D PnP) 45 and/or a three-dimensional pick-and-place device (3D PnP) 46, discussed in further detail below. The one or more pick-and-place devices 44 are designed to move the composite charge 36 between stations, and designed to move the contoured composite structure 16 formed from the composite charge 36 between stations. The two-dimensional pick-and-place device (2D PnP) 45 is designed to releasably attach to the composite charge 36, such as the flat composite charge 36a, and to deliver the composite charge 36, such as the flat composite charge 36a, from the lamination station 38, or from the trimming station 39, to the receiving station 32 for forming with the forming assembly 40 into the contoured composite structure 16. The three-dimensional pick-and-place device (3D PnP) 46 is designed to releasably attach to the contoured composite structure 16 formed with the forming assembly 40, and to hold the defined shape, such as the complex curved configuration 22a, of the contoured composite structure 16, and to deliver the contoured composite structure 16 to a tray station 48 (see FIG. 1), and in particular, to a tray assembly 50 (see FIG. 1) of the tray station 48. In addition, the three-dimensional pick-and-place device (3D PnP) 46 is also designed to releasably attach to the composite charge 36, such as the flat composite charge 36a, and to deliver the composite charge 36, such as the flat composite charge 36a, from the lamination station 38, or from the trimming station 39, to the receiving station 32 for forming with the forming assembly 40 into the contoured composite structure 16.

As shown in FIG. 1, the forming system 10 further comprises the tray station 48 comprising the tray assembly 50, discussed in further detail below. Once the contoured composite structure 16, such as the stringer 24, formed with the forming assembly 40, is delivered to the tray assembly 50 of the tray station 48 by the three-dimensional pick-and-place device (3D PnP) 46, the tray assembly 50 is moved away from the tray station 48 and the forming station 12, and subsequently moved to one or more processing stations 52 (see FIG. 1) of the manufacturing system 11, for further processing of the contoured composite structure 16, such as the stringer 24. Thus, the forming system 10, or the forming cell, comprises the receiving station 32, the forming station 12, and the tray station 48.

Figure 2A:
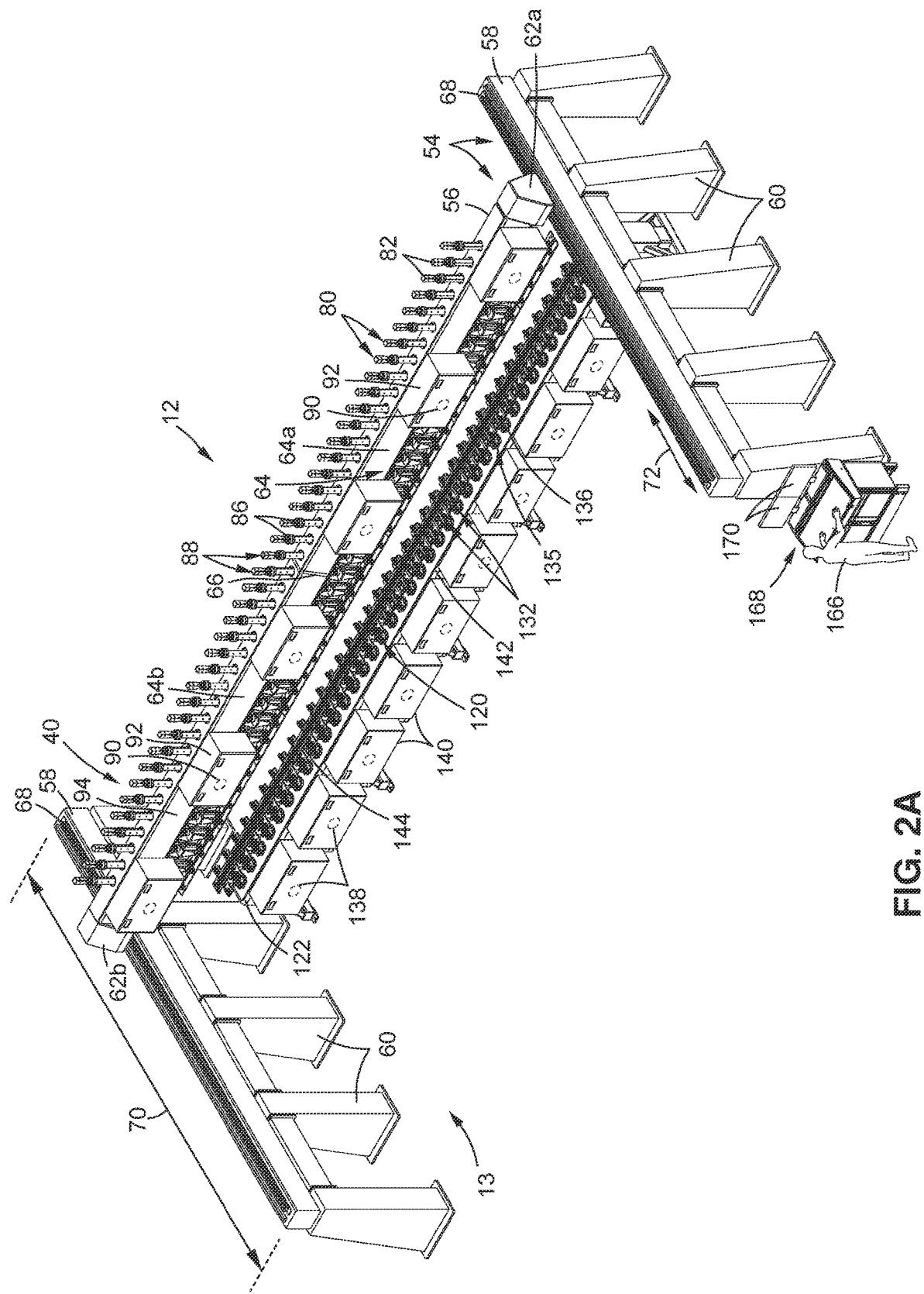
FIG. 2A is an illustration of a back perspective view of a version of a forming assembly of a forming system of the disclosure.
Figure 2B:
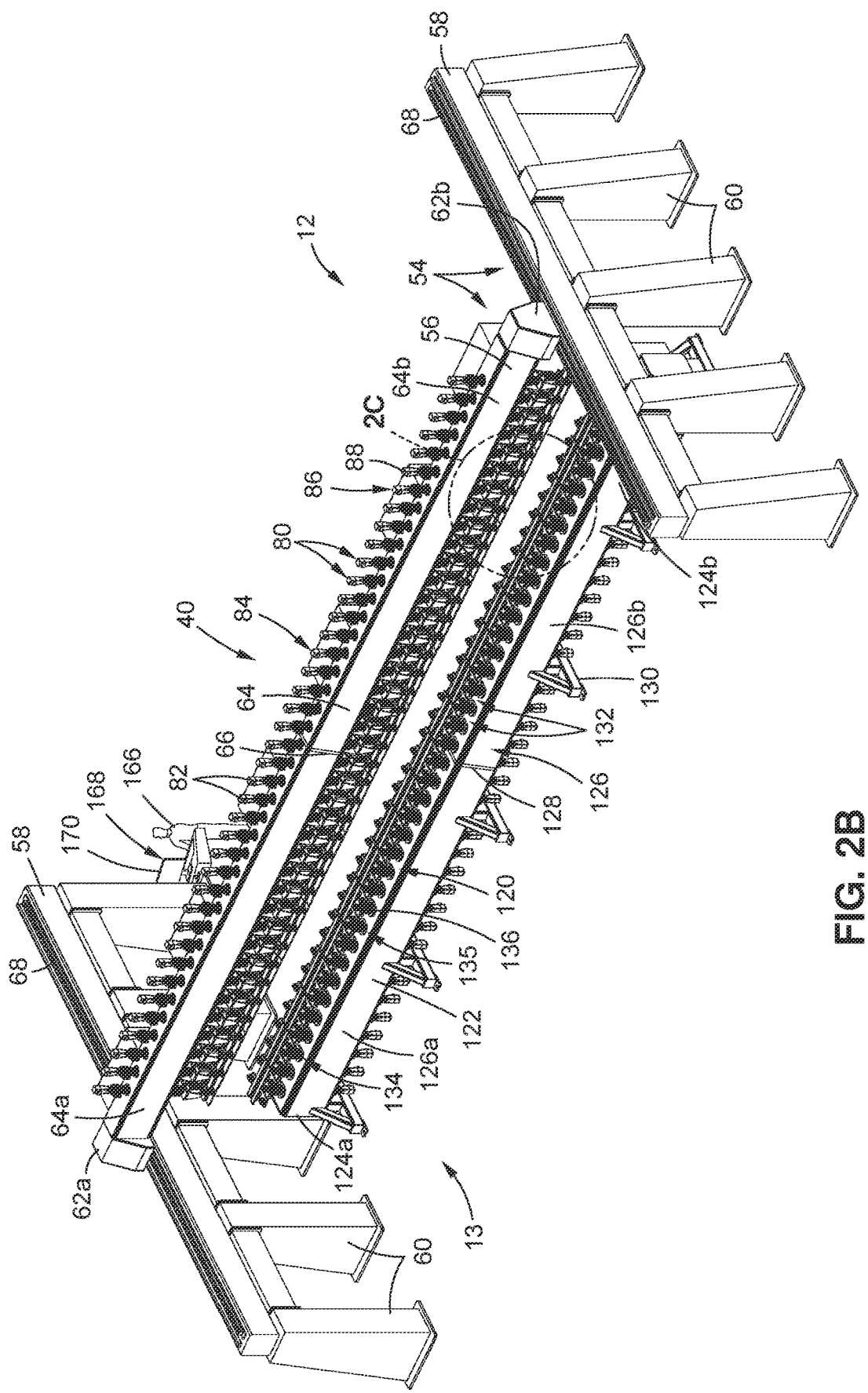
FIG. 2B is an illustration of a front perspective view of the forming assembly of FIG. 2A.
Figure 2C:
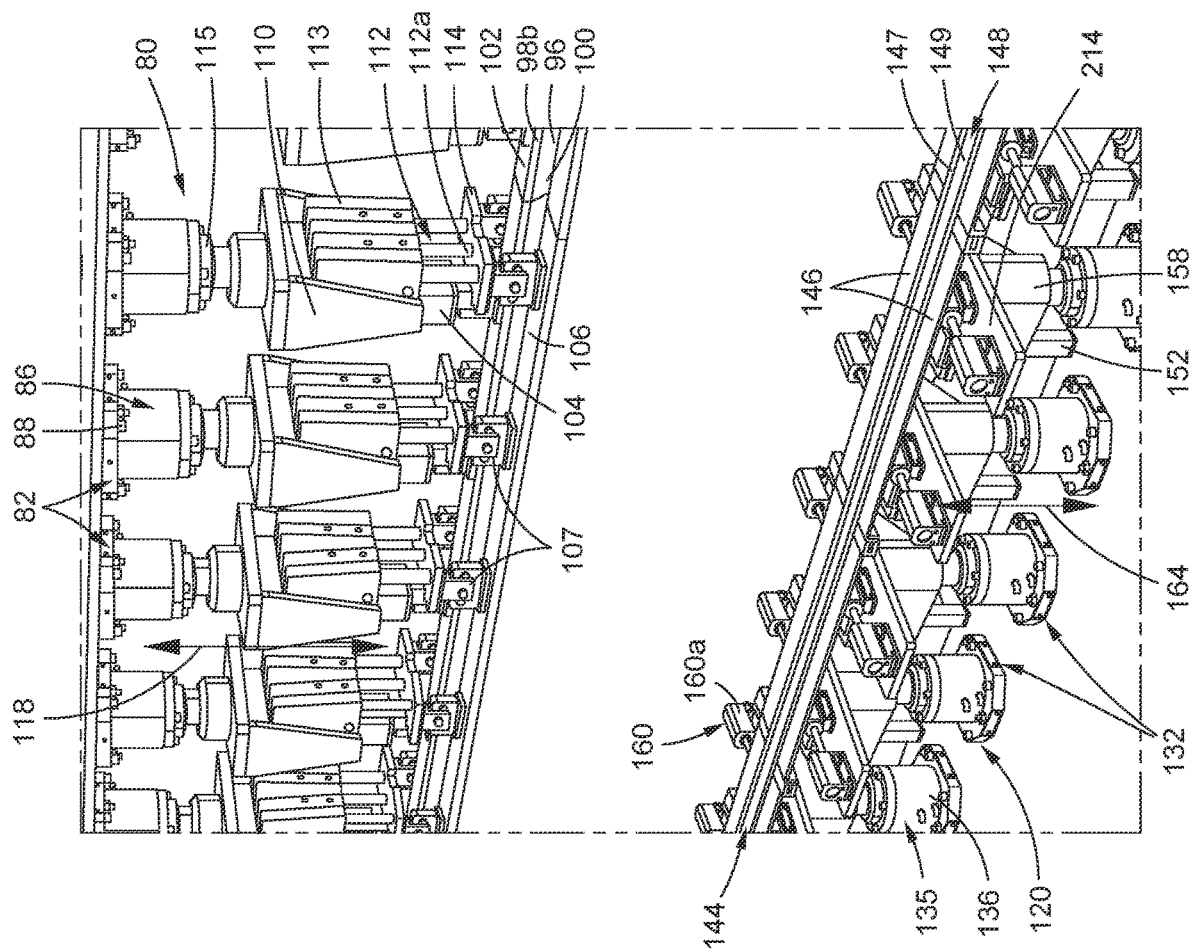
FIG. 2C is an illustration of an enlarged front perspective view of the circle 2C of FIG. 2B.
Figure 2D:
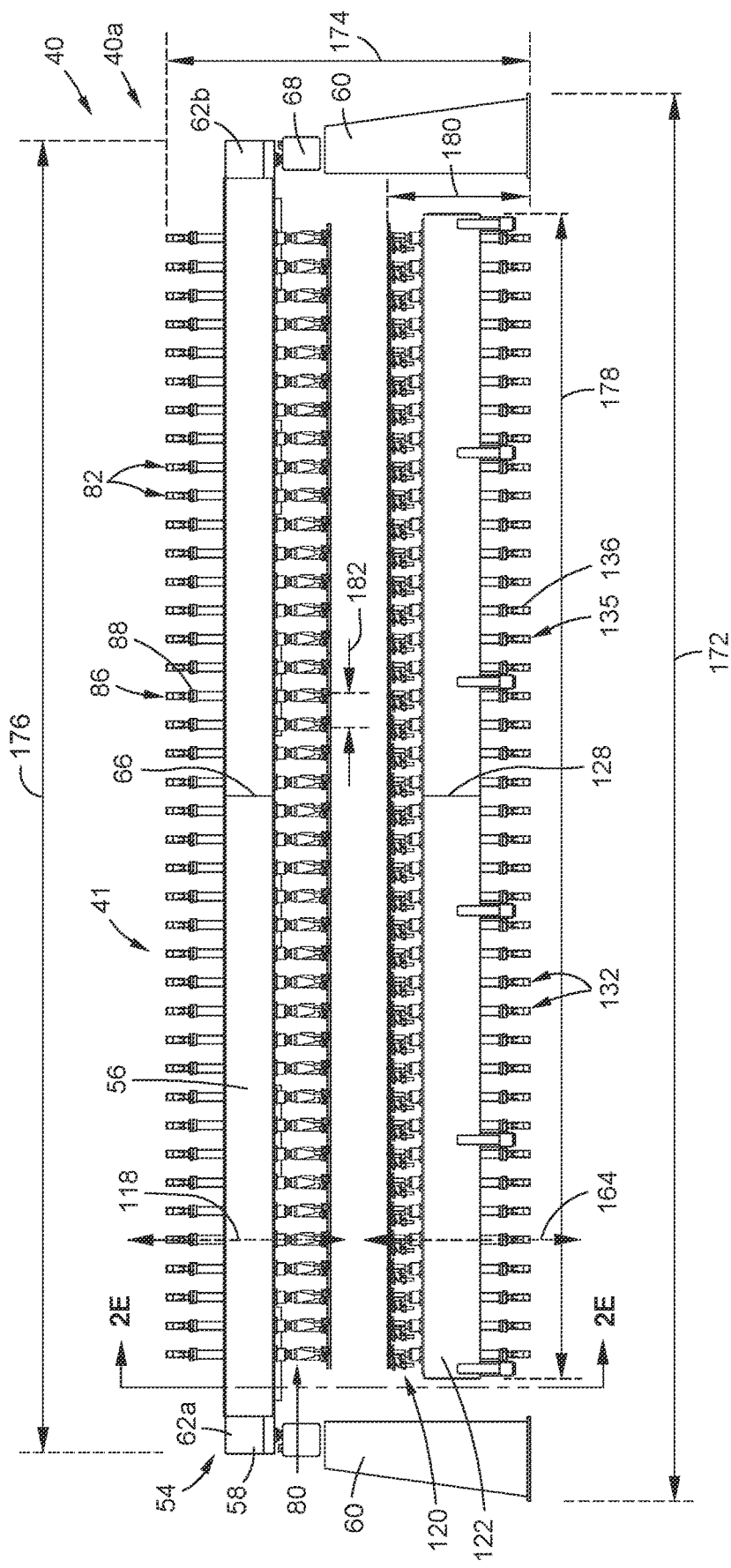
FIG. 2D is an illustration of a front view of the forming assembly of FIG. 2B.
Figure 2E:
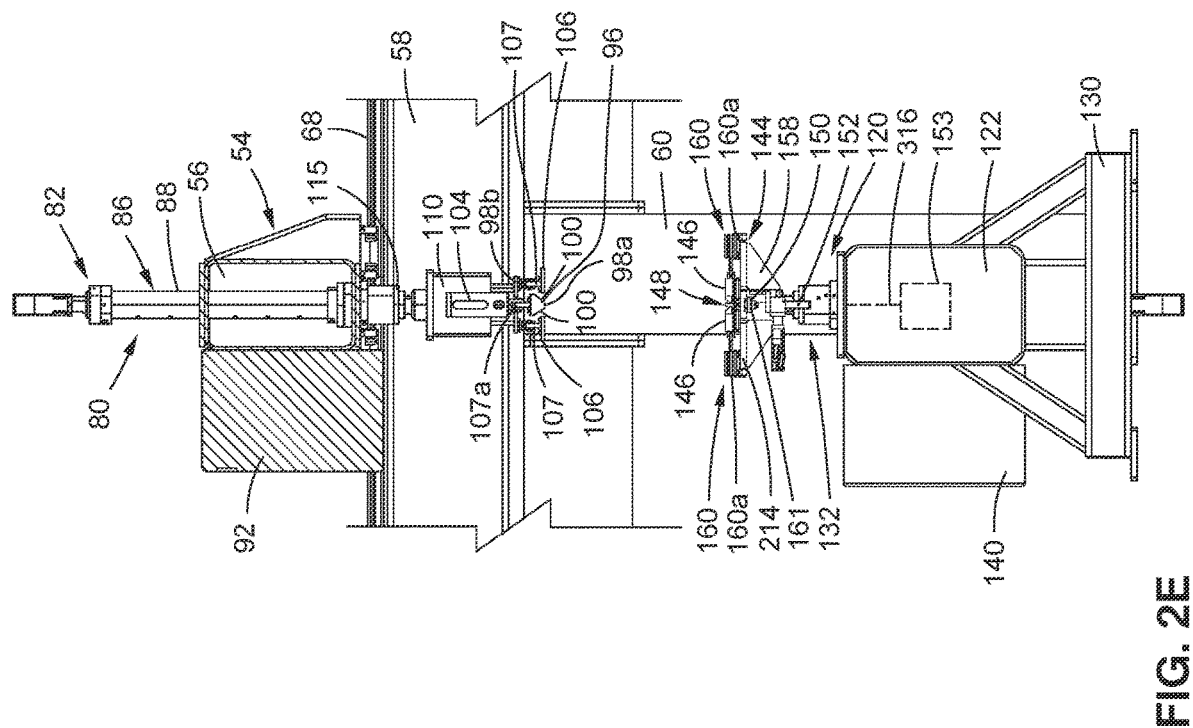
FIG. 2E is an illustration of cross-sectional side view of the forming assembly taken along lines 2E-2E of FIG. 2D.

Now referring to FIGS. 2A-2G, FIGS. 2A-2G show various versions of the forming assembly 40 of the forming station 12. FIG. 2A is an illustration of a back perspective view of a version of the forming assembly 40 of the forming system 10 of the disclosure. FIG. 2B is an illustration of a front perspective view of the forming assembly 40 of FIG. 2A. FIG. 2C is an illustration of an enlarged front perspective view of the circle 2C of FIG. 2B. FIG. 2D is an illustration of a front view of the forming assembly 40 of FIG. 2B. FIG. 2E is an illustration of cross-sectional side view of the forming assembly 40 taken along lines 2E-2E of FIG. 2D. FIG. 2F is an illustration of a front view of another version of a forming assembly 40. FIG. 2G is an illustration of a front view of yet another version of a forming assembly 40.

As shown in FIGS. 2A, 2B, 2D, 2F, and 2G, the forming assembly 40 comprises a gantry assembly 54 comprising a movable upper crossbeam 56 movably coupled to a pair of side beams 58, such as side support beams, mounted on a plurality of side support members 60, for example, in the form of vertically oriented columns or supports. The movable upper crossbeam 56 is generally horizontally oriented and generally transversely oriented to the side beams 58 and is generally perpendicularly oriented to the side support members 60. The plurality of side support members 60 are fixed in place. As shown in FIGS. 2A-2B and 2D, the movable upper crossbeam 56 has a first end 62a, a second end 62b opposite the first end 62a, and an elongated body 64. The elongated body 64 may have one or more body portions 64a, 64b (see FIG. 2A) joined together at a crossbeam joint 66 (see FIGS. 2A, 2D, 2F).

Figure 3A:
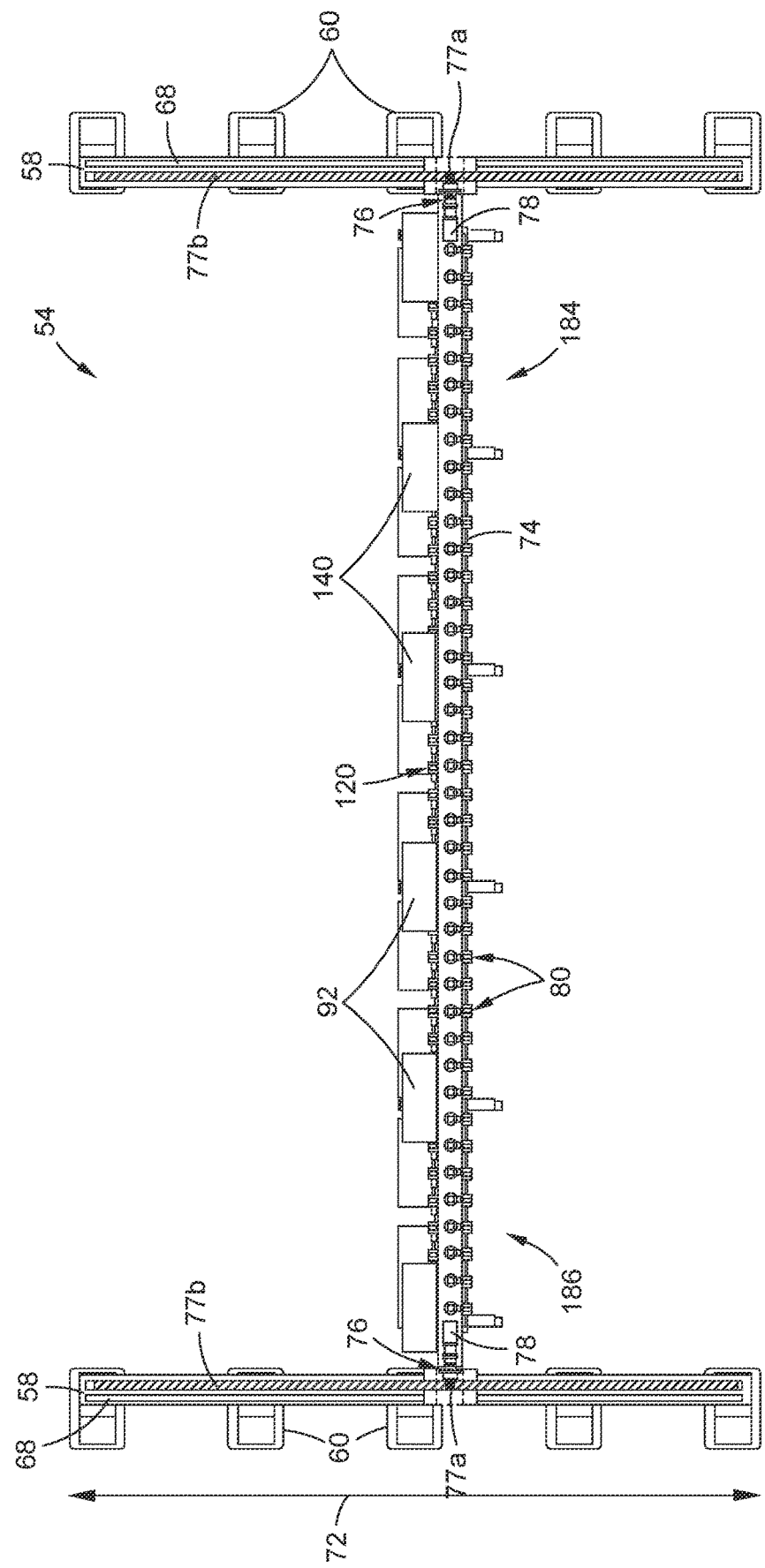
FIG. 3A is an illustration of a top view of a carriage assembly of a forming assembly having a movable carriage in a first position.
Figure 3B:
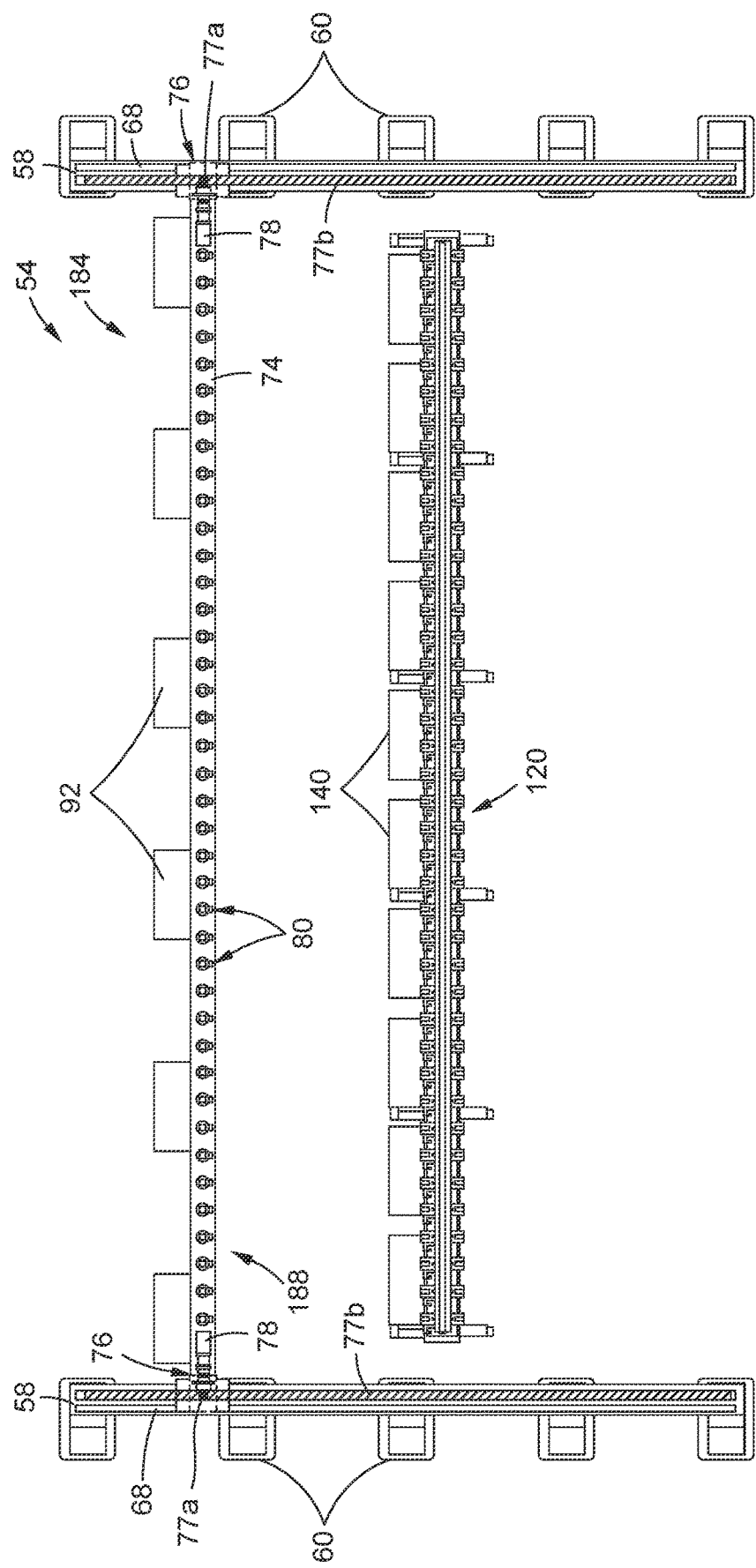
FIG. 3B is an illustration of a top view of the carriage assembly of FIG. 3A with the movable carriage in a second position.

As shown in FIGS. 2A-2B, each of the pair of side beams 58 has one or more tracks 68 extending along a length 70 (see FIG. 2A) of each side beam 58. The tracks 68 are designed to guide the movable upper crossbeam 56 within the forming system 10, or forming cell. In one exemplary version, each side beam 58 may have a length 70 of 5.8 meters (19 feet). However, the side beams 58 may have another suitable length. The movable upper crossbeam 56 is movable along the one or more tracks 68 of each of the side beams 58 and back and forth in a movement direction 72 (see FIG. 2A) along a y-axis of the movable upper crossbeam 56. The movable upper crossbeam 56 includes a movable carriage 74 (see FIGS. 3A-3B), discussed in further detail below with respect to FIGS. 3A-3B, that may move the movable upper crossbeam 56 with a pinion-rack system 76 (see FIGS. 3A-3B), or another suitable mechanism. As shown in FIGS. 3A-3B, the pinion-rack system 76 comprises a pinion 77a, or circular gear, engaging a rack 77b, or linear gear, to translate rotational motion into linear motion.

Driving the pinion 77a into rotation causes the rack 77b to be driven linearly. As shown in FIGS. 3A-3B, the pinion-rack system is coupled to a servo engine 78. The movable carriage 74 is controlled with the servo engines 78 (see FIGS. 3A-3B) driving the pinion-rack system 76.

As shown in FIGS. 2A-2G, the forming assembly 40 further comprises an upper die assembly 80 movably coupled to, and supported by, the movable upper crossbeam 56. The upper die assembly 80 comprises a plurality of upper actuator assemblies 82 (see FIGS. 2A-2D, 2F-2G), for example, in the form of an upper pogo array 84 (see FIGS. 2A-2B, 2D, 2F-2G), or upper pogo set, comprising a plurality of upper actuators 86 (see FIGS. 2A-2G), such as in the form of upper pogos 88 (see FIGS. 2A-2G). The plurality of upper actuator assemblies 82 are controlled with one or more upper controllers 90 (see FIG. 2A) housed in upper control cabinets 92 (see FIG. 2A) coupled to a side 94 (see FIG. 2A) of the movable upper crossbeam 56.

As shown in FIGS. 2C and 2E, the plurality of upper actuator assemblies 82 are coupled to a pair of lateral pressure plates 106. For example, each upper actuator assembly 82 may be attached to the pair of lateral pressure plates 106, via a bracket attachment assembly 107. An upper seesaw assembly 108 (see FIG. 4E) may be used instead of, and in place of, the bracket attachment assembly 107. The upper seesaw assembly 108 is discussed in further detail below with respect to FIG. 4E.

The upper die assembly 80 further comprises the male die 96 (see FIGS. 2C, 2E), also referred to as an upper die, or a punch, disposed between the pair of lateral pressure plates 106. As shown in FIG. 2E, the male die 96 comprises a bottom surface 98a, a top surface 98b, and tapered sides 100 extending downwardly and inwardly at an angle from the top surface 98b to the bottom surface 98a. As shown in FIGS. 2C and 2E, the pair of lateral pressure plates 98 are positioned along the tapered sides 100 of the male die 96. As shown in FIGS. 2C and 2E, the top surface 98b of the male die 96 is coupled to a backing plate 102, which is coupled to a male die support structure 104 positioned above the male die 96. As shown in FIGS. 4B-4C, the male die support structure 104 is attached to the top of the backing plate 102, via a bracket attachment assembly 107a. The upper seesaw assembly 108 (see FIG. 4E) may be used instead of, and in place of, the bracket attachment assembly 107a.

Figure 10B:
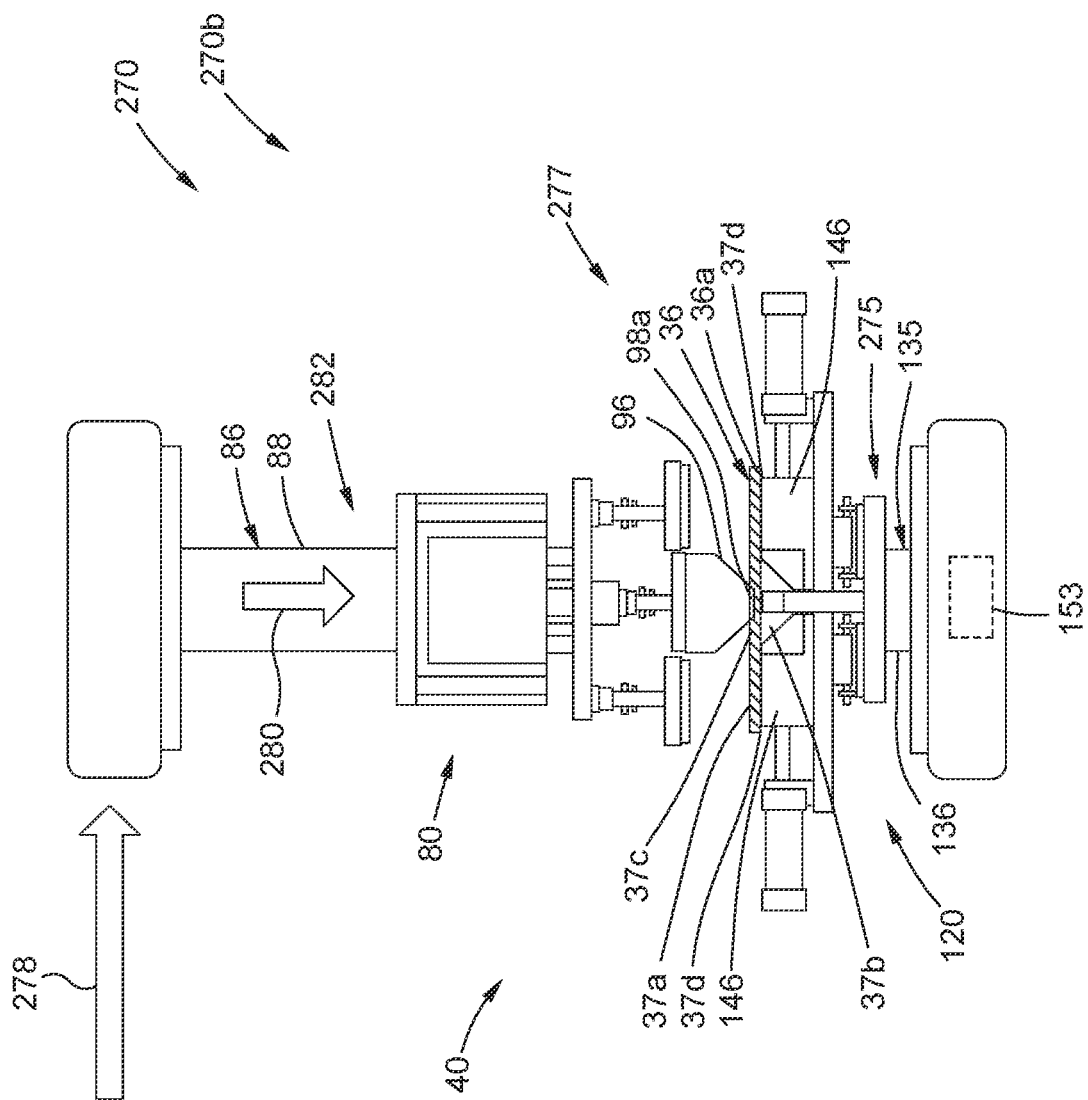
FIG. 10B is an illustration of a pre-forming step of the forming process showing a side view of the upper die assembly and the lower die assembly of the forming assembly, where the upper die assembly and the lower die assembly are in an aligned position.
Figure 10C:
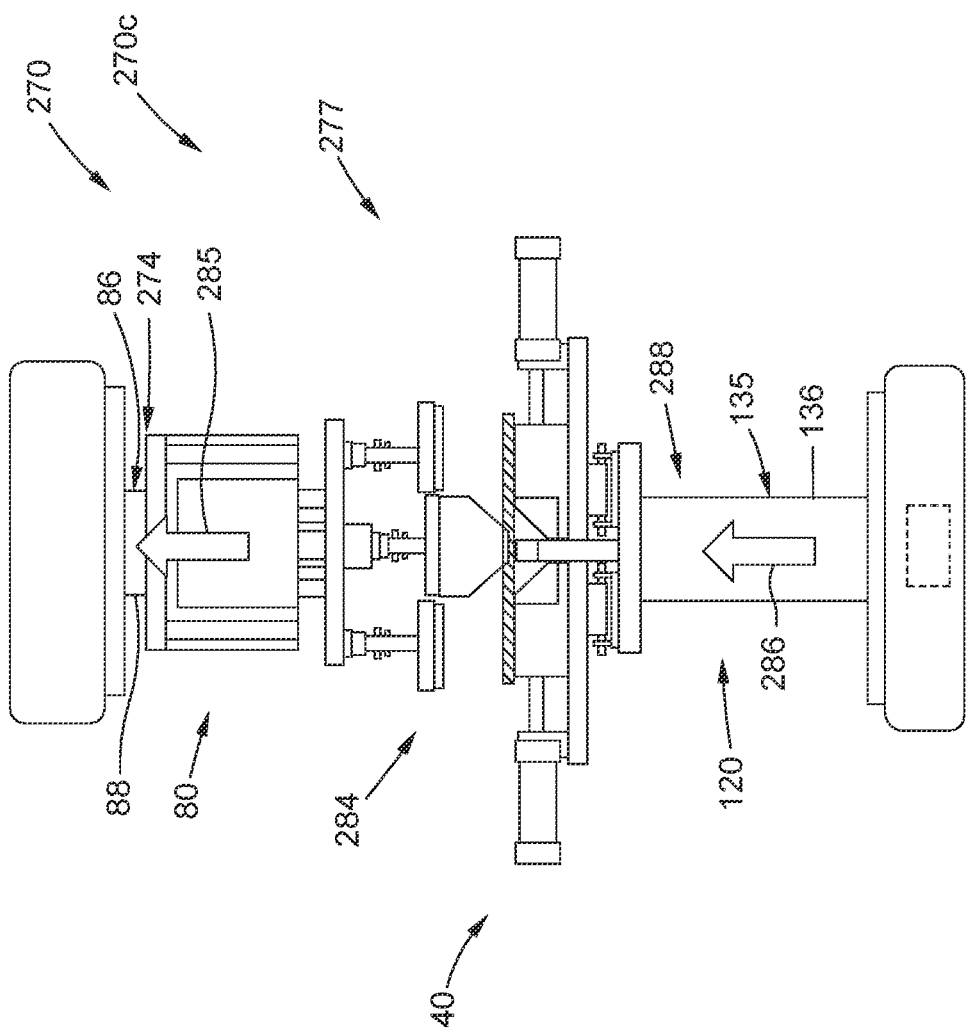
FIG. 10C is an illustration of a forming step of the forming process showing a side view of the upper die assembly and the lower die assembly of the forming assembly, where an upper actuator and a lower actuator coordinate movement to a working position.
Figure 10D:
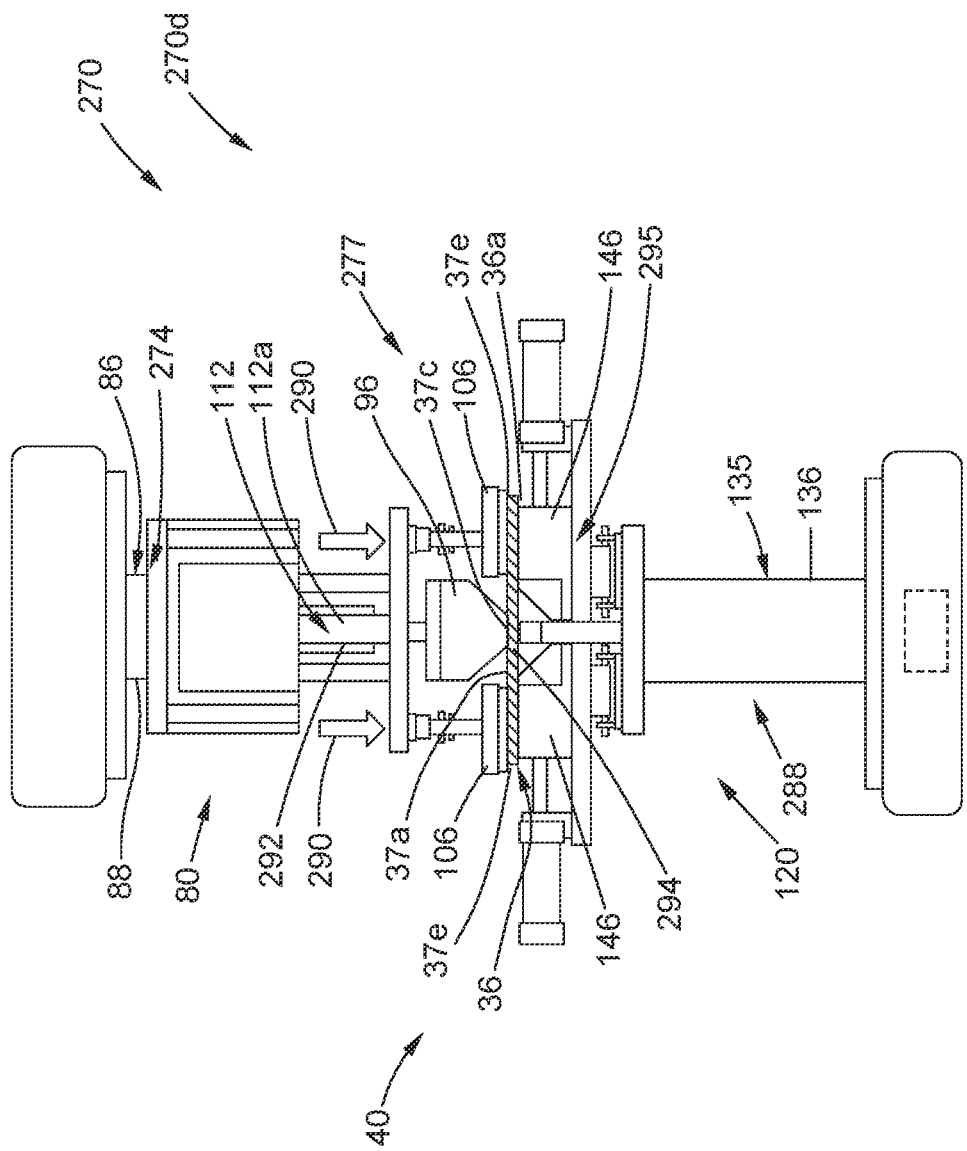
FIG. 10D is an illustration of a forming step of the forming process showing a side view of the upper die assembly and the lower die assembly of the forming assembly, where a pneumatic cylinder is deployed downwardly.
Figure 10E:
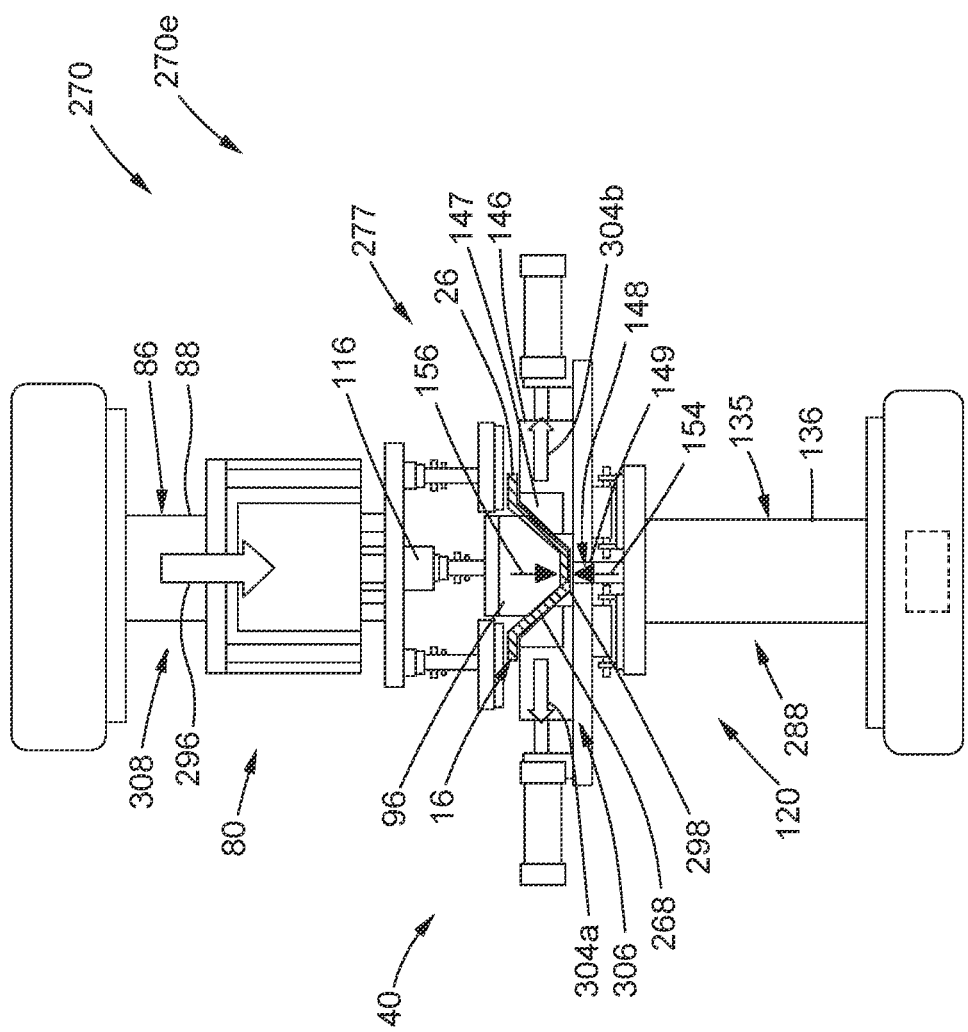
FIG. 10E is an illustration of a forming step of the forming process showing a side view of the upper die assembly and the lower die assembly of the forming assembly, where an upper actuator is deployed downwardly to cause a male die to form a hat shape.

As shown in FIGS. 2C and 2E, each upper actuator assembly 82 further comprises an end effector main support structure 110, one or more cylinders 112, such as pneumatic cylinders 112a, a housing 113 for the cylinder 112, a cylinder plate 114, a load cell 115, and a hard stop element 116 (see FIG. 10E). As shown in FIG. 2C, each upper actuator 86, such as the upper pogo 88, is designed to move up and down in a vertical direction 118 (see also FIG. 2D) along a z-axis of the upper actuator 86, such as the upper pogo 88.

As shown in FIGS. 2A-2G, the forming assembly 40 further comprises a lower die assembly 120. The lower die assembly 120 is coupled to, and supported by, a floor support beam 122 (see FIGS. 2A-2B, 2D-2G) positioned between the gantry assembly 54, and in particular, between the plurality of side support members 60 of the gantry assembly 54. As shown in FIG. 2B, the floor support beam 122 has a first end 124a, a second end 124b opposite the first end 124a, and an elongated body 126. The elongated body 126 may have one or more body portions 126a, 126b (see FIG. 2B) joined together at a beam joint 128 (see FIGS. 2B, 2D, 2F). As shown in FIG. 2B, the floor support beam may be supported on the floor with one or more beam support elements 130.

As shown in FIGS. 2A-2G, the lower die assembly 120 comprises a plurality of lower actuator assemblies 132 designed to be vertically aligned with the plurality of upper actuator assemblies 82 during forming of the composite charge 36 into the contoured composite structure 16. The upper die assembly 80 is separate from, and independently movable, via the movable upper crossbeam 56, with respect to, the lower die assembly 120. The plurality of lower actuator assemblies 132 are, for example, in the form of a lower pogo array 134 (see FIGS. 2A-2G), or lower pogo set, comprising a plurality of lower actuators 135 (see FIGS. 2C, 2D, 2F, 2G), such as in the form of lower pogos 136 (see FIGS. 2C, 2D, 2F, 2G). The plurality of lower actuator assemblies 132 are controlled with one or more lower controllers 138 (see FIG. 2A) housed in lower control cabinets 140 (see FIG. 2A) coupled to a side 142 (see FIG. 2A) of the floor support beam 122.

As shown in FIGS. 2C and 2E, the lower die assembly 120 further comprises a lower pallet 144, also referred to as a lower die, or a female die. The lower pallet 144 comprises a plurality of opposing pairs of die blocks 146 (see FIG. 2E), where each pair of die blocks 146 is spaced apart to define a die cavity 147 (see FIG. 2C). The die blocks 146 are slidably displaceable with respect to each other along the length of the lower pallet 144. As shown in FIGS. 2C and 2E, a presser apparatus 148, such as a cap presser apparatus 149, is coupled to the lower die assembly 120, and is disposed in the die cavity 147 and disposed between the pairs of die blocks 146. The presser apparatus 148 is coupled to a presser support 150 (see FIG. 2E), and is coupled to a presser drive 152 (see FIG. 2E) configured to move the presser apparatus 148 upwardly and downwardly.

As shown in FIG. 2E, the lower die assembly 120 may also include a vacuum system 153 coupled to the lower pallet 144, to secure and fix the composite charge 36, such as the flat composite charge 36a, in position, and in place on, and to, the lower pallet 144, before and during the forming process. The vacuum system 153 may comprise one or more of vacuum lines, a vacuum apparatus, a vacuum source, a vacuum power supply, and other suitable vacuum system components.

The presser apparatus 148, such as the cap presser apparatus 149, is designed to apply an upward resistive force 154 (see FIG. 10E) against a cap 298 (see FIG. 10E) of the contoured composite structure 16 formed from the composite charge 36, and against a downward compressive force 156 (see FIG. 10E) applied by the upper die assembly 80, and in particular, applied by the male die 96 and the upper actuator 86, such as the upper pogo 88, of the upper die assembly 80, during forming of the contoured composite structure 16 from the composite charge 36, as discussed in further detail below. The presser apparatus 148, such as the cap presser apparatus 149, may be comprised of a rubber material, a pliable plastic material, or another suitably pliable or soft material. Preferably, the presser apparatus 148, such as the cap presser apparatus 149, has a concave radius.

As shown in FIGS. 2C and 2E, each lower actuator assembly 132 further comprises an end effector main support structure 158, one or more cylinders 160, such as pneumatic cylinders 160a, and a support plate 214 for the lower pallet 144. The support plate 214 may be attached to the lower pallet 144 via a bracket attachment assembly 161 (see FIGS. 2E, 5B). A lower seesaw assembly 162 (see FIG. 5E) may be used instead of, and in place of, the bracket attachment assembly 161. The lower seesaw assembly 162 is discussed in further detail below with respect to FIG. 5E.

As shown in FIG. 2C, each lower actuator 135, such as the lower pogo 136, is designed to move up and down in a vertical direction 164 (see also FIG. 2D) along a z-axis of the lower actuator 135, such as the lower pogo 136. The plurality of upper actuator assemblies 82, such as the upper pogo array 84, and the plurality of lower actuator assemblies 132, such as the lower pogo array 134, are designed to move in sync, to define a predetermined complex contour 20b (see FIG. 1) of the contoured composite structure 16, as the composite charge 36 formed into the contoured composite structure 16. The plurality of upper actuator assemblies 82, such as the upper pogo array 84, and the plurality of lower actuator assemblies 132, such as the lower pogo array 134, may be driven with a servo drive, a mechanical drive, an electrical drive, a pneumatic drive, a hydraulic drive, or another suitable drive mechanism.

As shown in FIG. 2A, the forming assembly 40 of the forming station 12 of the forming system 10 (see FIG. 1) may be operated by an operator 166 using a control system 168 for operatively controlling operations of the forming assembly 40 of the forming system 10, including coordinating and controlling movements of the upper die assembly 80 using the upper controllers 90 and of the lower die assembly 120 using the lower controllers 138. As shown in FIG. 2A, the control system 168 comprises one or more computers 170, such as a portable computer (PC), or a programmable logic controller (PLC), that controls operations of the plurality of upper actuator assemblies 82 and the plurality of lower actuator assemblies 132 of the forming assembly 40, and that may control operations of the pick-and-place devices 44 (see FIG. 1). In one version, the one or more computers 170 use a control program which may include a software program, or an algorithm, that determines how the forming should progress and the sequential operation of the plurality of upper actuator assemblies 82 and the plurality of lower actuator assemblies 132 of the forming assembly 40. A set of operator input controls allows the operator 166 to input or change the control program, contour data of the contoured composite structure 16 to be formed, or other suitable data sets, with operator defined values. The control system 168 may also receive signals from the load cells 115 (see FIG. 2C) which may be used to monitor pressure applied to the composite charge 36 by the plurality of upper actuator assemblies 82 and the plurality of lower actuator assemblies 132 of the forming assembly 40.

FIG. 2D shows an exemplary forming assembly 40 with various exemplary dimensions. FIG. 2D shows a forming assembly length 172, a forming assembly height 174, a first movable upper crossbeam length 176, a floor support beam length 178, and a lower die assembly height 180. In one exemplary version, the forming assembly length 172 is 15 meters (49 feet), the forming assembly height 174 is 3.4 meters (11 feet), the first movable upper crossbeam length 176 is 14.3 meters (47 feet), the floor support beam length 178 is 12.5 meters (41 feet), and the lower die assembly height 180 is 1.2 meters (4 feet). However, the forming assembly length 172, the forming assembly height 174, the first movable upper crossbeam length 176, the floor support beam length 178, and the lower die assembly height 180 may have another suitable length or height.

FIG. 2D further shows a spacing 182 between each of two upper actuators 86, such as the upper pogos 88. The spacing 182 between each upper actuator 86, or upper pogo 88, is preferably an equal distance. In one exemplary version, the spacing 182 is 0.3 meter (1 foot) between each of two upper actuators 86, or upper pogos 88. However, the spacing 182 may be another suitable spacing distance, for example, 15.24 centimeters (6 inches), 61 centimeters (24 inches), or another suitable spacing distance. The spacing between each lower actuator 135, or lower pogo 136, is preferably also an equal distance. The number of upper actuators 86, or upper pogos 88 is preferably the same as the number of lower actuators 135, or lower pogos 136, and preferably, the upper actuators 86, or upper pogos 88, align with the lower actuators 135, or lower pogos 136. If it is desired that the composite structure 14 being formed has a greater amount of contours 20, such as complex contours 20a, then the upper actuators 86, or upper pogos 88, and the lower actuators 135, or lower pogos 136, preferably have a spacing 182 that is a closer distance together. If it is desired that the composite structure 14 being formed has a lesser amount of contours 20, and is less curved and straighter, then the upper actuators 86, or upper pogos 88, and the lower actuators 135, or lower pogos 136, preferably have a spacing 182 that is a farther distance apart.

As shown in FIGS. 2D, 2F, and 2G, the forming assembly 40 may comprise a modular forming assembly 40a having one or more modules 41 (see FIGS. 2F, 2G) based on a length 21 (see FIG. 1) of the contoured composite structure 16 (see FIG. 1), such as a stringer 24 (see FIG. 1), desired to be formed. The modules 41 may include a predetermined number of upper actuator assemblies 82, including the upper actuators 86, or upper pogos 88, and lower actuator assemblies 132, including the number of lower actuators 135, or lower pogos 136, that are needed to make a desired length 21 of the contoured composite structure 16 (see FIG. 1), such as the stringer 24 (see FIG. 1). For example, if it is initially determined that a stringer 24 having a length of 6 meters (20 feet) is desired to be formed, the forming assembly 40 may have one module 41, or a base module, and if it is later determined that a stringer 24 having a length of 12 meters (40 feet) is desired to be formed, one or more additional modules 41 having additional upper pogos 88 and lower pogos 136, may be added to the base module to accommodate the longer stringer length of the stringer 24 to be formed.

In exemplary versions, the forming assembly 40 shown in FIG. 2D may be used to form a contoured composite structure 16, such as a stringer 24, having a length of 12 meters (40 feet), and the forming assembly 40 shown in FIG. 2F may be used to form a contoured composite structure 16, such as a stringer 24, having a length of 6 meters (20 foot), and the forming assembly 40 shown in FIG. 2G may be used to form a contoured composite structure 16, such as a stringer 24, having a length of 3 meters (10 feet). The forming assembly 40 shown in FIG. 2D differs from the forming assembly 40 shown in FIG. 2F by the number of upper actuator assemblies 82, including the upper actuators 86, or upper pogos 88, and the number of lower actuator assemblies 132, including the number of lower actuators 135, or lower pogos 136, as well as the number of upper controllers 90 and upper control cabinets 92, and the number of lower controllers 138 and lower control cabinets 140. The forming assembly 40 shown in FIG. 2G is a reduced version of the forming assembly 40 shown in FIG. 2D, having a reduced number of upper actuator assemblies 82, including the upper actuators 86, or upper pogos 88, and a reduced number of lower actuator assemblies 132, including the number of lower actuators 135, or lower pogos 136, as well as a reduced number of upper controllers 90 and upper control cabinets 92, and a reduced number of lower controllers 138 and lower control cabinets 140. Further, the forming assembly 40 shown in FIG. 2G has a shorter length of the movable upper crossbeam 56, and a shorter length of the floor support beam 122.

Now referring to FIGS. 3A-3B, FIGS. 3A-3B show a carriage assembly 184 having the movable carriage 74. FIG. 3A is an illustration of a top view of the carriage assembly 184 of the movable upper crossbeam 56 (see FIGS. 2A-2B) of the forming assembly 40 (see FIGS. 1, 2A-2B), where the movable carriage 74 is in a first position 186. FIG. 3B is an illustration of a top view of the carriage assembly 184 of FIG. 3A, where the movable carriage 74 is in a second position 188.

As shown in FIGS. 3A-3B, the movable carriage 74 is configured to move, and moves, along the one or more tracks 68 on each of the side beams 58, supported by the plurality of side support members 60. The movable carriage 74 is movable along the one or more tracks 68 of each of the side beams 58 and back and forth in a movement direction 72 (see FIG. 3A) along a y-axis of the movable carriage 74. As shown in FIGS. 3A-3B, in one version, the movable carriage 74 includes the pinion-rack system 76 to move the movable carriage 74 and the movable upper crossbeam 56 (see FIGS. 2A-2B) along the one or more tracks 68 on the side beams 58. The movable carriage 74 is controlled with one or more servo engines 78 (see FIGS. 3A-3B). The movable carriage 74 is configured to move in multiple positions controlled by the one or more servo engines 78, which moves the movable carriage 74 and the movable upper crossbeam 56 (see FIGS. 2A-2B) through the pinion-rack system 76. FIGS. 3A-3B further show the upper die assembly 80 and the upper control cabinets 92, and show the lower die assembly 120 and the lower control cabinets 140.

Figure 4A:
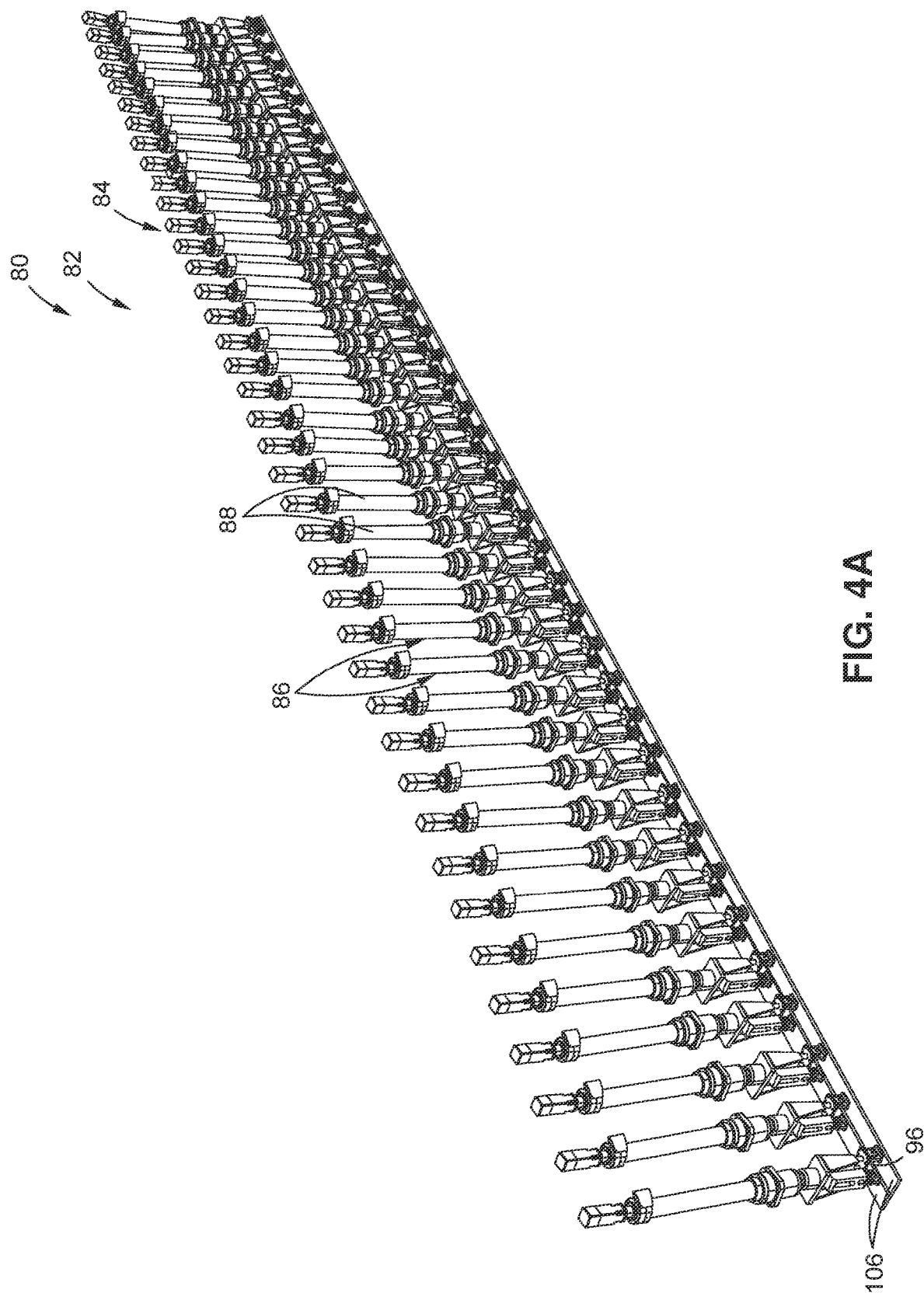
FIG. 4A is an illustration of a front perspective view of a version of an upper die assembly having a plurality of upper actuator assemblies.
Figure 4C:
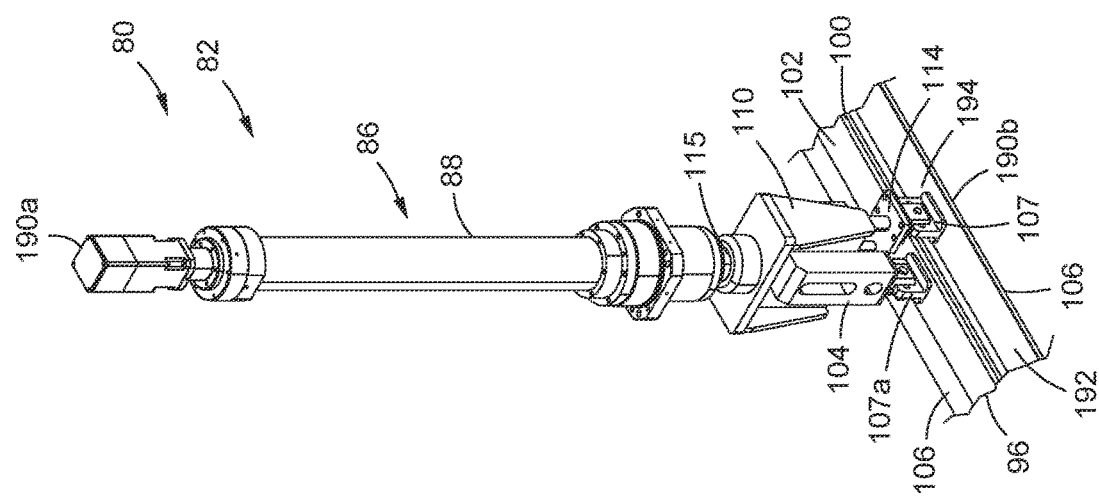
FIG. 4C is an illustration of a left side enlarged perspective view of the upper actuator assembly of FIG. 4B.
Figure 4B:
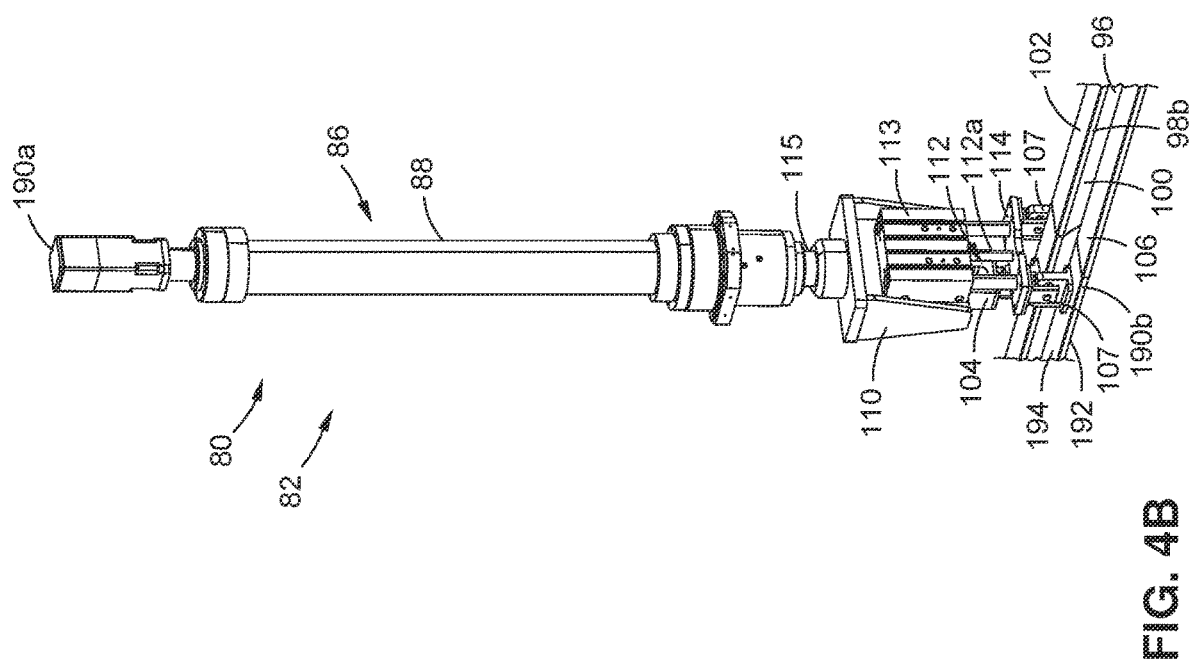
FIG. 4B is an illustration of a right side enlarged perspective view of one of the upper actuator assemblies of FIG. 4A.

Now referring to FIGS. 4A-4E, FIGS. 4A-4E show a version of the upper die assembly 80. FIG. 4A is an illustration of a front perspective view of a version of the upper die assembly 80 comprising a plurality of upper actuator assemblies 82, such as an upper pogo array 84. FIG. 4A shows a plurality of upper actuators 86, such as upper pogos 88, spaced equal distance apart, along the pair of lateral pressure plates 106. The male die 96 is positioned between the pair of lateral pressure plates 106. In one exemplary version, the upper pogo array 84, or upper pogo set, can apply a maximum force of 40,034 N (Newtons) (9000 lbf (pound force)).

FIG. 4B is an illustration of a right side enlarged perspective view of one of the upper actuator assemblies 82 of the upper die assembly 80 of FIG. 4A. FIG. 4C is an illustration of a left side enlarged perspective view of the upper actuator assembly 82 of FIG. 4B. As shown in FIGS. 4B-4C, the upper actuator assembly 82 comprises the upper actuator 86, such as the upper pogo 88. In one exemplary version, each upper actuator 86, such as the upper pogo 88, has a length of travel of 61 centimeters (24 inches). However, the upper actuator 86, such as the upper pogo 88, may have another suitable length of travel.

As shown in FIGS. 4B-4C, the upper die assembly 80 comprises the male die 96 with the tapered sides 100 and the backing plate 102, the male die support structure 104 coupled to, and supporting, the male die 96, and coupled to the backing plate 102 with the bracket attachment assembly 107a. FIGS. 4B-4C further show the pair of lateral pressure plates 106 on each side of the male die 96. The top surface 98b (see FIG. 4B) of the male die 96 is coupled to the backing plate 102, and the male die 96 extends along the length of the backing plate 102. In one exemplary version, the male die 96 comprises a thermoplastic material having a high strength, hardness, and rigidity, such as polyoxymethylene, acetal, polyacetal, polyformaldehyde, or another suitable thermoplastic material. The male die 96 may also be formed of another suitably rigid material, such as a metal, including steel and stainless steel, or another suitable metal, a ceramic, another composite material, or another suitably rigid material. The backing plate 102 attached to the male die 96 preferably comprises an aluminum material, for example, a flexible, relatively thin aluminum material. The backing plate 102 may also comprise another suitable metal or flexible synthetic material.

As shown in FIGS. 4B-4C, the lateral pressure plates 106 comprise a first plate portion 192, or main plate portion, with a second plate portion 194, or support plate portion, attached on top of the first plate portion 192. In one exemplary version, the first plate portion 192 of the lateral pressure plates 106 comprises a thermoplastic material having a high strength, hardness, and rigidity, such as polyoxymethylene, acetal, polyacetal, polyformaldehyde, or another suitable thermoplastic material. The first plate portion 192 may also be formed of another suitably rigid material, such as a metal, including steel and stainless steel, or another suitable metal, a ceramic, another composite material, or another suitably rigid material. The second plate portion 194 of the lateral pressure plates 106 preferably comprises an aluminum material, for example, a flexible, relatively thin aluminum material. The second plate portion 194 may also comprise another suitable metal or flexible synthetic material.

As shown in FIGS. 4B-4C, the upper die assembly 80 comprises the end effector main support structure 110, the cylinder 112 (see FIG. 4B), such as the pneumatic cylinder 112a (see FIG. 4B), a housing 113 for the cylinder 112, a cylinder plate 114, a load cell 115, and the hard stop element 116 (see FIG. 4B). FIGS. 4B-4C further show a top end 190a and a bottom end 190b of the upper actuator assembly 82 of the upper die assembly 80.

FIG. 4D is an illustration of a left side perspective view of a linear guide 196 of the upper actuator assembly 82. FIG. 4D further shows the linear guide 196 coupled to an upper pogo cylinder 198. The linear guide 196 is a static feature and is designed to maintain the alignment of the upper actuator 86, such as the upper pogo 88, and is designed to help guide the movement of, the upper actuator 86, such as the upper pogo 88. The linear guide 196 helps to maintain repeatability.

FIG. 4E is an illustration of a front view of the upper seesaw assembly 108 that may be used instead of, and in place of, the bracket attachment assembly 107 (see FIGS. 4B-4C) on the lateral pressure plates 106 (see FIGS. 4B-4C), and/or that may be used instead of, and in place of, the bracket attachment assembly 107a (see FIG. 4C) on the backing plate 102 (see FIG. 4C) of the male die 96 (see FIG. 4C). FIG. 4E shows the upper seesaw assembly 108 comprising a pair of slotted foot elements 200a coupled, or attached, to a lateral pressure plate 106. As shown in FIG. 4E, the lateral pressure plate 106 comprises the first plate portion 192, or main plate portion, with the second plate portion 194, or support plate portion, attached on top of the first plate portion 192. In an exemplary version, the lateral pressure plate 106 for the upper seesaw assembly 108 may have a maximum length of 10 centimeters (4 inches). Each slotted foot element 200a has a slot opening 202a (see FIG. 4E) designed to receive, and receiving, a connection element 204a (see FIG. 4E). Each connection element 204a is coupled, or attached, to a leg 205a (see FIG. 4E). As shown in FIG. 4E, the legs 205a are coupled to a bracket element 206a at a pivot point 208a. The connection elements 204a are designed to slide and rotate within the slot openings 202*a* in a back and forth direction 210*a* (see FIG. 4E).

During formation of the composite charge 36 into the contoured composite structure 16, the use of one or more upper seesaw assemblies 108 is designed to accommodate and adjust to different levels of thicknesses along the length of the composite charge 36 and is designed to accommodate and adjust to different levels of thicknesses along the length 21 (see FIG. 1) of the contoured composite structure 16 formed from the composite charge 36. The use of one or more upper seesaw assemblies 108 is designed to reduce, or minimize, a polygonal effect. As used herein, "polygonal effect" means when multiple modules are connected and each module is moving to take shape, or form the shape, the linear belt speeds can vary, for example, module and chain links moving around a radius of a sprocket causes linear belt speeds to vary, and a pivot rod travels on a pitch diameter of the sprocket, while the module moves through a smaller chordal radius, causing a horizontal rise and fall of the module. The polygonal effect is typical of modular belt systems. With the use of the one or more upper seesaw assemblies 108 to create a seesaw effect, the polygonal effect is reduced or minimized.

Figure 5A:
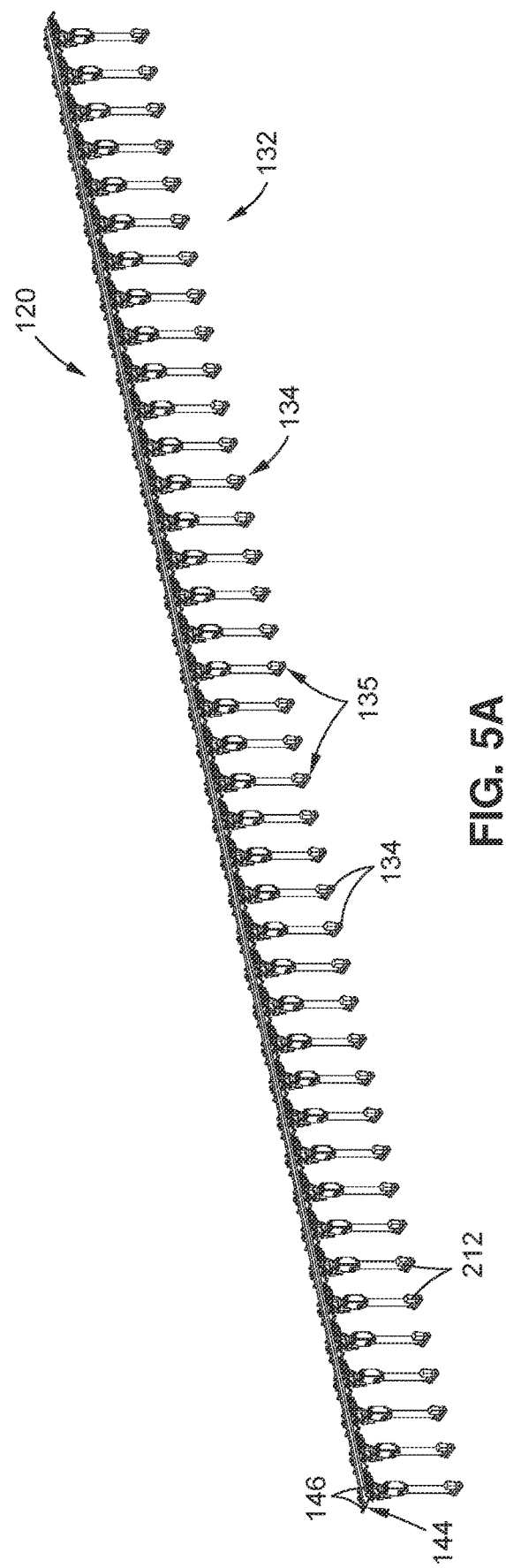
FIG. 5A is an illustration of a front perspective view of a version of a lower die assembly having a plurality of lower actuator assemblies.

Now referring to FIGS. 5A-5E, FIGS. 5A-5E show a version of the lower die assembly 120. FIG. 5A is an illustration of a front perspective view of a version of the lower die assembly 120 comprising a plurality of lower actuator assemblies 132, such as a lower pogo array 134. FIG. 5A shows a plurality of lower actuators 135, such as lower pogos 136, spaced equal distance apart, along the lower pallet 144 and the die blocks 146. In one version, as shown in FIG. 5A, each lower actuator assembly 132 includes a drive device 212 designed to increase the height of each of the lower actuators 135, or lower pogos 136. In one exemplary version, the lower pogo array 134, or lower pogo set, can apply a maximum force of 40,034 N (Newtons) (9000 lbf (pound force)).

Figure 5C:
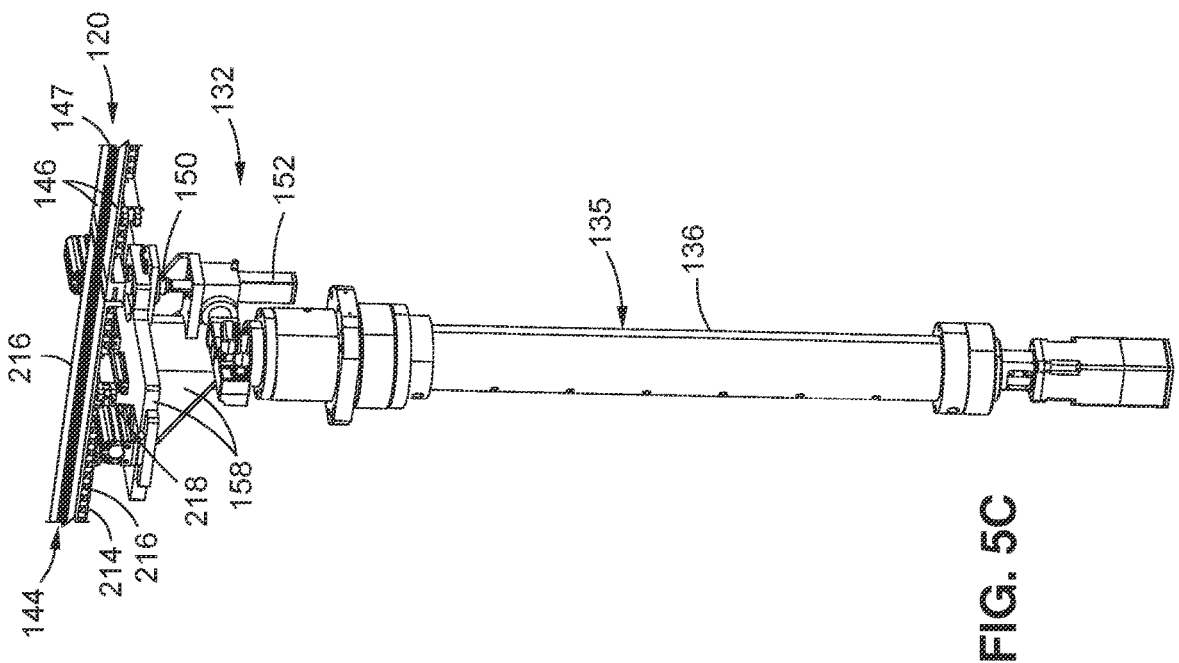
FIG. 5C is an illustration of a back perspective view of the lower actuator assembly of FIG. 5B.
Figure 5B:
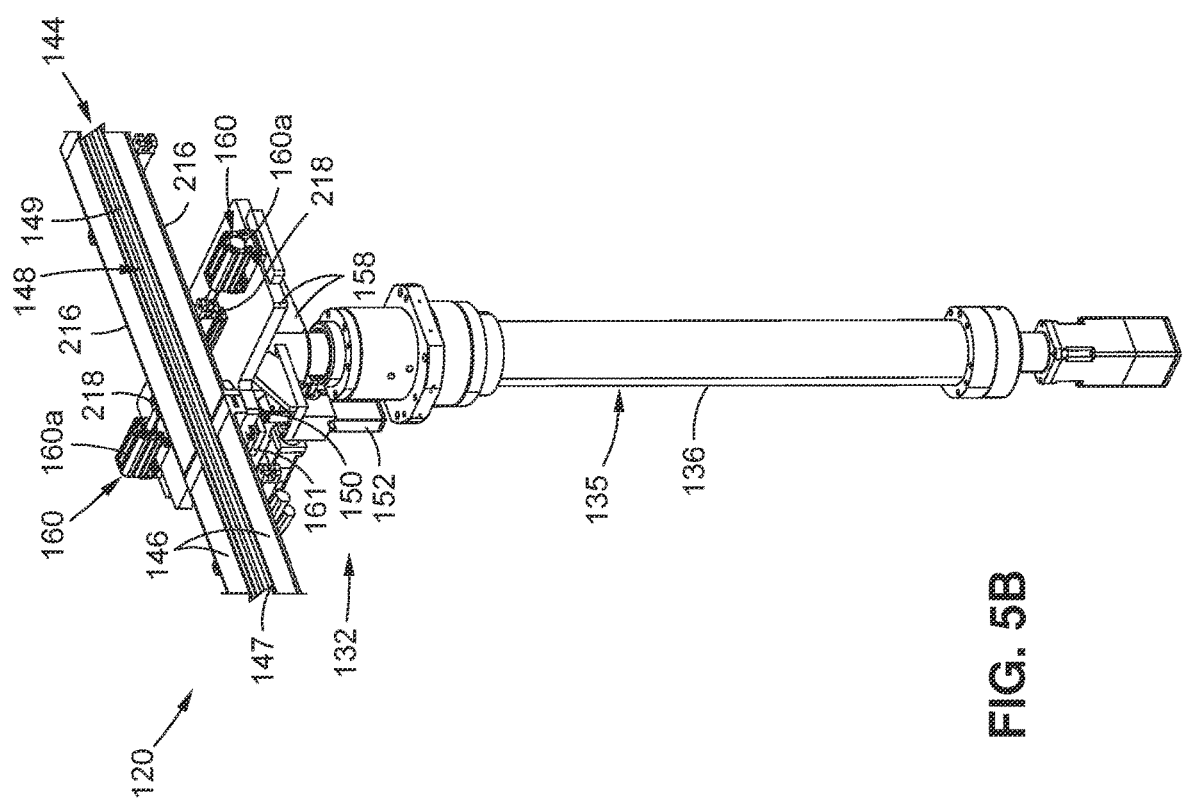
FIG. 5B is an illustration of a front perspective view of a version of a lower actuator assembly.

FIG. 5B is an illustration of a front perspective view of a version of one of the lower actuator assemblies 132 of the lower die assembly 120 of FIG. 5A. FIG. 5C is an illustration of a back perspective view of the lower actuator assembly 132 of FIG. 5B. As shown in FIGS. 5B-5C, the lower actuator assembly 132 comprises the lower actuator 135, such as the lower pogo 136. In one exemplary version, each lower actuator 135, such as the lower pogo 136, has a length of travel of 60 centimeters (23.6 inches). However, the lower actuator 135, such as the lower pogo 136, may have another suitable length of travel.

As shown in FIGS. 5B-5C, the lower die assembly 120 comprises the lower pallet 144, also referred to as the lower die, or the female die, comprising a plurality of opposing pairs of die blocks 146, or die portions, spaced apart to define the die cavity 147, and aligned in a side-by-side relationship along the length of the lower pallet 144. The die blocks 146, or die portions, are slidably displaceable with respect to each other, and are coupled to a support plate 214 (see FIGS. 5B-5C). The die blocks 146 may comprise any suitable, relatively rigid material, such as a metal, including aluminum, steel, or stainless steel, a ceramic, or another suitable relatively rigid material. The die blocks 146 generally have a rectangular cross-sectional profile. However, the die blocks 146 may have other suitable cross-sectional profile shapes. In one exemplary version, the die blocks 146 each comprise an aluminum block having a length of 15 centimeters (6 inches). The support plate 214 may comprise an aluminum material, for example, a flexible, relatively thin aluminum material. The support plate 214 may also comprise another suitable metal or flexible synthetic material. In one exemplary version, the support plate 214 has a thickness of 0.6 centimeter (0.25 inch).

In one exemplary version, the lower pallet 144 comprises a thermoplastic material having a high strength, hardness, and rigidity, such as polyoxymethylene, acetal, polyacetal, polyformaldehyde, or another suitable thermoplastic material. The lower pallet 144 may also be formed of another suitably rigid material, such as a metal, including steel and stainless steel, or another suitable metal, a ceramic, another composite material, or another suitably rigid material. The lower pallet 144 may also include one or more vacuum zones (not shown), for example, two vacuum zones, designed to create a vacuum, if needed, to facilitate holding or securing the composite charge 36 to the surface of the lower pallet 144, or lower die.

As shown in FIG. 5B, the lower die assembly 120 further comprises the presser apparatus 148, such as the cap presser apparatus 149, disposed in the die cavity 147, between the die blocks 146. The presser apparatus 148 is coupled to the presser support 150 (see FIGS. 5B-5C), and is coupled to the presser drive 152 (see FIGS. 5B-5C). The presser drive 152 is configured to move the presser apparatus 148 upwardly and downwardly. In one exemplary version, the presser support 150 has a maximum length of 10 centimeters (4 inches). However, the presser support 150 may have another suitable length.

As shown in FIGS. 5B-5C, the lower die assembly 120 further comprises the end effector main support structure 158, one or more cylinders 160, such as pneumatic cylinders 160*a*, coupled to the top of the support plate 214 and positioned on outer sides 216 of the die blocks 146. The support plate 214 may be attached to the lower pallet 144 via the bracket attachment assembly 161 (see FIG. 5B).

In one exemplary version, as shown in FIGS. 5B-5C, the lower actuator assembly 132 may comprise two cylinders 160, such as two pneumatic cylinders 160*a*, positioned opposite each other on the outer sides 216 of the die blocks 146. In other versions, the lower actuator assembly 132 may comprise two, four, six, eight, ten, or more cylinders 160, with an equal number of cylinders 160 positioned opposite each other on the outer sides 216 of the die blocks 146. The cylinders 160, such as the pneumatic cylinders 160*a*, are designed to lock and hold the position of the die blocks 146, when they are moved laterally outward during forming, and prior to the male die 96 and the upper actuator assemblies 82 and the upper die assembly 80 moving upward and away from the lower die assembly 120.

As shown in FIGS. 5B-5C, the lower die assembly 120 further comprises one or more sensors 218 positioned on the support plate 214 near the outer sides 216 of the die blocks 146. The one or more sensors 218 may comprise distance measure sensors for geometrical control of one or more components of the lower actuator assembly 132, for example, for measuring lateral movement and position of the die blocks 146. In one exemplary version, the lower actuator assembly 132 has 5 pairs of sensors 218, such as distance measure sensors, each pair positioned opposite each other near the outer sides 216 of the die blocks 146.

Figure 5E:
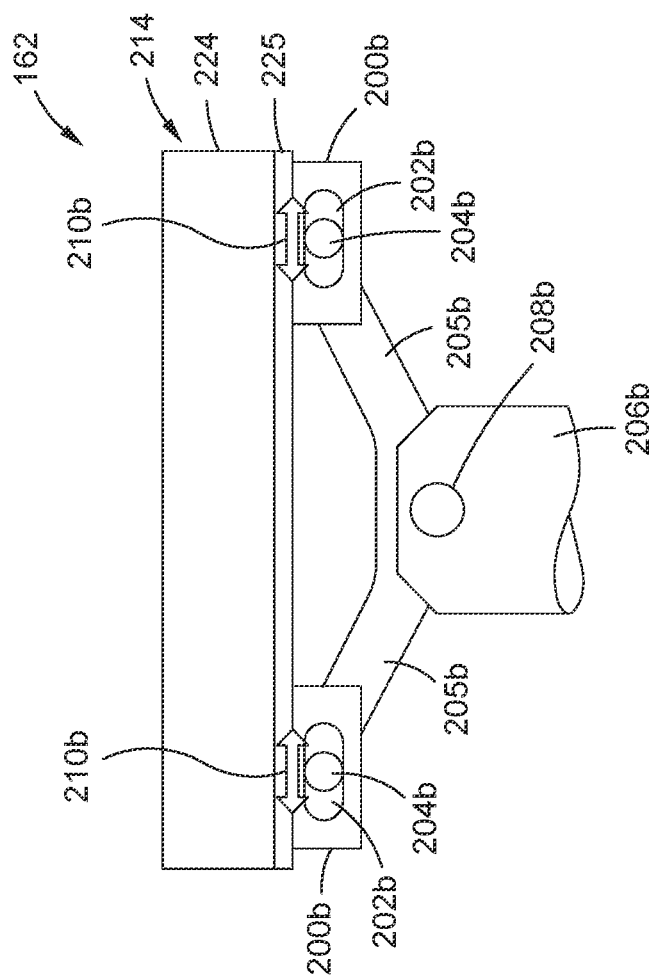
FIG. 5E is an illustration of a front view of a lower seesaw assembly that may be used in the lower actuator assembly of FIG. 5C.
Figure 5D:
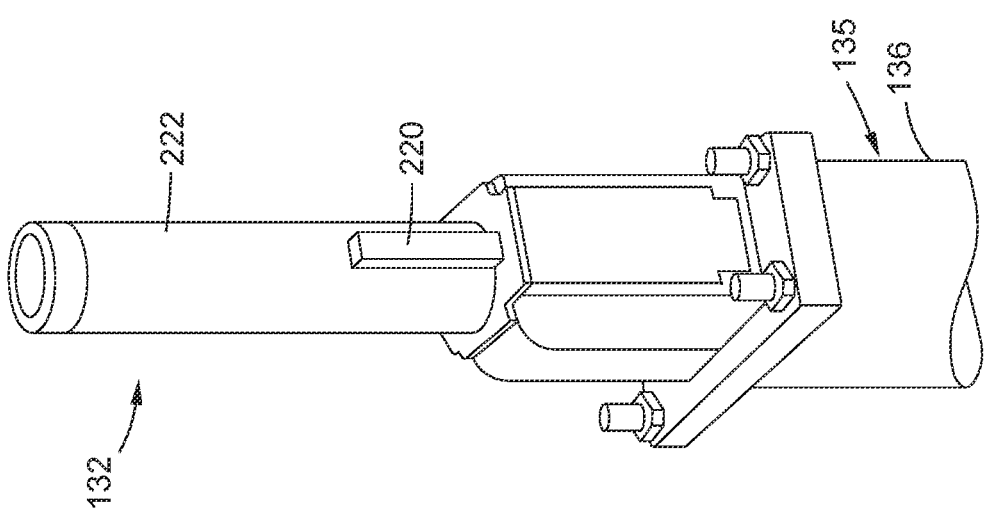
FIG. 5D is an illustration of a front perspective view of a linear guide of a lower actuator assembly.

FIG. 5D is an illustration of a front perspective view of a linear guide 220 of a lower actuator assembly 132. FIG. 5D further shows the linear guide 220 coupled to a lower pogo cylinder 222. The linear guide 220 is a static feature and is designed to maintain the alignment of the lower actuator 135, such as the lower pogo 136, and is designed to help guide the movement of, the lower actuator 135, such as the lower pogo 136. The linear guide 220 helps to maintain repeatability.

FIG. 5E is an illustration of a front view of the lower seesaw assembly 162 that may be used instead of, and in place of, one or more bracket attachment assemblies 161 (see FIGS. 4B-4C) attaching the support plate 214 (see FIG. 5B) to the lower pallet 144 (see FIG. 5B). FIG. 5E shows the lower seesaw assembly 162 comprising a pair of slotted foot elements 200b coupled, or attached, to the support plate 214. As shown in FIG. 5E, the support plate 214 comprises a first portion 224, or main portion, with a second portion 225, or support portion, attached on top of the first portion 224. Each slotted foot element 200b has a slot opening 202b (see FIG. 5E) designed to receive, and receiving, a connection element 204b (see FIG. 5E). Each connection element 204b is coupled, or attached, to a leg 205b (see FIG. 5E). As shown in FIG. 5E, the legs 205b are coupled to a bracket element 206b at a pivot point 208b. The connection elements 204b are designed to slide and rotate within the slot openings 202b in a back and forth direction 210b (see FIG. 5E).

During formation of the composite charge 36 into the contoured composite structure 16, the use of one or more lower seesaw assemblies 162 is designed to accommodate and adjust to different levels of thicknesses along the length of the composite charge 36 and is designed to accommodate and adjust to different levels of thicknesses along the length 21 (see FIG. 1) of the contoured composite structure 16 formed from the composite charge 36. The use of one or more lower seesaw assemblies 162 is designed to reduce, or minimize, the polygonal effect, discussed above.

Now referring to FIGS. 6A-6B, FIGS. 6A-6B show different versions of the presser drive 152 for the presser apparatus 148, such as the cap presser apparatus 149, to control vertical movement of the presser apparatus 148, such as the cap presser apparatus 149. FIG. 6A is an illustration of an enlarged front perspective view of the lower die assembly 120 having a pneumatically controlled presser apparatus 148a. FIG. 6B is an illustration of an enlarged front perspective view of the lower die assembly 120 having an electrically controlled presser apparatus 148b.

In one version, as shown in FIG. 6A, the presser apparatus 148, such as the pneumatically controlled presser apparatus 148a, comprises a presser drive 152 in the form of a pneumatic presser drive 152a, coupled to the presser support 150, and is coupled to the pneumatically controlled presser apparatus 148a. As shown in FIG. 6A, the pneumatic presser drive 152a controls vertical movement of the pneumatically controlled presser apparatus 148a in an up-and-down direction 226a of a z-axis of the presser apparatus 148. The pneumatic presser drive 152a controls the position of the presser apparatus 148 with a hard stop between the pneumatic presser drive 152a and the presser support 150, and is a simple design. FIG. 6A further shows the lower actuator 135, such as the lower pogo 136, the lower pallet 144, the die blocks 146, the die cavity 147, the end effector main support structure 158, the cylinders 160, such as the pneumatic cylinders 160a, and the support plate 214. The pneumatically controlled presser apparatus 148a may further comprise one or more known pneumatic components, such as one or more pneumatic air cylinders, air supply lines, an air supply source, or other suitable pneumatic components.

In another version, as shown in FIG. 6B, the presser apparatus 148, such as the electrically controlled presser apparatus 148a, comprises a presser drive 152 in the form of an electric presser drive 152b, such as a servo motor drive, coupled to the presser support 150, and is coupled to the electrically controlled presser apparatus 148b. As shown in FIG. 6B, the electric presser drive 152b controls vertical movement of the electrically controlled presser apparatus 148b in an up-and-down direction 226b of a z-axis of the presser apparatus 148. The electrically controlled presser apparatus 148b allows for different stringer geometries without any change to the hardware of the forming assembly 40, and allows for optimal positioning control. FIG. 6B further shows the lower actuator 135, such as the lower pogo 136, the lower pallet 144, the die blocks 146, the die cavity 147, the end effector main support structure 158, the cylinders 160, and the support plate 214.

Figure 7A:
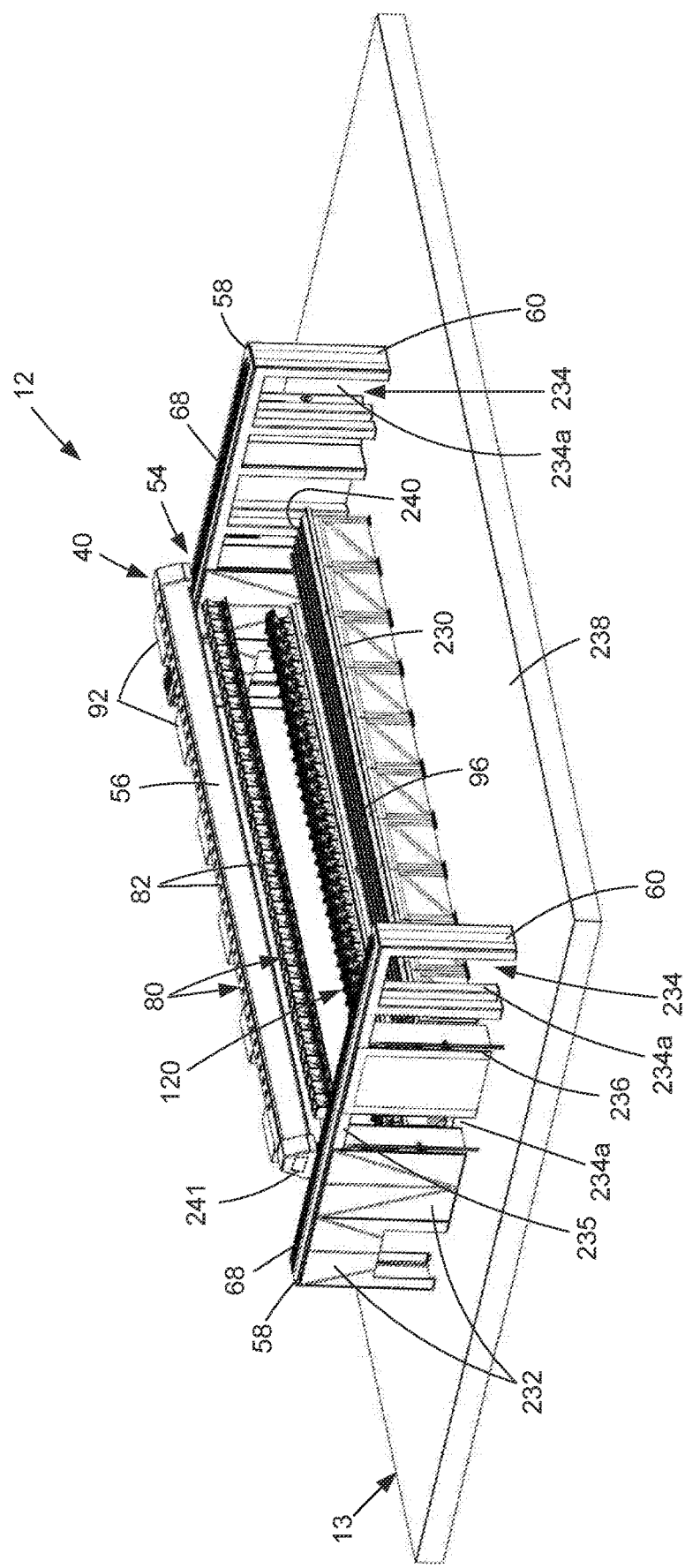
FIG. 7A is an illustration of a front perspective view of a version of a forming station of a forming system of the disclosure, including a male die table.
Figure 7B:
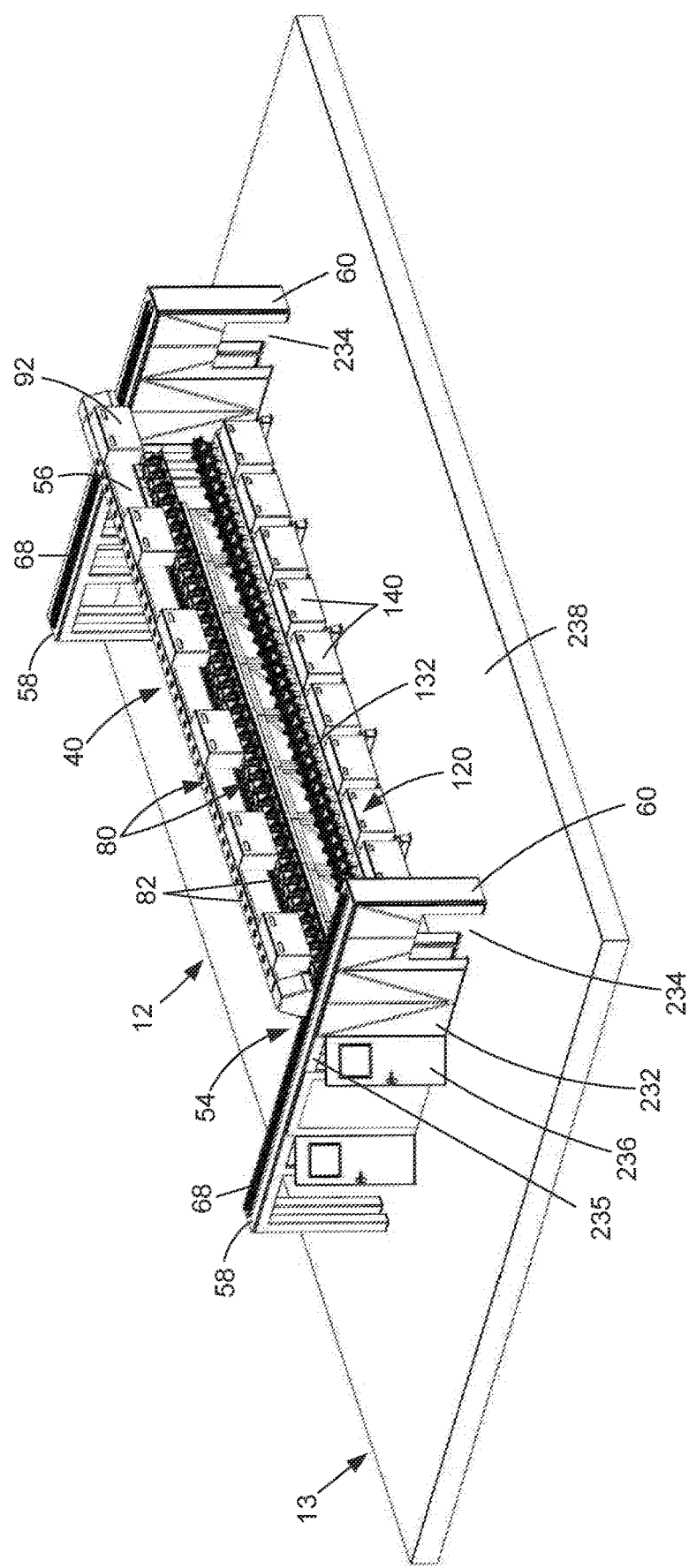
FIG. 7B is an illustration of a back perspective view of the forming station of FIG. 7A.
Figure 7C:
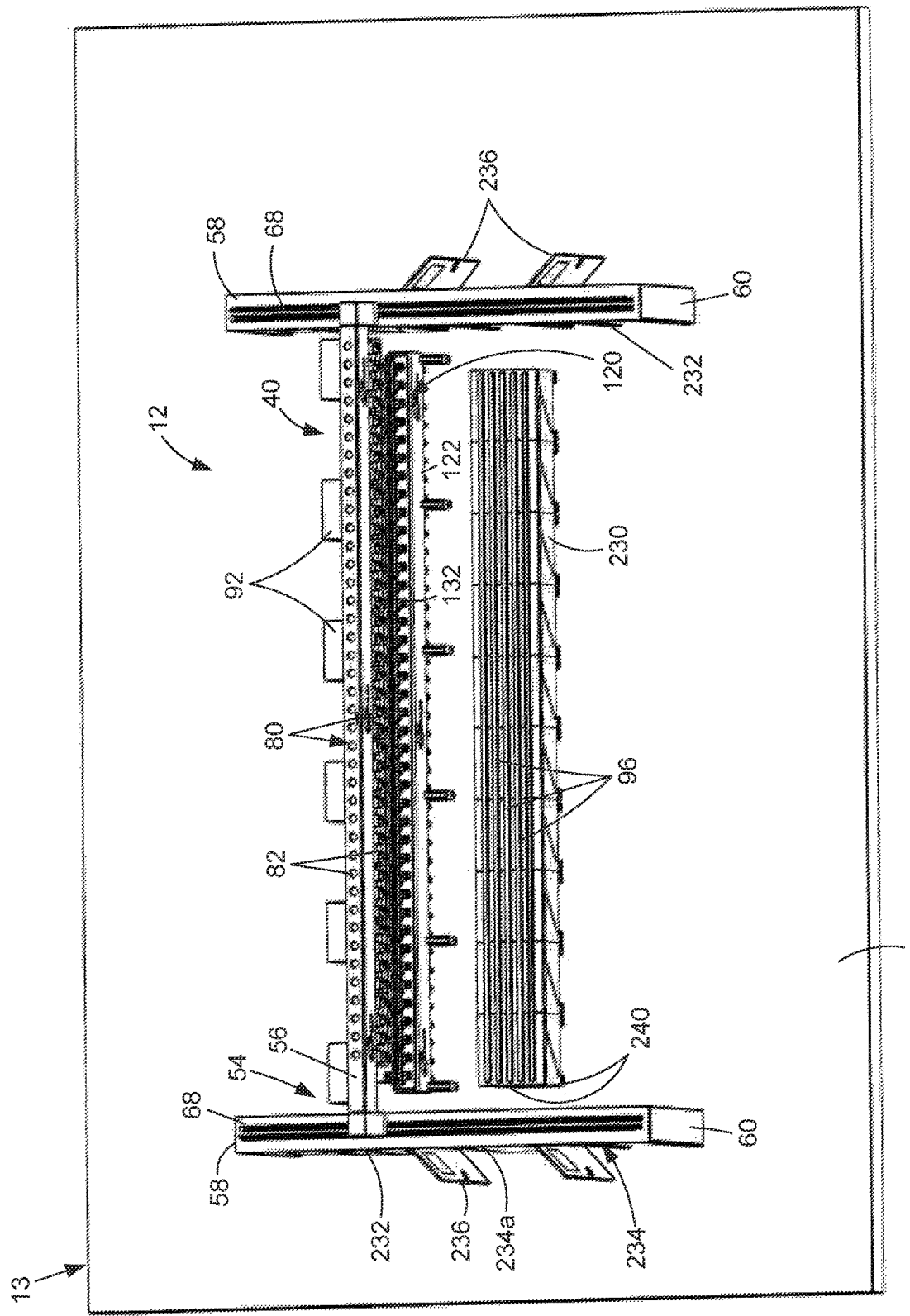
FIG. 7C is an illustration of a top view of the forming station and the male die table of FIG. 7A.

Now referring to FIGS. 7A-7C, FIGS. 7A-7C show another version of a forming station 12 of the forming system 10 (see FIG. 1) of the disclosure. FIG. 7A is an illustration of a front perspective view of a version of the forming station 12 of the forming system 10 (see FIG. 1) of the disclosure, including a male die table 230 positioned next to the forming assembly 40. FIG. 7B is an illustration of a back perspective view of the forming station 12 of FIG. 7A. FIG. 7C is an illustration of a top view of the forming station 12 and the male die table 230 of FIG. 7A.

In this version, as shown in FIGS. 7A-7C, the gantry assembly 54 further comprises wall panels 232 attached to, and/or covering the side support members 60, and the wall panels 232 have one or more openings 234, including door openings 234a, formed through the wall panels 232. The one or more door openings 234a have one or more door frames 235 (see FIGS. 7A-7B) with one or more doors 236 attached to the door frames 235. The doors 236 are designed to open and close, for entry into and out of, the sides of the forming station 12, or forming cell, area. FIGS. 7A-7C further show the bottoms of the wall panels 232 and the side support members 60 fixed to a floor 238.

FIGS. 7A and 7C further show a version of the male die table 230 with five male dies 96, where each male die 96 is held in a male die cradle holder 240 coupled to, or placed on, the top surface of the male die table 230. In one version, the forming system 10 has a capacity for five male dies 96, and the male die table 230 has five male die cradle holders 240. In other versions, the forming system 10 may have a capacity for less than five male dies 96, or more than five male dies 96. In one version, the upper die assembly 80 of the forming system 10 is capable of automatically releasing a male die 96 from the upper die assembly 80 onto the male die table 230, and automatically picking up another male die 96 for use in the upper die assembly 80. In this version, the movable upper crossbeam 56 may include a vacuum system 241 (see FIG. 7A) coupled to, or within, the movable upper crossbeam 56, and coupled to the upper die assembly 80. The vacuum system 241 may comprise one or more of vacuum lines, a vacuum, a vacuum source, a vacuum power supply, and other suitable vacuum system components. The vacuum system 241 creates a vacuum suction force that allows the upper die assembly 80 to pick up and hold a male die 96, and when the vacuum is turned off and the vacuum suction force is stopped, the upper die assembly 80 releases the male die 96 onto the male die table 230, such as into the male die cradle holder 240. The movable upper crossbeam 56 allows the upper die assembly 80 to move along the tracks 68 of the side beams 58 to move over and away from the male die table 230. In another version, a pick-and-place device 44 (see FIGS. 1, 8B), such as the two-dimensional pick-and-place device 45 (see FIG. 1), or the three-dimensional pick-and-place device 46 (see FIG. 1), of the pick-and-place assembly 42 (see FIG. 1), may be used to pick up and release a male die 96, if a change of male dies 96 is desired. As shown in FIGS. 7A and 7C, the male die table 230 is positioned between the gantry assembly 54, including between the wall panels 232 and the doors 236, of the forming station 12 and next to the front of the lower die assembly 120 of the forming assembly 40. The use of multiple male dies 96 accommodates different shapes and configurations of the contoured composite structures 16, such as the stringers 24, to be formed.

FIGS. 7A-7C further show the gantry assembly 54 comprising the movable upper crossbeam 56 movably coupled to the pair of side beams 58 mounted on the plurality of side support members 60, and mounted at the top of the wall panels 232 and door frames 235. Each of the pair of side beams 58 has one or more tracks 68 (see FIGS. 7A-7C) extending along the length 70 (see FIG. 2A) of each side beam 58. FIGS. 7A-7C further show the upper die assembly 80 with the plurality of upper actuator assemblies 82, and the upper control cabinets 92. FIGS. 7A-7C further show the lower die assembly 120 with the plurality of lower actuator assemblies 132, and the lower control cabinets 140 (see FIG. 7B) of the forming assembly 40.

Figure 8A:
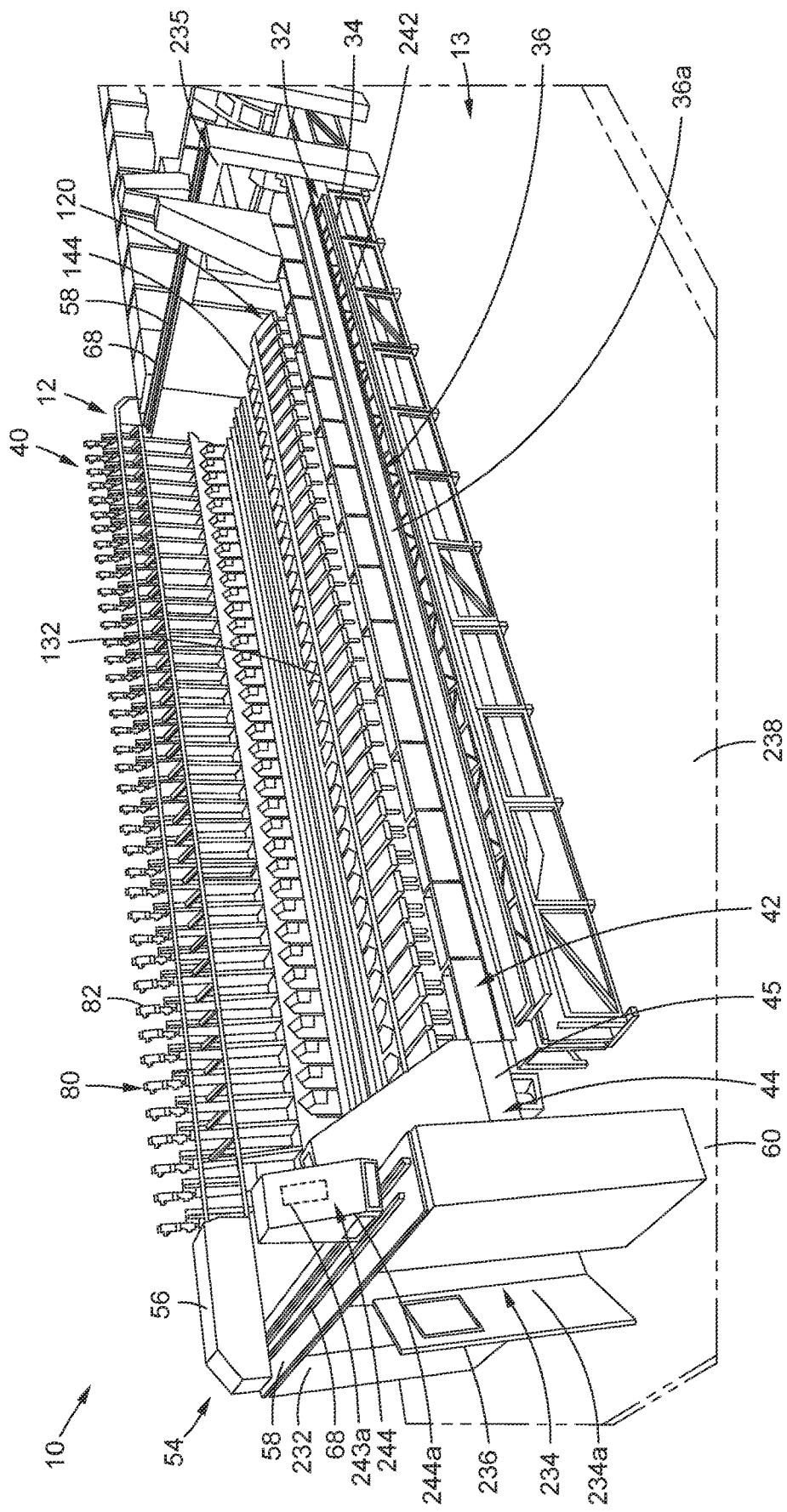
FIG. 8A is an illustration of a front perspective view of a version of a forming system of the disclosure showing a forming assembly and a receiving assembly.
Figure 8B:
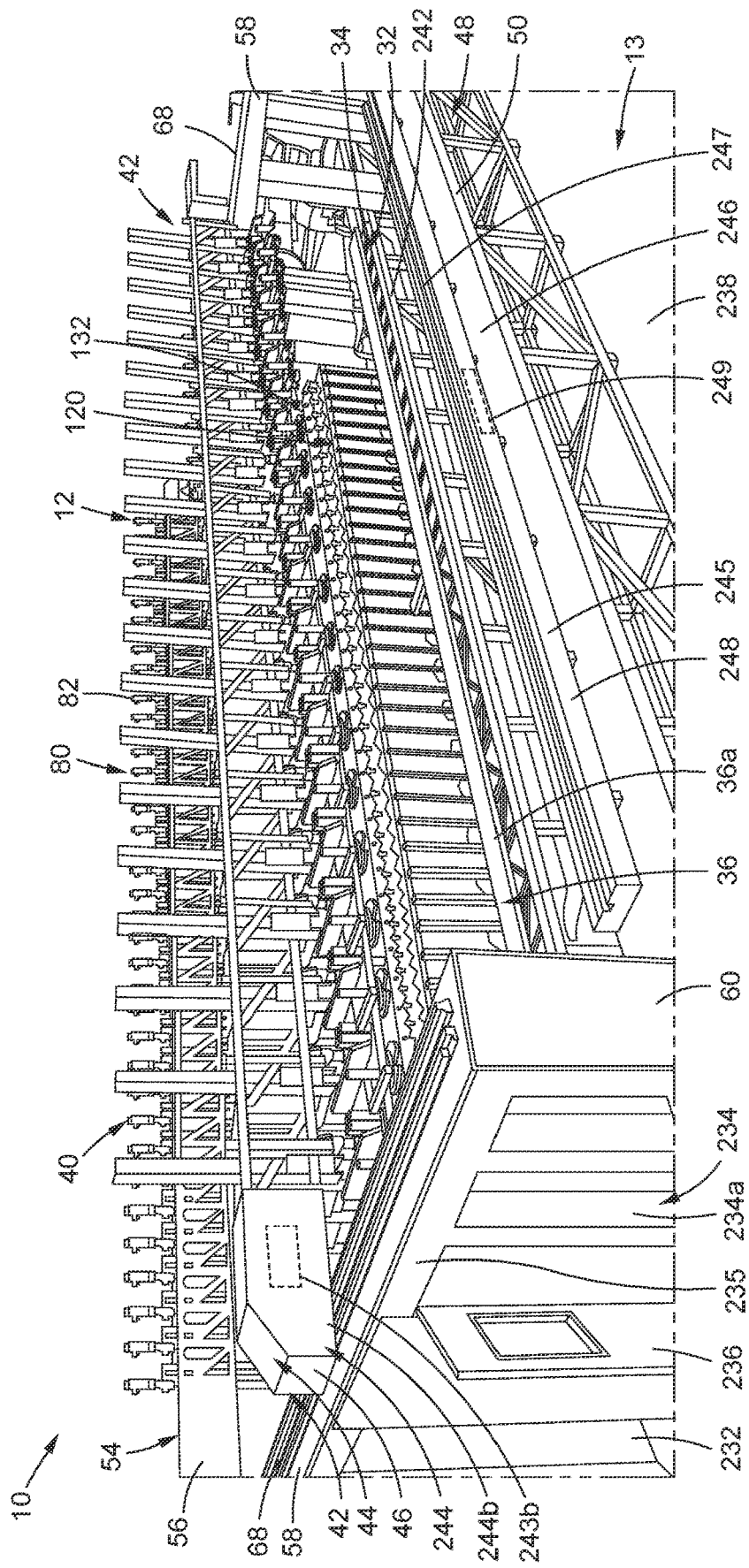
FIG. 8B is an illustration of a front perspective view of a version of a forming system of the disclosure showing the forming assembly and the receiving assembly of FIG. 8A, and also showing a tray assembly.
Figure 8C:
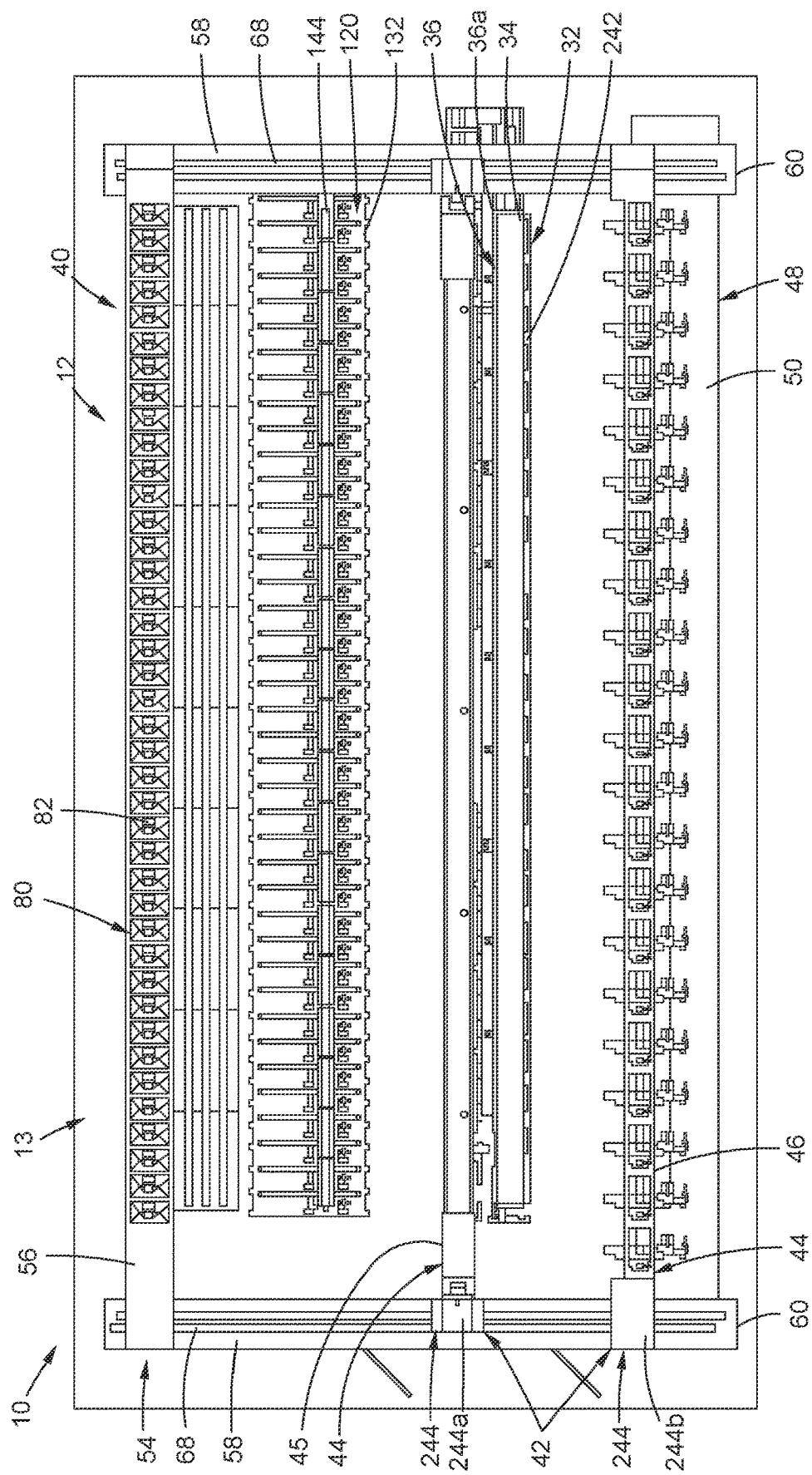
FIG. 8C is an illustration of a top view of the forming system of FIG. 8B, showing the forming assembly, the receiving assembly, and the tray assembly.

Now referring to FIGS. 8A-8C, FIGS. 8A-8C show a version of the forming system 10 with the receiving assembly 34, the forming assembly 40, including the pick-and-place assembly 42, and the tray assembly 50. FIG. 8A is an illustration of a front perspective view of a version of the forming system 10 of the disclosure showing the forming station 12 having the forming assembly 40, including a pick-and-place device 44, such as in the form of a two-dimensional pick-and-place device 45, and the receiving station 32 having the receiving assembly 34. FIG. 8B is an illustration of a front perspective view of the forming system 10 of the disclosure showing the forming station 12 having the forming assembly 40, including the pick-and-place assembly 42, showing the receiving station 32 having the receiving assembly 34, and showing the tray station 48 having the tray assembly 50. FIG. 8C is an illustration of a top view of the forming system 10 of FIG. 8B, showing the forming station 12 having the forming assembly 40, including the pick-and-place assembly 42, showing the receiving station 32 having the receiving assembly 34, and showing the tray station 48 having the tray assembly 50.

As shown in FIGS. 8A-8B, similar to the version shown in FIG. 7A, the gantry assembly 54 further comprises wall panels 232 attached to, and/or covering the side support members 60, and the wall panels 232 have one or more openings 234, including door openings 234a, formed through the wall panels 232. The one or more door openings 234a have one or more door frames 235 (see FIGS. 8A-8B) with one or more doors 236 attached to the door frames 235. The doors 236 are designed to open and close, for entry into and out of, the forming station 12 area. FIGS. 8A-8C further show the bottoms of the wall panels 232 and the side support members 60 fixed to the floor 238.

FIGS. 8A-8C further show the gantry assembly 54 comprising the movable upper crossbeam 56 movably coupled to the pair of side beams 58 mounted on the plurality of side support members 60 and mounted at the top of the wall panels 232 and the door frames 235. Each of the pair of side beams 58 has one or more tracks 68 (see FIGS. 8A-8C) extending along the length 70 (see FIG. 2A) of each side beam 58. FIGS. 8A-8C further show the upper die assembly 80 with the plurality of upper actuator assemblies 82, and the lower die assembly 120 with the plurality of lower actuator assemblies 132 and the lower pallet 144, of the forming assembly 40.

FIG. 8A further shows the male die table 230 with five male dies 96, where each male die 96 is held in the male die cradle holder 240 coupled to the top surface of the male die table 230. As shown in FIG. 8A, the male die table 230 is positioned between the gantry assembly 54, including between the wall panels 232 and the doors 236, of the forming station 12, and next to the front of the lower die assembly 120 of the forming assembly 40.

FIGS. 8A-8C further show the receiving station 32 with the receiving assembly 34 between the gantry assembly 54, including between the side support members 60 and the wall panels 232, and positioned next to the forming assembly 40. As shown in FIGS. 8A-8C, the receiving assembly 34 comprises a receiving table 242 designed to hold, and holding, a composite charge 36, such as a flat composite charge 36a, to be formed into the contoured composite structure 16 (see FIG. 1), such as a stringer 24 (see FIG. 1), with the forming assembly 40. The receiving table 242 is used to receive the composite charge 36 delivered from the lamination station 38 (see FIG. 1), or the trimming station 39 (see FIG. 1), or from another station, to the receiving station 32, prior to forming at the forming station 12.

The forming assembly 40 comprises one or more pick-and-place devices 44 (see FIGS. 1, 8A-8C) coupled to the gantry assembly 54. As shown in FIG. 8C, the forming assembly 40 comprises two pick-and-place devices 44 movably coupled to the gantry assembly 54, and the pick-and-place devices 44 comprise the two-dimensional pick-and-place device 45 and the three-dimensional pick-and-place device 46. The pick-and-place devices 44 are movably coupled to the gantry assembly 54 for moving either the composite charge 36, or the contoured composite structure 16, between stations during the forming process. In operation, the composite charge 36, such as the flat composite charge 36a, is delivered to the receiving station 32 within the forming system 10, or forming cell. The pick-and-place device 44s (see FIGS. 8A, 8C), such as either the two-dimensional pick-and-place device 45 (see FIGS. 8A, 8C), or the three-dimensional pick-and-place device 46 (see FIGS. 8B, 8C), may be used to transfer the composite charge 36, such as the flat composite charge 36a, from the lamination station 38 (see FIG. 1), or the trimming station 39 (see FIG. 1), or from another station, to the receiving station 32.

When the composite charge 36, such as the flat composite charge 36a, is ready for forming with the forming assembly 40, the composite charge 36, such as the flat composite charge 36a, is automatically picked up from the receiving table 242, with the pick-and-place device 44 (see FIGS. 8A, 8C), such as the two-dimensional pick-and-place device 45 (see FIGS. 8A, 8C), of the pick-and-place assembly 42 (see FIGS. 8A, 8C), and moved, or transferred, to the lower die assembly (see FIG. 8A), and in particular, to the lower pallet 144 (see FIG. 8A) of the lower die assembly 120 (see FIG. 8A). Alternatively, the composite charge 36, such as the flat composite charge 36a, may be automatically picked up from the receiving table 242, with the three-dimensional pick-and-place device 46 (see FIGS. 1, 8B, 8C), and moved, or transferred, to the lower pallet 144 of the lower die assembly 120. As shown in FIGS. 8A and 8C, the pick-and-place device 44, such as the two-dimensional pick-and-place device 45, is movably coupled to the pair of side beams 58 of the gantry assembly 54, via a pick-and-place movable beam 244, such as a two-dimensional pick-and-place movable beam 244a. The two-dimensional pick-and-place movable beam 244a preferably has a vacuum system 243a (see FIG. 8A) coupled to, or within, the two-dimensional pick-and-place movable beam 244a. The vacuum system 243a may comprise one or more of vacuum lines, a vacuum, a vacuum source, a vacuum power supply, and other suitable vacuum system components. The vacuum system 243a creates a vacuum suction force that allows the two-dimensional pick-and-place movable beam 244a to pick up and hold the composite charge 36, such as the flat composite charge 36a, during moving and transfer between stations, and when the vacuum is turned off and the vacuum suction force is stopped, the two-dimensional pick-and-place movable beam 244a releases the composite charge 36, such as the flat composite charge 36a. The tracks 68 on the side beams 58 are designed to guide the two-dimensional pick-and-place movable beam 244a within the forming system 10, or forming cell.

As shown in FIGS. 8B-8C, the forming assembly 40 further comprises the pick-and-place device 44, such as the three-dimensional pick-and-place device 46. As shown in FIGS. 8B-8C, the three-dimensional pick-and-place device 46 is movably coupled to the pair of side beams 58 of the gantry assembly 54, via a pick-and-place movable beam 244, such as a three-dimensional pick-and-place movable beam 244b. The tracks 68 on the side beams 58 are designed to guide the three-dimensional pick-and-place movable beam 244b within the forming system 10, or forming cell.

The three-dimensional pick-and-place movable beam 244b preferably has a vacuum system 243b (see FIG. 8B) coupled to, or within, the three-dimensional pick-and-place movable beam 244b. The vacuum system 243b may comprise one or more of vacuum lines, a vacuum, a vacuum source, a vacuum power supply, and other suitable vacuum system components. The vacuum system 243b creates a vacuum suction force that allows the three-dimensional pick-and-place movable beam 244b to pick up and hold the composite charge 36, such as the flat composite charge 36a, during moving and transfer between stations, and also allows the three-dimensional pick-and-place movable beam 244b to pick up and hold the contoured composite structure 16 formed by the composite charge 36, after the forming process, during moving and transfer between stations. When the vacuum is turned off and the vacuum suction force is stopped, the three-dimensional pick-and-place movable beam 244b releases the composite charge 36 onto the receiving assembly 34 or onto the lower pallet 144 of the lower die assembly 80, or releases the contoured composite structure 16, onto the tray assembly 50.

The three-dimensional pick-and-place device 46 couples to the contoured composite structure 16 (see FIG. 1), such as the stringer 24 (see FIG. 1), holding the defined shape, or curved configuration 22 (see FIG. 1), of the contoured composite structure 16, such as the stringer 24, and the three-dimensional pick-and-place device 46 delivers the contoured composite structure 16, such as the stringer 24, to the tray station 48 (see FIG. 8B), and releases the contoured composite structure 16, such as the stringer 24, onto the tray assembly 50 (see FIG. 8B), such as onto the kitting tray 245 (see FIG. 8B). The kitting tray 245 is moved out of, and away from, the forming station 12, or the forming cell, for further processing of the contoured composite structure 16, such as the stringer 24, at one or more processing stations 52 (see FIG. 1).

As shown in FIGS. 8B-8C, the tray assembly 50 comprises a kitting tray 245 positioned on a kitting tray table 246. The tray assembly 50, including the kitting tray 245, of the tray station 48, is designed to receive the contoured composite structure 16 from the three-dimensional pick-and-place device 46. As shown in FIG. 8B, the kitting tray 245 comprises a contoured top 247, a support structure 248, and a vacuum system 249 coupled to, or within, the kitting tray 245. The vacuum system 249 may comprise one or more of vacuum lines, a vacuum, a vacuum source, a vacuum power supply, and other suitable vacuum system components. In one version, the kitting tray 245 may have an integrated vacuum system with ports (not shown) on each side, and vacuum lines (not shown) are connected through a single port on one end.

Figure 9:
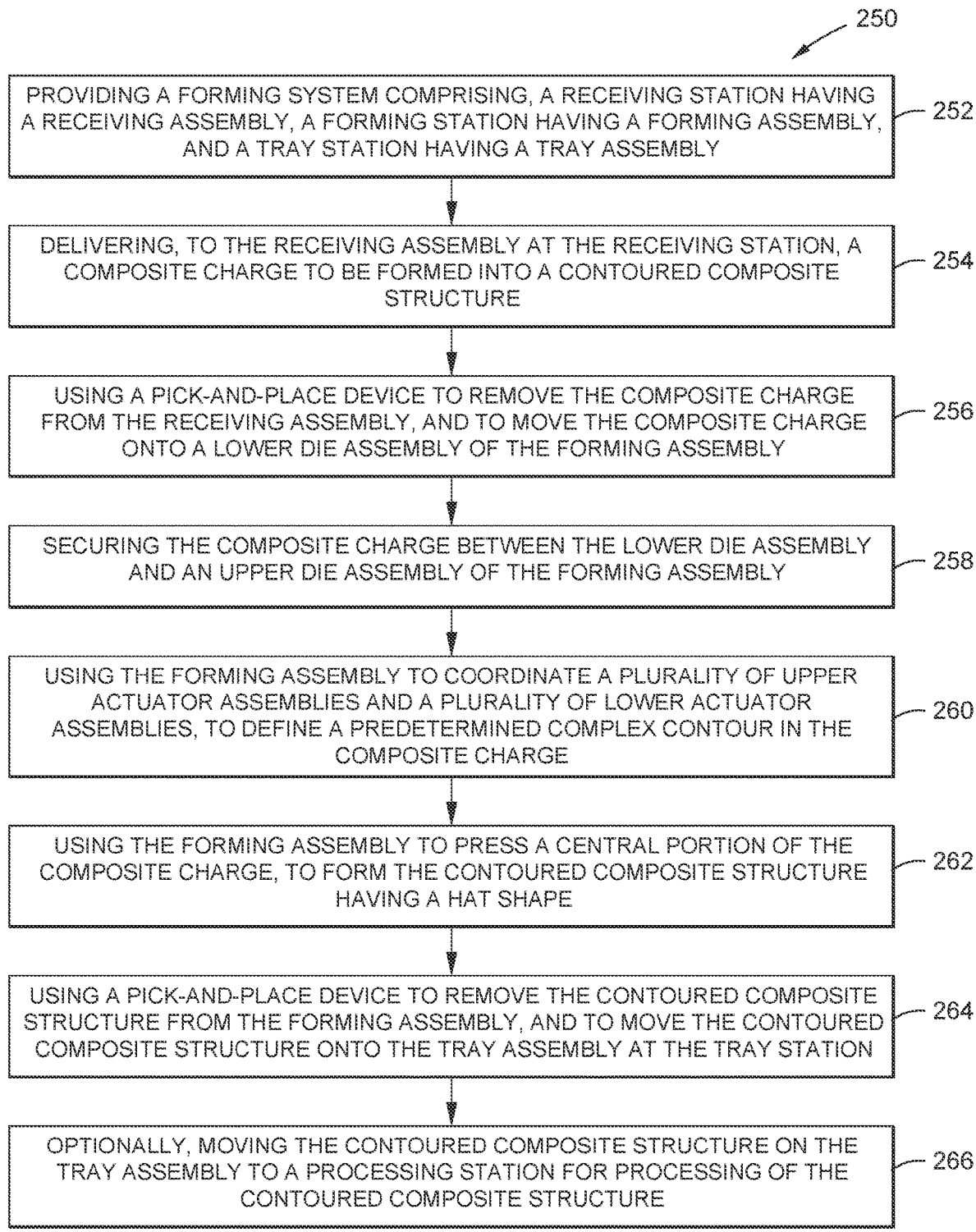
FIG. 9 is an illustration of a flow diagram of a version of a method of the disclosure.

Now referring to FIG. 9, FIG. 9 is an illustration of a flow diagram of a version of a method 250 of the disclosure. As shown in FIG. 9, there is provided a method 250 for forming a contoured composite structure 16 (see FIGS. 1, 13), such as a stringer 24 (see FIG. 1), such as a hat-shaped stringer 26 (see FIGS. 1, 13) having a hat shape 268 (see FIG. 13). Preferably, the method 250 is an automated method.

The blocks in FIG. 9 represent operations and/or portions thereof, or elements, and lines connecting the various blocks do not imply any particular order or dependency of the operations or portions thereof, or elements. FIG. 9 and the disclosure of the steps of the method 250 set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

As shown in FIG. 9, the method 250 comprises the step of providing 252 a forming system 10, or forming cell, as discussed in detail above. The forming system 10 comprises the receiving station 32 (see FIGS. 1, 8A) having the receiving assembly 34 (see FIGS. 1, 8A). The receiving assembly 34 comprises the receiving table 242 (see FIGS. 8A-8C) holding the composite charge 36, such as the flat composite charge 36a, to be formed into the contoured composite structure 16 (see FIG. 1), such as a stringer 24 (see FIG. 1). The receiving table 242 is used to transfer the composite charge 36 from the lamination station 38 (see FIG. 1), or the trimming station 39 (see FIG. 1), or from another station, to the forming station 12.

The forming system 10 further comprises the forming station 12 (see FIGS. 1, 8A) having the forming assembly 40 (see FIGS. 1, 2A, 7A, 8A). The forming assembly 40 comprises the gantry assembly 54 (see FIGS. 1, 2A, 7A, 8A). The gantry assembly 54 (see FIGS. 2A, 7A, 8A) comprises the movable upper crossbeam 56 movably coupled to the pair of side beams 58, such as side support beams, mounted on the plurality of side support members 60, for example, in the form of vertically oriented columns or supports, or side support members 60 having wall panels 232 (see FIG. 7A) and doors 236 (see FIG. 7A). The movable upper crossbeam 56 is generally horizontally oriented and generally transversely oriented to the side beams 58 and is generally perpendicularly oriented to the side support members 60. The plurality of side support members 60 are fixed in place.

Each of the pair of side beams 58 has one or more tracks 68 (see FIGS. 2A, 7A, 8A) extending along the length 70 (see FIG. 2A) of each side beam 58. The movable upper crossbeam 56 includes a movable carriage 74 (see FIGS. 3A-3B), that may move the movable upper crossbeam 56 with the pinion-rack system 76 (see FIGS. 3A-3B), or another suitable mechanism. The movable carriage 74 is controlled with one or more servo engines 78 (see FIGS. 3A-3B).

The forming assembly 40 further comprises the upper die assembly 80 (see FIGS. 2A, 7A, 8A) movably coupled to the gantry assembly 54, and in particular, movably coupled to, and supported by, the movable upper crossbeam 56, of the gantry assembly 54. The upper die assembly 80 comprises the plurality of upper actuator assemblies 82 (see FIG. 2A), for example, in the form of the upper pogo array 84 (see FIG. 2A), or upper pogo set, comprising the plurality of upper actuators 86 (see FIG. 2A), such as in the form of upper pogos 88 (see FIG. 2A). The plurality of upper actuator assemblies 82 are controlled with one or more upper controllers 90 (see FIG. 2A) housed in upper control cabinets 92 (see FIG. 2A) coupled to the side 94 (see FIG. 2A) of the movable upper crossbeam 56. The plurality of upper actuator assemblies 82 are coupled to a pair of lateral pressure plates 106 (see FIGS. 4A-4C). The upper die assembly 80 further comprises the male die 96 (see FIGS. 4A-4C) disposed between the pair of lateral pressure plates 106.

The forming assembly 40 further comprises the lower die assembly 120 (see FIGS. 2A, 7A, 8A) coupled to a floor support beam 122 (see FIG. 2A) positioned between the side support members 60 (see FIG. 2A) of the gantry assembly 54 (see FIG. 2A). The lower die assembly 120 comprises a plurality of lower actuator assemblies 132 (see FIG. 2A) coupled to a lower pallet 144 (see FIG. 2A) having a presser apparatus 148 (see FIGS. 2E, 5B) disposed between pairs of die blocks 146 (see FIGS. 2E, 5G). The upper die assembly 80 is separate from, and independently movable with respect to, the lower die assembly 120. The plurality of lower actuator assemblies 132 are, for example, in the form of a lower pogo array 134 (see FIGS. 2A-2G), or lower pogo set, comprising a plurality of lower actuators 135 (see FIGS. 2C, 2D, 2F, 2G), such as in the form of lower pogos 136 (see FIGS. 2C, 2D, 2F, 2G). The plurality of lower actuator assemblies 132 are controlled with one or more lower controllers 138 (see FIG. 2A) housed in lower control cabinets 140 (see FIG. 2A) coupled to a side 142 (see FIG. 2A) of the floor support beam 122.

As shown in FIGS. 2C and 2E, the lower die assembly 120 further comprises the lower pallet 144, also referred to as a lower die, or a female die. The lower pallet 144 comprises the plurality of opposing pairs of die blocks 146 (see FIG. 2E), each pair of die blocks 146 spaced apart to define a die cavity 147 (see FIG. 2C). The die blocks 146 are slidably displaceable with respect to each other along the length of the lower pallet 144. As shown in FIGS. 2C and 2E, the presser apparatus 148, such as the cap presser apparatus 149, is coupled to the lower die assembly 120, and is disposed in the die cavity 147 and disposed between the pairs of die blocks 146. The presser apparatus 148 is coupled to the presser support 150 (see FIG. 2E), and is coupled to the presser drive 152 (see FIG. 2E) configured to move the presser apparatus 148 upwardly and downwardly.

The forming assembly 40 further comprises one or more pick-and-place devices 44 (see FIGS. 1, 8A-8C) movably coupled to the movable upper crossbeam 56 of the gantry assembly 54. The one or more pick-and-place devices 44 are designed to pick up and move the composite charge 36, and the contoured composite structure 16 formed from the composite charge 36. The forming system 10 further comprises the tray station 48 having the tray assembly 50, such as in the form of a kitting tray 245 (see FIG. 8B) designed to receive the contoured composite structure 16 from the forming station 12.

As shown in FIG. 9, the method 250 further comprises delivering 254 to the receiving assembly 34 at the receiving station 32, a composite charge 36, such as a flat composite charge 36a, to be formed into the contoured composite structure 16, such as a stringer 24, for example, an aircraft stringer 28, having a complex curved configuration 22a (see FIG. 1).

As shown in FIG. 9, the method 250 further comprises using 256 one of the one or more pick-and-place devices 44 to remove the composite charge 36 from the receiving assembly 34, and to move the composite charge 36 onto the lower die assembly 120, and in particular, onto the lower pallet 144 of the lower die assembly 120 of the forming assembly 40.

Using 256 one of the one or more pick-and-place devices 44 to remove the composite charge 36 from the receiving assembly 34, and to move the composite charge 36 to the lower die assembly 120, further comprises using 256 one of the one or more pick-and-place devices 44 comprising one of, the two-dimensional pick-and-place device 45 (see FIG. 8A) movably coupled to the gantry assembly 54, via the two-dimensional pick-and-place movable beam 244a (see FIG. 8A), or the three-dimensional pick-and-place device 46 (see FIG. 8B) movably coupled to the gantry assembly 54, via the three-dimensional pick-and-place movable beam 244b (see FIG. 8B).

The composite charge 36, such as a flat composite charge 36a, may be automatically moved, or transferred, from the receiving table 242, with the pick-and-place device 44 (see FIGS. 8A, 8C), such as the two-dimensional pick-and-place device 45 (see FIGS. 8A, 8C), of the pick-and-place assembly 42 (see FIGS. 8A, 8C), to the lower pallet 144 (see FIG. 8A) of the lower die assembly 120 (see FIG. 8A). The pick-and-place device 44 (see FIGS. 8A, 8C), such as the two-dimensional pick-and-place device 45 (see FIGS. 8A, 8C), is movably coupled to the pair of side beams 58 of the gantry assembly 54, via the pick-and-place movable beam 244, such as the two-dimensional pick-and-place movable beam 244a (see FIGS. 8A, 8C). Alternatively, the composite charge 36, such as the flat composite charge 36a, may be automatically moved, or transferred, from the receiving table 242, with the three-dimensional pick-and-place device 46 (see FIGS. 1, 8B, 8C). The pick-and-place device 44 (see FIGS. 8B, 8C), such as the three-dimensional pick-and-place device 46 (see FIGS. 8B, 8C), is movably coupled to the pair of side beams 58 of the gantry assembly 54, via the pick-and-place movable beam 244, such as the three-dimensional pick-and-place movable beam 244b (see FIGS. 8B, 8C).

As shown in FIG. 9, the method 250 further comprises securing 258 the composite charge 36 between the lower die assembly 120, and in particular, the lower pallet 144 of the lower die assembly 120, and the upper die assembly 80, in particular, the male die 96 of the upper die assembly 80.

As shown in FIG. 9, the method 250 further comprises using 260 the forming assembly 40 to coordinate the plurality of upper actuator assemblies 82 and the plurality of lower actuator assemblies 132, to define a predetermined complex contour 20b in the composite charge 36. Using 260 the forming assembly 40 to coordinate the plurality of upper actuator assemblies 82 and the plurality of lower actuator assemblies 132, further comprises using the forming assembly 40 to coordinate the plurality of upper actuator assemblies 82 comprising an upper pogo array 84 (see FIG. 4A), and the plurality of lower actuator assemblies 132 comprising a lower pogo array 134 (see FIG. 5A), the upper pogo array 84 comprising a plurality of upper pogos 88, each having one or more upper seesaw assemblies 108 (see FIG. 4E), and the lower pogo array 134 comprising a plurality of lower pogos 136, each having one or more lower seesaw assemblies 162 (see FIG. 5E).

As shown in FIG. 9, the method 250 further comprises using 262 the forming assembly 40 to press a central portion 294 (see FIG. 10D) of the composite charge 36, to form, with the male die 96, the contoured composite structure 16 having the hat shape 268. Using 262 the forming assembly 40 to press the central portion 294 of the composite charge 36, to form the contoured composite structure 16, further comprises using 262 the forming assembly 40 to press the central portion 294 of the composite charge 36, to form the contoured composite structure 16 comprising one of, a stringer 24 (see FIG. 1), a hat-shaped stringer 26 (see FIGS. 1, 13), an aircraft stringer 28 (see FIG. 1), a spar 30 (see FIG. 1), or another suitable contoured composite structure.

As shown in FIG. 9, the method 250 further comprises using 264 one of the one or more pick-and-place devices 44 to remove the contoured composite structure 16 from the lower die assembly 120, and particularly, from the lower pallet 144 of the lower die assembly 120 of the forming assembly 40, and to pick up and move the contoured composite structure 16 onto the tray assembly 50, such as the kitting tray 245 (see FIG. 8B), at the tray station 48, and to release the contoured composite structure onto the tray assembly 50, such as the kitting tray 245. Using 264 one of the one or more pick-and-place devices 44 to remove the contoured composite structure 16 from the lower die assembly 120, and to pick up and move the contoured composite structure 16 onto the tray assembly 50, further comprises using 264 one of the one or more pick-and-place devices 44 comprising the three-dimensional pick-and-place device 46 (see FIGS. 8A, 8C) movably coupled to the gantry assembly 54, via the three-dimensional pick-and-place movable beam 244b (see FIG. 8C). The three-dimensional pick-and-place device 46 is designed to hold the contoured composite structure 16, and is designed to maintain the hat shape 268 of the contoured composite structure 16.

As shown in FIG. 9, the method 250 further optionally comprises moving 266 the contoured composite structure 16 on the tray assembly 50 to a processing station 52 (see FIG. 1), for processing of the contoured composite structure 16 with one or more post-forming processes, for example, compaction, tooling, trimming, or other suitable post-forming processes.

Now referring to FIGS. 10A-10H, FIG. 10A-10H show various steps of an exemplary forming process 270 using the forming assembly 40 (see FIGS. 1, 2A, 7A, 8A), as disclosed herein, to form a contoured composite structure 16 (see FIG. 10H), such as a stringer 24 (see FIG. 10H), for example, a hat-shaped stringer 26 (see FIG. 10H). The forming process 270 is automated and preferably comprises a cold forming process 272. The control system 168 (see FIG. 2A) operatively controls the forming assembly 40, including coordinating movements of the upper die assembly 80 and the lower die assembly 120, for the forming process 270.

Now referring to FIG. 10A, FIG. 10A is an illustration of a pre-forming step 270a of the forming process 270 showing a side view of an exemplary version of a forming assembly 40 of the forming system 10 (see FIGS. 1, 2A), with the upper die assembly 80 and the lower die assembly 120 in an unaligned position 273. As shown in FIG. 10A, the upper die assembly 80 comprises the upper actuator 86, such as the upper pogo 88, coupled to the movable upper crossbeam 56 of the gantry assembly 54 (see FIG. 2A). FIG. 10A shows the upper actuator 86, such as the upper pogo 88, in a retracted position 274. Although one upper actuator 86, such as one upper pogo 88, and one lower actuator 135, such as one lower pogo 136, are shown in FIG. 10A, the forming process 270 uses the plurality of upper actuator assemblies 82 (see FIGS. 2A, 4A, 11A), such as the upper pogo array 84 (see FIGS. 4A, 11A), and the forming process 270 uses the plurality of lower actuator assemblies 132 (see FIGS. 2A, 5A, 11A), such as the lower pogo array 134 (see FIGS. 5A, 11A).

As further shown in FIG. 10A, the upper die assembly 80 comprises the male die 96 positioned between the lateral pressure plates 106. As shown in FIG. 10A, the male die 96 comprises the bottom surface 98a, the top surface 98b coupled to the backing plate 102, and the tapered sides 100, and each lateral pressure plate 106 comprises a first plate portion 192 and a second plate portion 194. Each second plate portion 194 of the lateral pressure plate 106 is coupled, or attached, to the bracket attachment assembly 107. The backing plate 102 for the male die 96 is coupled, or attached, to the bracket attachment assembly 107a, which is attached to the male die support structure 104.

FIG. 10A further shows the cylinder 112, such as the pneumatic cylinder 112a, the housing 113 for the cylinder 112, and the cylinder plate 114 for the cylinder 112. The cylinder 112 is coupled to the top of the cylinder plate 114. As shown in FIG. 10A, the bracket attachment assemblies 107 and the male die support structure 104 are coupled, or attached, to the bottom of the cylinder plate 114. FIG. 10A further shows the end effector main support structure 110 surrounding, or coupled to, the sides of the housing 113.

As shown in FIG. 10A, the lower die assembly 120 comprises the lower actuator 135, such as the lower pogo 136, coupled to the floor support beam 122 of the gantry assembly 54 (see FIG. 2A). FIG. 10A shows the lower actuator 135, such as the lower pogo 136, in a retracted position 275.

As further shown in FIG. 10A, the lower die assembly 120 comprises the lower pallet 144 with the presser apparatus 148, such as the cap presser apparatus 149, positioned between a pair of die blocks 146 spaced apart to define the die cavity 147. As shown in FIG. 10A, the presser apparatus 148, such as the cap presser apparatus 149, is coupled to the presser support 150 and is coupled to the presser drive 152. The presser drive 152 configured to move, and moves, the presser apparatus 148 upwardly and downwardly.

The lower die assembly 120 is coupled to a vacuum system 153 (see FIG. 10A) located in the floor support beam 122. However, the vacuum system 153 may be located in another location or area in, or near, the lower die assembly 120, or away from the lower die assembly 120. The lower pallet 144 is coupled to the vacuum system 153 with one or more vacuum lines 316 (see FIG. 11A). The vacuum system 153 is configured to secure and fix the composite charge 36 (see FIG. 10A), such as the flat composite charge 36a (see FIG. 10A), in position, and in place on, and to, the tops of the die blocks 146 of the lower pallet 144, before and/or during the forming process. The vacuum system 153 may further comprise one or more of, a vacuum apparatus, a vacuum source, a vacuum power supply, and other suitable vacuum system components.

FIG. 10A shows the composite charge 36, such as the flat composite charge 36a, having a top surface 37a and a bottom surface 37b. In the pre-forming step 270a, the vacuum system 153 for the lower pallet 144 is activated to fix, or secure, the composite charge 36 (see FIG. 10A), such as the flat composite charge 36a (see FIG. 10A), to the lower pallet 144, and in particular, the bottom surface 37b of the composite charge 36, such as the flat composite charge 36a, is in contact with the top surfaces of the die blocks 146.

The composite charge 36 (see FIG. 10A), such as the flat composite charge 36*a* (see FIG. 10A), is moved by a pick-and-place device 44 (see FIGS. 1, 8A, 8C) to the lower die assembly 120, and is released by the pick-and-place device 44, in a downward direction 276 (see FIG. 10A), onto the lower pallet 144, such as onto the tops of the die blocks 146 of the lower pallet 144. The pick-and-place device 44 positions the composite charge 36 (see FIG. 10A), such as the flat composite charge 36*a* (see FIG. 10A), on the lower pallet 144.

As shown in FIG. 10A, the lower die assembly 120 further comprises the end effector main support structure 158, two cylinders 160, such as two pneumatic cylinders 160*a*, positioned near the outer sides 216 of the die blocks 146, the support plate 214 for the lower pallet 144, and bracket attachment assemblies 161 coupled to the support plate 214.

Now referring to FIG. 10B, FIG. 10B is an illustration of a pre-forming step 270*b* of the forming process 270 showing a side view of the upper die assembly 80 and the lower die assembly 120 of the forming assembly 40, where the upper die assembly 80 and the lower die assembly 120 are in an aligned position 277. In the pre-forming step 270*b*, the upper die assembly 80 moves in a lateral direction 278 (see FIG. 10B) to align with the lower die assembly 120. Once the upper die assembly 80 is aligned with the lower die assembly 120 in the aligned position 277, as shown in FIG. 10B, the upper actuator 86, such as the upper pogo 88, moves, or deploys downward, in a downward direction 280, toward the lower die assembly 80 and toward the composite charge 36, such as the flat composite charge 36*a*, so that the bottom surface 98*a* of the male die 96 contacts a top surface portion 37*c* of the top surface 37*a* of the composite charge 36, such as the flat composite charge 36*a*. As shown in FIG. 10B, the upper actuator 86, such as the upper pogo 88, is in a deployed position 282. As shown in FIG. 10B, bottom surface portions 37*d* of the bottom surface 37*b* of the composite charge 36, such as the flat composite charge 36*a*, are in contact with the tops of the die blocks 146, and the composite charge 36, such as the flat composite charge 36*a*, is positioned between the upper die assembly 80 and the lower die assembly 120, ready for forming with the forming assembly 40. FIG. 10B shows the lower actuator 135, such as the lower pogo 136, in the retracted position 275.

Now referring to FIG. 10C, FIG. 10C is an illustration of a forming step 270*c* of the forming process 270 showing a side view of the upper die assembly 80 and the lower die assembly 120 of the forming assembly 40, where the upper die assembly 80 and the lower die assembly 120 are in the aligned position 277, and the upper actuator 86, such as the upper pogo 88, and the lower actuator 135, such as the lower pogo 136, coordinate movement to a working position 284. The upper actuator 86, such as the upper pogo 88, and the lower actuator 135, such as the lower pogo 136, move in sync, to define a contour 20 (see FIG. 1), such as a predetermined complex contour 20*b* (see FIG. 1), in the composite charge 36, such as the flat composite charge 36*a*. As shown in FIG. 10C, the upper actuator 86, such as the upper pogo 88, moves in an upward direction 284 to the retracted position 274, and the lower actuator 135, such as the lower pogo 136, moves in sync, in an upward direction 286, to a deployed position 288. The z-axis movement of the upper actuator 86, such as the upper pogo 88, and the lower actuator 135, such as the lower pogo 136, may be controlled with z-axis position information and with servo motor consumption and load cell signal information.

Now referring to FIG. 10D, FIG. 10D is an illustration of a forming step 270*d* of the forming process 270 showing a side view of the upper die assembly 80 and the lower die assembly 120 of the forming assembly 40, where the upper die assembly 80 and the lower die assembly 120 are in the aligned position 277, and the cylinder 112, such as the pneumatic cylinder 112*a*, of the upper die assembly 80, is deployed downwardly to move in a downward direction 290. The deployment of the cylinder 112, such as the pneumatic cylinder 112*a*, downwardly causes the lateral pressure plates 106 to also move downwardly in the downward direction 290. As shown in FIG. 10D, the cylinder 112, such as the pneumatic cylinder 112*a*, is in a deployed position 292. The cylinder 112, such as the pneumatic cylinder 112*a*, moves down to also cause the male die 96 to apply pressure against the top surface portion 37*c* (see FIG. 10D) of the composite charge 36, such as the flat composite charge 36*a*, prior to forming a hat shape 268 (see FIG. 10E) in a central portion 294 (see FIG. 10D) of the composite charge 36, such as the flat composite charge 36*a*. As shown in FIG. 10D, the lateral pressure plates 106 contact top surface portions 37*e* of the top surface 37*a* of the composite charge 36, such as the flat composite charge 36*a*. As shown in FIG. 10D, the die blocks 146 are in a first position 295, and the lower actuator 135, such as the lower pogo 136, is in the deployed position 288.

Now referring to FIG. 10E, FIG. 10E is an illustration of a forming step 270*e* of the forming process 270 showing a side view of the upper die assembly 80 and the lower die assembly 120 of the forming assembly 40, where the upper die assembly 80 and the lower die assembly 120 are in the aligned position 277, and the upper actuator 86, such as the upper pogo 88, is deployed downwardly to move in a downward direction 296, to cause the male die 96 to move downwardly into the die cavity 147, to form a hat shape 268 of a contoured composite structure 16, such as a hat-shaped stringer 26. The hat shape 268 includes a cap 298 (see FIG. 10H), sides 300 (see FIG. 10H), and flanges 302 (see FIG. 10H).

As shown in FIG. 10E, the male die 96 is partially, or substantially inserted, or forced, into the die cavity 147, by the upper actuator 86, such as the upper pogo 88, and forces or pushes the die blocks 146 apart, and causes the die blocks 146 to move laterally outward, in a first lateral direction 302*a* and a second lateral direction 302*b*, respectively, so that the die blocks 146 are in a second position 304.

As shown in FIG. 10E, the presser apparatus 148, such as the cap presser apparatus 149, presses against the bottom of the cap 298 and applies an upward resistive force 154 against the bottom of the cap 298 of the contoured composite structure 16, such as the hat-shaped stringer 26, and against a downward compressive force 156 applied by the upper die assembly 80, and in particular, a downward compressive force 156 applied by the male die 96 and the upper actuator 86, such as the upper pogo 88, of the upper die assembly 80, when the contoured composite structure 16 is formed from the composite charge 36 during the forming process 270.

For the pneumatically controlled presser apparatus 148*a* (see FIG. 6A), the upper actuator 86, such as the upper pogo 88, moves downwardly until it contacts the hard stop element 116 (see FIG. 10E). For the electrically controlled presser apparatus 148*b* (see FIG. 6B), the position of the upper actuator 86, such as the upper pogo 88, may be controlled with an electric presser drive 152*b* (see FIG. 6B), such as a servo motor drive. As shown in FIG. 10E, the lower actuator 135, such as the lower pogo 136, is in the deployed position 288, and the upper actuator 86, such as the upper pogo 88, is in a partially deployed position 308.

The male die 96 (see FIG. 10E) forms the cap 298 (see FIG. 10E), or valley, of the contoured composite structure 16 (see FIG. 10E) within the central portion 294 (see FIG. 10D) of the composite charge 36 (see FIG. 10D). The cap 298 adds rigidity and stiffness to the contoured composite structure 16. The hat shape 268 shown in FIG. 10E is one version of the shape defined, and the shape may be trapezoidal, rounded, squared, or another suitable shape.

Figure 10F:
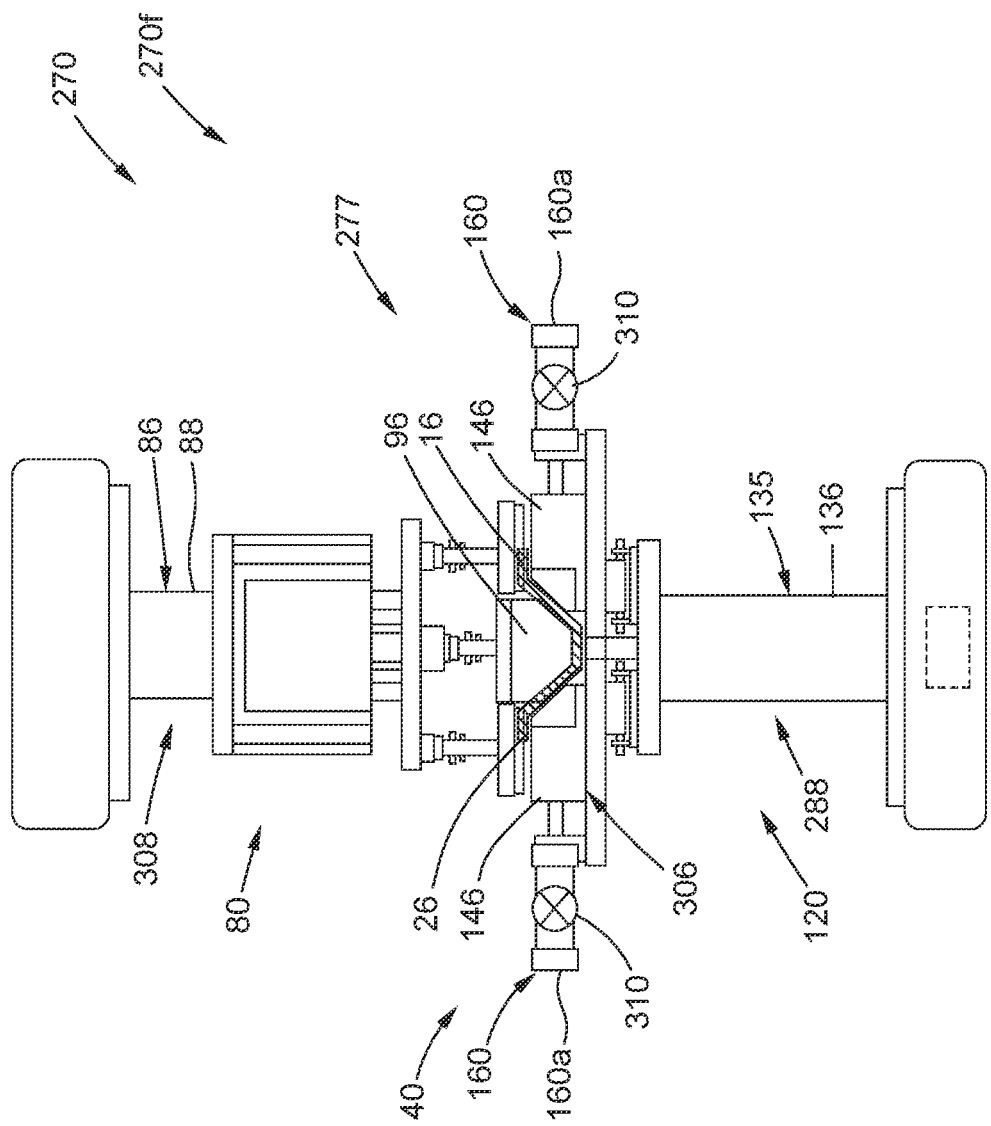
FIG. 10F is an illustration of a post-forming step of the forming process showing a side view of the upper die assembly and the lower die assembly of the forming assembly, where pneumatic cylinders of the lower die assembly are locked in a locked position.

Now referring to FIG. 10F, FIG. 10F is an illustration of a post-forming step 270f of the forming process 270 showing a side view of the upper die assembly 80 and the lower die assembly 120 of the forming assembly 40, where the upper die assembly 80 and the lower die assembly 120 are in the aligned position 277, and the cylinders 160, such as the pneumatic cylinders 160a, of the lower die assembly 120, are locked in a locked position 310, prior to moving the male die 96 and the upper actuator 86, such as the upper pogo 88, upward and away from the contoured composite structure 16, such as a hat-shaped stringer 26. As shown in FIG. 10F, the die blocks 146 are in the second position 306, and the lower actuator 135, such as the lower pogo 136, is in the deployed position 288.

Figure 10G:
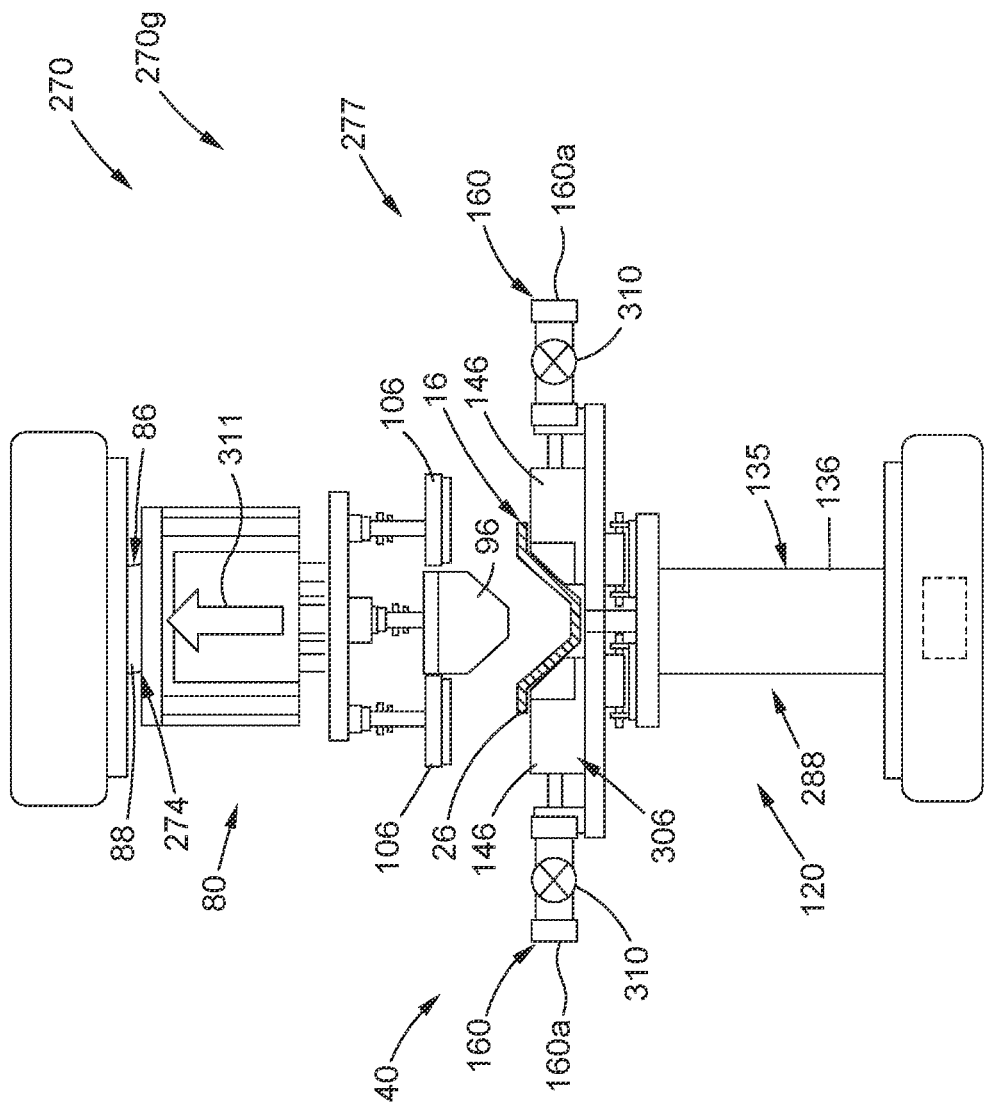
FIG. 10G is an illustration of a post-forming step of the forming process showing a side view of the upper die assembly and the lower die assembly of the forming assembly, where the upper actuator, the male die, and the lateral pressure plates are moved upwardly away from a contoured composite structure formed by the forming process.

Now referring to FIG. 10G, FIG. 10G is an illustration of a post-forming step 270g of the forming process 270 showing a side view of the upper die assembly 80 and the lower die assembly 120 of the forming assembly 40, where the upper die assembly 80 and the lower die assembly 120 are in the aligned position 277, and the upper actuator 86, such as the upper pogo 88, moves upwardly, in an upward direction 311, and causes the male die 96 and the lateral pressure plates 106 to also move upwardly in the upward direction 311, away from the contoured composite structure 16, such as a hat-shaped stringer 26 formed by the forming process 270. As shown in FIG. 10G, the die blocks 146 are in the second position 306, the upper actuator 86, such as the upper pogo 88, is in the retracted position 274, and the lower actuator 135, such as the lower pogo 136, is in the deployed position 288.

Now referring to FIG. 10H, FIG. 10H is an illustration of a post-forming step 270h of the forming process 270 showing a side view of the upper die assembly 80 and the lower die assembly 120 of the forming assembly 40, where the upper die assembly 80 and the lower die assembly 120 are in the unaligned position 273, and the contoured composite structure 16, such as a stringer 24, for example, a hat-shaped stringer 26, formed by the forming process 270, is removed from the lower die assembly 120, and in particular, is removed from the die cavity 147 and away from the tops of the die blocks 146 and away from the presser apparatus 148, such as the cap presser apparatus 149.

As shown in FIG. 10H, the contoured composite structure 16, such as a stringer 24, for example, a hat-shaped stringer 26, has the hat shape 268 and comprises the cap 298, sides 300, and flanges 302. The contoured composite structure 16, such as the stringer 24, for example, the hat-shaped stringer 26, is removed from the lower die assembly 120 with a pick-and-place device 44 (see FIGS. 1, 8B), such as the three-dimensional pick-and-place device 46 (see FIGS. 1, 8B), in an upward direction 312 (see FIG. 10H). The three-dimensional pick-and-place device 46 holds the shape of the contoured composite structure 16, such as the stringer 24, for example, the hat-shaped stringer 26, when the contoured composite structure 16, such as the stringer 24, for example, the hat-shaped stringer 26, is picked up, moved, and released by the three-dimensional pick-and-place device 46.

FIG. 10H shows the upper die assembly 80 moving in a lateral direction 314 away from the lower die assembly 120, so the upper die assembly 80 and the lower die assembly 120 are in the unaligned position 273. The upper actuator 86, such as the upper pogo 88, is in the retracted position 274 (see FIG. 10H).

As shown in FIG. 10H, the die blocks 146 are in the second position 306, the cylinders 160, such as the pneumatic cylinders 160a, are locked in the locked position 310, and the lower actuator 135, such as the lower pogo 136, is in the deployed position 288.

Figure 11A:
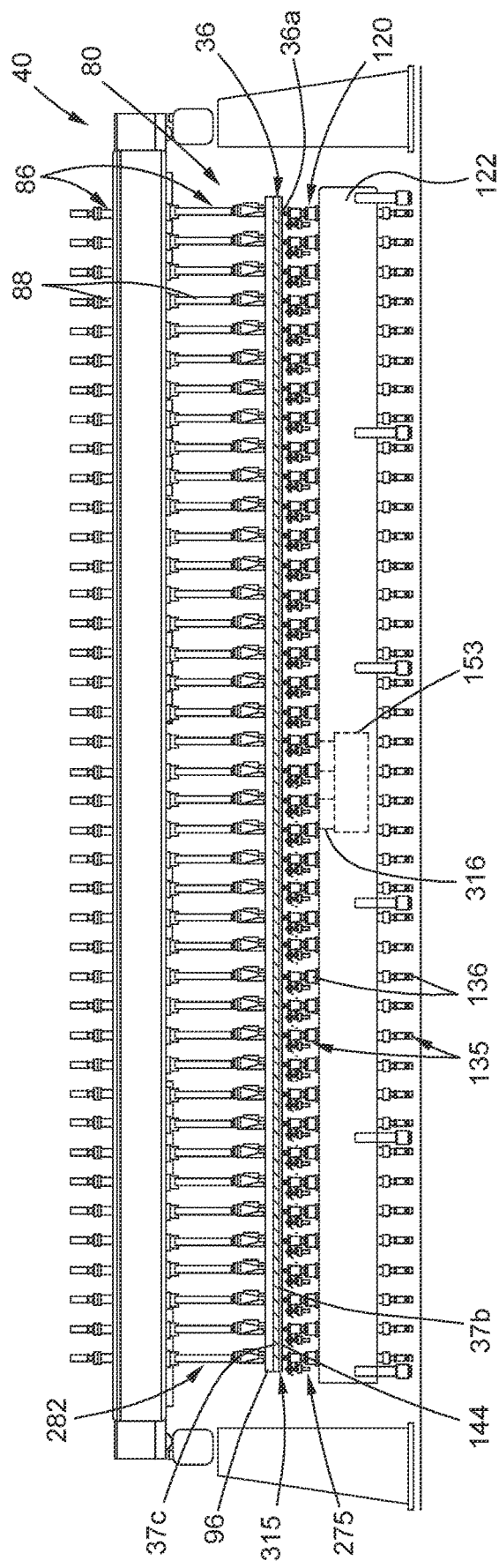
FIG. 11A is an illustration of a front view of a version of a forming assembly of a forming system of the disclosure showing a composite charge positioned between an upper die assembly and a lower die assembly.
Figure 11B:
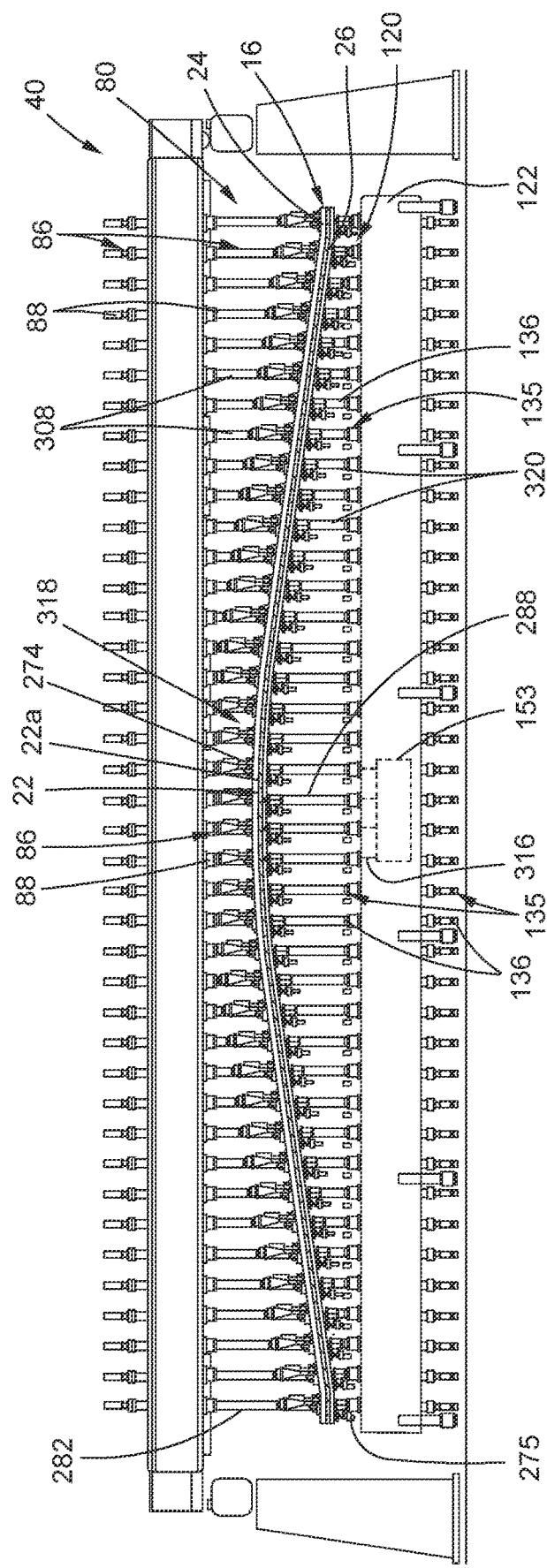
FIG. 11B is an illustration of a front view of the forming assembly of FIG. 11A showing the composite charge formed into a contoured composite structure having a curved configuration.

Now referring to FIGS. 11A-11B, FIG. 11A is an illustration of a front view of a version of a forming assembly 40 of a forming system 10 (see FIG. 1) of the disclosure showing a composite charge 36, such as a flat composite charge 36a, positioned, in a pre-forming position 315 between the upper die assembly 80 and the lower die assembly 120, in the forming process 270 (see FIG. 10B). As shown in FIG. 11A, the upper actuators 86, such as the upper pogos 88, are in the deployed position 282, and the male die 96 is in contact with the top surface portion 37c of the composite charge 36, such as the flat composite charge 36a. As further shown in FIG. 11A, the lower actuators 135, such as the lower pogos 136, are in the retracted position 275, and the lower pallet 144 is in contact with the bottom surface 37b of the composite charge 36, such as the flat composite charge 36a. The lower die assembly 120 is coupled to a vacuum system 153 (see FIG. 11A) located in the floor support beam 122. However, the vacuum system 153 may be located in another location or area in, or near, the lower die assembly 120, or away from the lower die assembly 120. The lower pallet 144 is coupled to the vacuum system 153 with one or more vacuum lines 316. The vacuum system 153 is configured to secure and fix the composite charge 36 (see FIG. 11A), such as the flat composite charge 36a (see FIG. 11A), in position on the lower pallet 144. The vacuum system 153 may further comprise one or more of a vacuum apparatus, a vacuum source, a vacuum power supply, and other suitable vacuum system components.

FIG. 11B is an illustration of a front view of the forming assembly 40 of FIG. 11A showing a contoured composite structure 16, such as a stringer 24, for example, a hat-shaped stringer 26, having a curved configuration 22, such as a complex curved configuration 22a, formed from the composite charge 36 (see FIG. 11A), such as the flat composite charge 36a (see FIG. 11A), during the forming process 270 (see FIG. 10E). As shown in FIG. 11B, the upper actuators 86, such as the upper pogos 88, located in a central area 318 of the upper die assembly 80 are in the retracted position 274, and the lower actuators 135, such as the lower pogos 136, located in the central area 318, that are aligned with the upper actuators 86 in the retracted position 274, are in the deployed position 288. As shown in FIG. 11B, the other upper actuators 86, such as the upper pogos 88, outside of the central area 318, are in graduated positions of deployment, for example, some of the upper actuators 86, such as the upper pogos 88, are in the partially deployed position 308, and some of the upper actuators 86, such as the upper pogos 88, are in the deployed position 282. As shown in FIG. 11B, the other lower actuators 135, such as the lower pogos 136, outside of the central area 318, are in graduated positions of deployment and in positions of retraction, for example, some of the lower actuators 135, such as the lower pogos 136, are in the partially deployed position 308, and some of the lower actuators 135, such as the lower pogos 136, are in the retracted position 275.

Now referring to FIGS. 12A-12B, FIG. 12A is schematic illustration of a side view of a pick-and-place device 44, such as the three-dimensional pick-and-place device 46, having an end effector 322 and a compactor 324. The pick-and-place device 44 lowers the compactor 324 into a trough 326 of the forming assembly 40, and uses a vacuum system 243b (see FIG. 8B) to pick up the contoured composite structure 16, such as the stringer 24, out of the trough 326. FIG. 12A shows the contoured composite structure 16, such as the stringer 24, being lifted out of the trough 326 in an upward direction 328, by the pick-and-place device 44, such as the three-dimensional pick-and-place device 46.

FIG. 12B is a schematic illustration of a side view of the pick-and-place device 44, such as the three-dimensional pick-and-place device 46, of FIG. 12A, having the end effector 322 and the compactor 324, and moving the contoured composite structure 16, such as the stringer 24, into a trough 330 of the tray assembly 50, such as the kitting tray 245. The contoured composite structure 16, such as the stringer 24, is moved from the trough 326 (see FIG. 12A) of the forming assembly 40 (see FIG. 12A) to the trough 330 of the kitting tray 245, and may be guided into the trough 330 of the kitting tray 246. The pick-and-place device 44, such as the three-dimensional pick-and-place device 46, releases the contoured composite structure 16, such as the stringer 24, into the trough 330 of the kitting tray 246. FIG. 12B shows the contoured composite structure 16, such as the stringer 24, being placed into the trough 330 of the kitting tray 245 in a downward direction 332, by the pick-and-place device 44, such as the three-dimensional pick-and-place device 46. The kitting tray 245 is used to hold the contoured composite structure 16, such as the stringer 24, and allows it to be prepared for later placement into a mandrel or a tool. The contoured composite structure 16, such as the stringer 24, and the compactor 324 may then be bagged, such as vacuum bagged, for initial compaction, at another processing station 52 (see FIG. 1).

Figure 13:
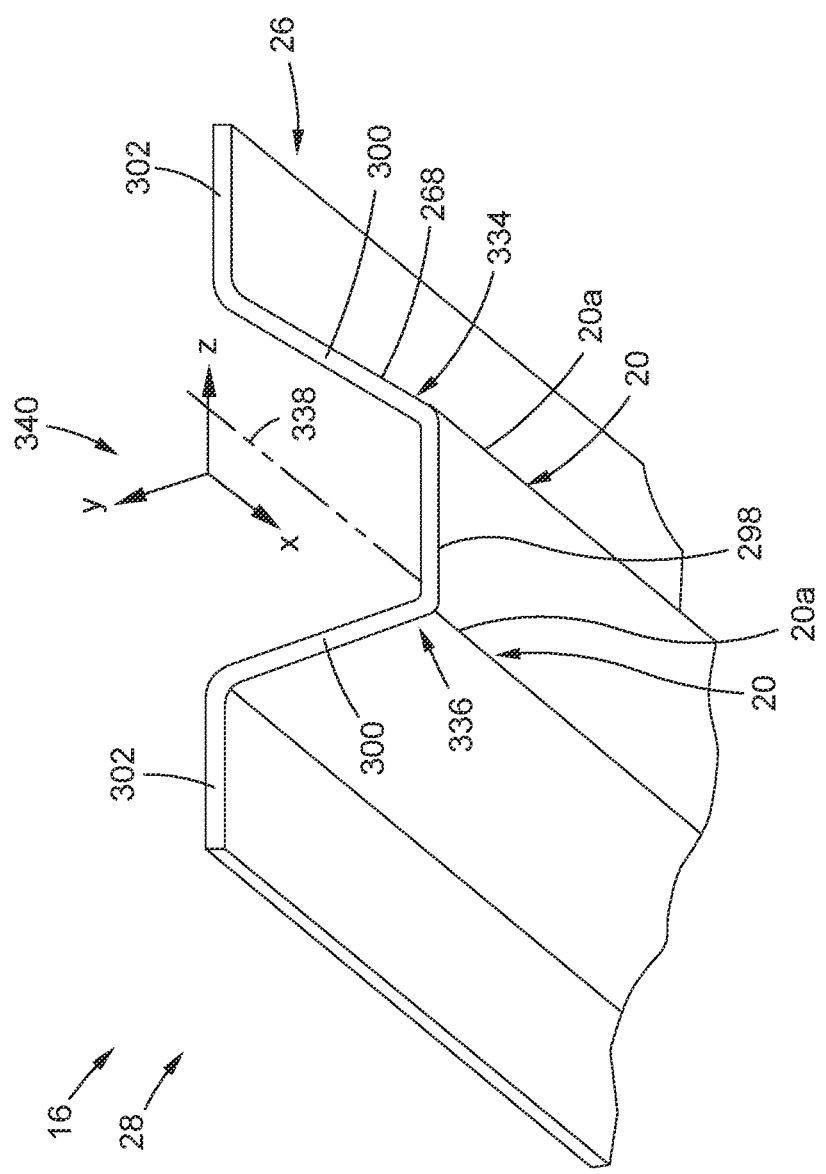
FIG. 13 is an illustration of a perspective front view of a hat-shaped stringer that may be formed by exemplary versions of a forming assembly of a forming system of the disclosure.

Now referring to FIG. 13, FIG. 13 is an illustration of a perspective front view of a contoured composite structure 16, such as an aircraft stringer 28, for example, a hat-shaped stringer 26, that may be formed with exemplary versions of the forming assembly 40 (see FIGS. 1, 2A, 7A, 8A) of the forming system 10 (see FIG. 1), of the disclosure. The hat-shaped stringer 26 may be used, for example and without limitation, in the aircraft industry to stiffen or support a variety of structures, such as the fuselage 352 (see FIG. 14), the wings 354 (see FIG. 14), the vertical stabilizers 360 (see FIG. 14), the horizontal stabilizers 362 (see FIG. 14), or other aircraft structures. FIG. 13 shows the hat-shaped stringer 26 with a cross-sectional profile 334 having a hat shape 268. The hat-shaped stringer 26 may also have another suitable cross-sectional profile, such as squared, rounded, trapezoidal, omega-shaped, or another geometric or angled shape.

As shown in FIG. 13, a contoured hat section 336 includes the cap 298, sides 300, also referred to as webs, and flanges 302, such as outwardly extending flanges. As shown in FIG. 13, the hat-shaped stringer 26 has contours 20, such as complex contours 20a, or out-of-plane contours or curvatures, along its longitudinal axis 338, or length. FIG. 13 further shows the orthogonal x, y, z coordinate system 340. In one version, the cap 298 of the hat-shaped stringer 26 preferably has a contour radius in a range of 500 (five hundred) inches to 1000 (one thousand) inches, and more preferably, has a contour radius in a range of 500 (five hundred) inches to 750 (seven hundred fifty) inches. However, the cap 298 may have another suitable contour radius.

Figure 14:
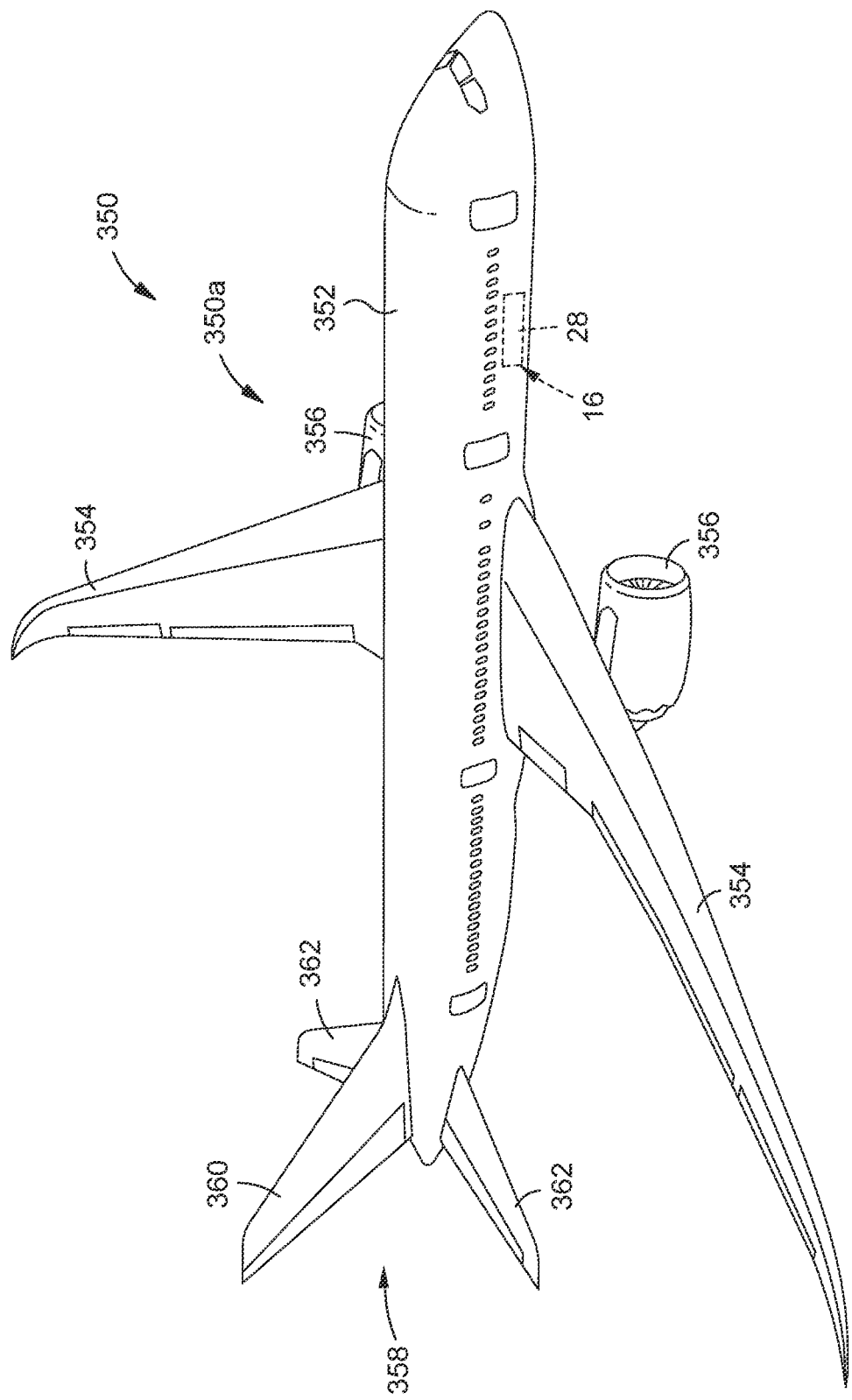
FIG. 14 is an illustration of a perspective view of an aircraft incorporating an aircraft stringer made with an exemplary version of a forming assembly of a forming system and method of the disclosure.

Now referring to FIG. 14, FIG. 14 is an illustration of a perspective view of an air vehicle 350, such as an aircraft 350a, incorporating a contoured composite structure 16, such as in the form of an aircraft stringer 28, made with an exemplary version of the forming assembly 40 of the forming system 10 (see FIGS. 1A, 2A, 7A, 8C), and a method 250 (see FIG. 9), of the disclosure. As shown in FIG. 14, the air vehicle 350, such as the aircraft 350a, includes a fuselage 352, wings 354 coupled to the fuselage 352, engines 356 coupled to the wings 354, and an empennage 358. As shown in FIG. 14, the empennage 358 comprises a vertical stabilizer 360 and horizontal stabilizers 362.

The contoured composite structure 16 (see FIGS. 1, 13, 14), such as the aircraft stringer 28 (see FIGS. 1, 13, 14), can be used individually, or in combination with other structures and devices. As shown in FIG. 14, in one version, after the contoured composite structure 16 comprising the aircraft stringer 28 has been formed, it can be used in a section of the fuselage 352 of the aircraft 350a. For example, before or after each contoured composite structure 16 comprising the aircraft stringer 28 is cured, it can be loaded onto a mandrel of a machine for making a section of fuselage 352. Fiber-reinforced resin can be disposed over the contoured composite structure 16 comprising the aircraft stringer 28, and the fiber-reinforced resin can then be cured (or co-cured with the another structure) to produce a finished assembly for the fuselage 352 of the aircraft 350a. After the contoured composite structure 16, such as in the form of an aircraft stringer 28, has been formed, it may also be used in sections of the wings 354, the vertical stabilizer 360, the horizontal stabilizers 362, or other suitable parts of the aircraft 350a. The contoured composite structure 16 can be used in a variety of industries and applications including, but not limited to, in connection with the manufacture of aircraft 350a and other aerospace structures and vehicles, including spacecraft, and rotorcraft, as well as vehicles such as watercraft, trains, or other suitable vehicles or structures.

In another version of the disclosure, there is provided the forming system 10 (see FIG. 1) for forming an aircraft stringer 28 (see FIGS. 1, 14) for an aircraft 350a (see FIG. 14). The aircraft stringer 28 has a complex curved configuration 22a (see FIGS. 1, 13). The forming system 10 (see FIG. 1) comprises the receiving station 32 (see FIGS. 1, 8A) having the receiving assembly 34 (see FIGS. 1, 8A) designed to receive a composite charge 36 (see FIG. 1), such as a flat composite charge 36a (see FIGS. 1, 8A, 11A), to be formed into the aircraft stringer 28 having the complex curved configuration 22a.

The forming system 10 further comprises the forming station 12 (see FIGS. 1, 2A, 8A) having the forming assembly 40 (see FIGS. 1, 2A, 8A). The forming assembly 40, as discussed above, comprises the gantry assembly 54 (see FIGS. 2A, 8A) comprising the movable upper crossbeam 56 (see FIGS. 2A, 8A) movably coupled to the pair of side beams 58 (see FIGS. 2A, 8A) mounted on the plurality of side support members 60 (see FIGS. 2A, 8A). Each side beam 58 having one or more tracks 68 (see FIGS. 2A, 8A) extending along the length 70 (see FIG. 2A) of each side beam 58. The movable upper crossbeam 56 is movable along the one or more tracks 68 of each side beam 58.

The forming assembly 40 further comprises the upper die assembly 80 (see FIGS. 2A, 4A, 8A) movably coupled to the movable upper crossbeam 56. The upper die assembly 80 comprises the plurality of upper actuator assemblies 82 (see FIGS. 2A, 4A) coupled to the pair of lateral pressure plates 106 (see FIG. 4A), and comprises the male die 96 (see FIG. 4A) disposed between the pair of lateral pressure plates 106.

The forming assembly 40 further comprises the lower die assembly 120 (see FIGS. 2A, 5A, 8A) coupled to the floor support beam 122 (see FIG. 2A) positioned between the plurality of side support members 60 of the gantry assembly 54. The upper die assembly 80 is separate from, and independently movable with respect to, the lower die assembly 120. The lower die assembly 120 comprising the plurality of lower actuator assemblies 132 (see FIG. 5A) designed to be vertically aligned with the plurality of upper actuator assemblies 82 during forming of the composite charge 36 into the aircraft stringer 28. The plurality of lower actuator assemblies 132 are coupled to the lower pallet 144 (see FIGS. 5A-5C) having the presser apparatus 148 (see FIGS. 5A-5C) disposed between pairs of die blocks 146 (see FIGS. 5A-5C). The presser apparatus 148 comprises a pneumatically controlled presser apparatus 148a (see FIG. 6A), an electrically controlled presser apparatus 148b (see FIG. 6B), or another suitable type of presser apparatus.

The plurality of upper actuator assemblies 82 comprise an upper pogo array 84 (see FIG. 4A), and the plurality of lower actuator assemblies 132 comprise the lower pogo array 134 (see FIG. 5A). The upper pogo array 84 and the lower pogo array 134 are designed to move in sync, to define a predetermined complex contour 20b (see FIG. 1) of the aircraft stringer 28, as the composite charge 36 is formed into the aircraft stringer 28. The upper pogo array 84 comprises a plurality of upper pogos 88 (see FIG. 4A). Each upper pogo 88 may have one or more upper seesaw assemblies 108 (see FIG. 4E). The lower pogo array 134 comprises a plurality of lower pogos 136 (see FIG. 5A). Each lower pogo 136 may have one or more lower seesaw assemblies 162 (see FIG. 5E).

The forming assembly 40 further comprises one or more pick-and-place devices 44 (see FIGS. 1, 8C) movably coupled to the pair of side beams 58 of the gantry assembly 54, via one or more pick-and-place movable beams 244 (see FIG. 8C). The one or more pick-and-place devices 44 are designed to pick up, move, and release the composite charge 36, and the aircraft stringer 28 formed from the composite charge 36.

The one or more pick-and-place devices 44 comprise one or more of, the two-dimensional pick-and-place device 45 (see FIGS. 1, 8A) designed to move the composite charge 36 from the receiving station 32 to the forming station 12, and the three-dimensional pick-and-place device 46 (see FIGS. 1, 8B) designed to move the composite charge 36 from the receiving station 32 to the forming station 12, and designed to move the aircraft stringer 28 formed by the forming assembly 40, from the forming station 12 to the tray station 48.

The forming system 10 further comprises the tray station 48 (see FIGS. 1, 8B) having the tray assembly 50 (see FIGS. 1, 8B), such as in the form of the kitting tray 245 (see FIG. 8B) designed to receive the aircraft stringer 28 from the forming station 12, via one of the one or more pick-and-place devices 44.

Figure 15:
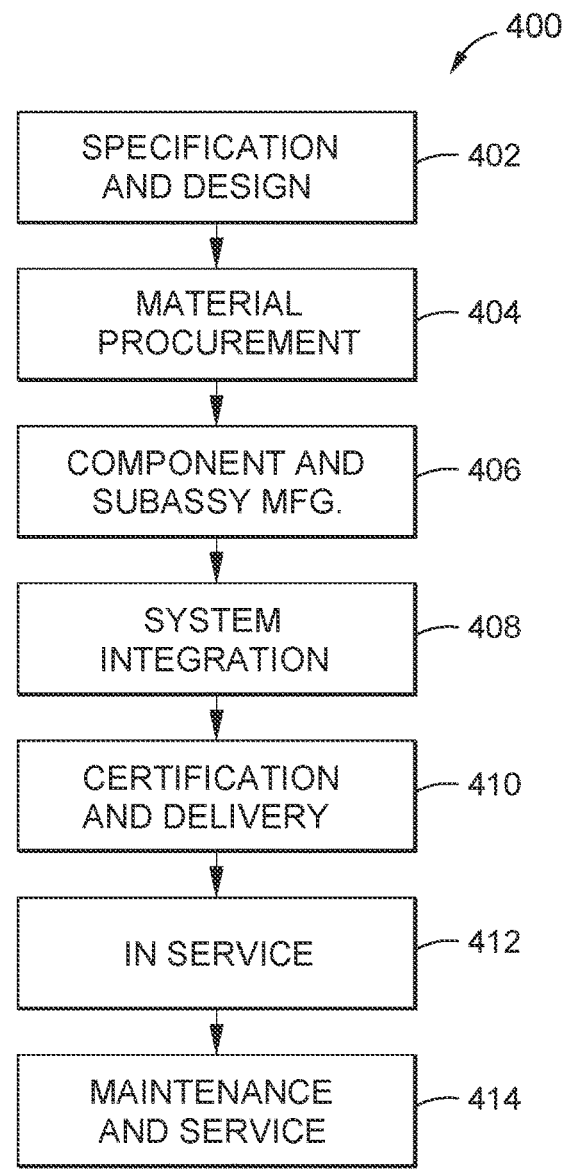
FIG. 15 is an illustration of a flow diagram of an exemplary aircraft manufacturing and service method.
Figure 16:
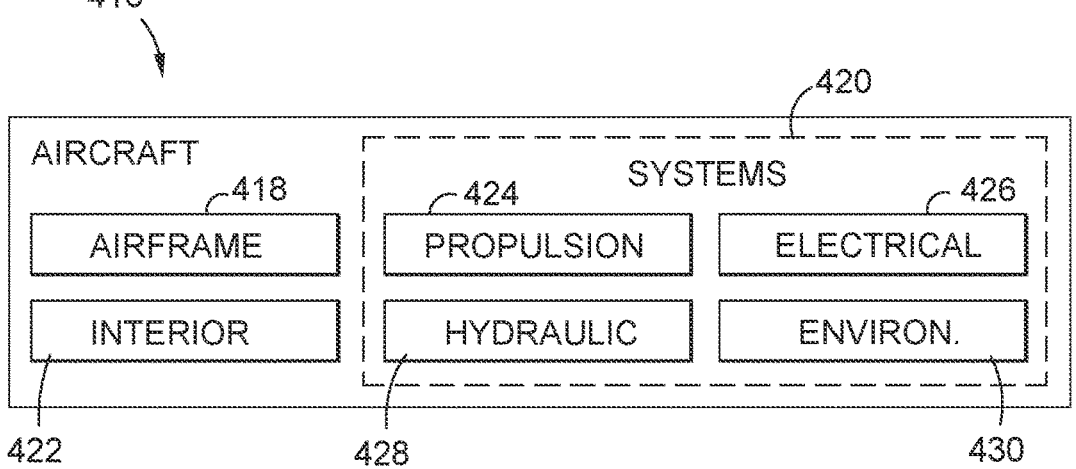
FIG. 16 is an illustration of an exemplary block diagram of an aircraft.

Now referring to FIGS. 15 and 16, FIG. 15 is an illustration of a flow diagram of an exemplary aircraft manufacturing and service method 400, and FIG. 16 is an illustration of an exemplary block diagram of an aircraft 416. Referring to FIGS. 15 and 16, versions of the disclosure may be described in the context of the aircraft manufacturing and service method 400 as shown in FIG. 15, and the aircraft 416 as shown in FIG. 16.

During pre-production, exemplary aircraft manufacturing and service method 400 may include specification and design 402 of the aircraft 416 and material procurement 404. During manufacturing, component and subassembly manufacturing 406 and system integration 408 of the aircraft 416 takes place. Thereafter, the aircraft 416 may go through certification and delivery 410 in order to be placed in service 412. While in service 412 by a customer, the aircraft 416 may be scheduled for routine maintenance and service 414 (which may also include modification, reconfiguration, refurbishment, and other suitable services).

Each of the processes of the aircraft manufacturing and service method 400 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 16, the aircraft 416 produced by the exemplary aircraft manufacturing and service method 400 may include an airframe 418 with a plurality of systems 420 and an interior 422. Examples of the plurality of systems 420 may include one or more of a propulsion system 424, an electrical system 426, a hydraulic system 428, and an environmental system 430. Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 400. For example, components or subassemblies corresponding to component and subassembly manufacturing 406 may be fabricated or manufactured in a manner similar to components or subassemblies produced while the aircraft 416 is in service 412. Also, one or more apparatus embodiments, method embodiments, or a combination thereof, may be utilized during component and subassembly manufacturing 406 and system integration 408, for example, by substantially expediting assembly of or reducing the cost of the aircraft 416. Similarly, one or more of apparatus embodiments, method embodiments, or a combination thereof, may be utilized while the aircraft 416 is in service 412, for example and without limitation, to maintenance and service 414.

Disclosed versions of the forming system 10 (see FIGS. 1, 2A, 7A, 8A), with the forming assembly 40 (see FIGS. 1, 2A, 7A, 8A), and the method 250 (see FIG. 9) provide for an automated forming system, apparatus, and method and a cold forming process that uses a single forming cell 13 (see FIGS. 2A, 8A), or manufacturing cell, with less complex equipment, and that is more efficient, repeatable, and flexible, as compared to known three-dimensional forming techniques and systems. Disclosed versions of the forming system 10 (see FIGS. 1, 2A, 7A, 8A), with the forming assembly 40 (see FIGS. 1, 2A, 7A, 8A), and the method 250 (see FIG. 9) are capable of shaping and forming composite charges 36 (see FIG. 1), such as flat composite charges 36a (see FIG. 1), for example composite laminate charges 36b (see FIG. 1) into three-dimensional parts, such as contoured composite structures 16 (see FIGS. 1, 13), for example, elongated laminated contoured composite parts 18 (see FIG. 1), having curved configurations 22 (see FIG. 1), such as complex curved configurations 22a (see FIG. 1), for use in a variety of industries and applications including, but not limited to, in connection with the manufacture of aircraft 350a (see FIG. 14) and other aerospace structures and vehicles, including spacecraft, and rotorcraft, as well as vehicles such as watercraft, trains, or other suitable vehicles or structures.

In addition, disclosed versions of the forming system 10 (see FIGS. 1, 2A, 7A, 8A), with the forming assembly 40 (see FIGS. 1, 2A, 7A, 8A), and the method 250 (see FIG. 9) provide for a forming assembly 40 (see FIGS. 2A, 7A, 8A) having an upper die assembly 80 (see FIGS. 2A, 7A, 8A) that is separate from, and independently movable, with respect to, the lower die assembly 120 (see FIGS. 2A, 7A, 8A). Because the upper die assembly 80 and the lower die assembly 120 are not joined together, this allows for increased flexibility of the forming system 10 for more complicated parts with complex contours 20a (see FIG. 1). Moreover, disclosed versions of the forming assembly 40, where the upper die assembly 80 and the lower die assembly 120 are separate have a smaller footprint and take up less space in the forming cell 13, as compared to known forming machines having an upper die apparatus attached to a lower die apparatus with clamps, such as C-clamps, that take up a greater amount of space in a manufacturing facility. The forming assembly 40 disclosed herein has an optimized footprint.

Further, disclosed versions of the forming assembly 40, where the upper die assembly 80 and the lower die assembly 120 are separate, allow the contoured composite structure 16 formed with the forming assembly 40 in the forming system 10 to exit from the back of the forming station 12, as compared to known forming machines having an upper die apparatus attached to a lower die apparatus with clamps, such as C-clamps, that only allow exit of the formed structures, such as formed stringers, from the front of the forming machine, and not from the back of the forming machine. Since the forming system 10 allows the formed composite structures 14a (see FIG. 1), such as the contoured composite structures 16, to exit from the back of the forming assembly 40, the forming system 10 allows for a continuous process flow that is faster and more repeatable. Further, because the forming system 10 allows the formed composite structures 14a (see FIG. 1), such as the contoured composite structures 16, to also exit from the front of the forming assembly 40, the forming system 10 allows for greater flexibility.

Further, the forming assembly 40 includes a gantry assembly 54 (see FIG. 2A) having side beams 58 (see FIG. 2A) with one or more tracks 68 (see FIG. 2A), to allow a movable upper crossbeam 56 (see FIG. 2A) to move the upper die assembly 80 within the forming cell 13, and to allow one or more pick-and-place movable beams 244 (see FIG. 8C) to move within the forming cell 13.

In addition, disclosed versions of the forming system 10 (see FIGS. 1, 2A, 7A, 8A), with the forming assembly 40 (see FIGS. 1, 2A, 7A, 8A), and the method 250 (see FIG. 9) provide a forming system 10 that is a hybrid system that is capable of performing both three-dimensional forming of contoured composite structures 16 having complex contours 20a, and transporting and transferring of composite charges 36, as well as formed contoured composite structures 16, in a continuous, serial, and pass-through manner using a pick-and-place assembly 42 (see FIGS. 1, 8C). The pick-and-place assembly 42 comprises the two-dimensional pick-and-place device 45 (see FIGS. 1, 8C) and the three-dimensional pick-and-place device 46 (see FIGS. 1, 8C) that transport and transfer the composite charge 36, such as the flat composite charge 36a, to the receiving station 32 (see FIG. 1), and from the receiving station 32 to the forming station 12 (see FIG. 1), and comprises the three-dimensional pick-and-place device 46 that transports and transfers the contoured composite structure 16 formed from the composite charge 36, from the forming station 12 to the tray station 48 (see FIG. 1), and then from the tray station 48 to a processing station 52, outside of the forming cell 13 (see FIG. 2A).

Moreover, disclosed versions of the forming system 10 (see FIGS. 1, 2A, 7A, 8A), with the forming assembly 40 (see FIGS. 1, 2A, 7A, 8A), and the method 250 (see FIG. 9) provide for the use of one or more upper seesaw assemblies 108 in the upper die assembly 80 and the use of one or more lower seesaw assemblies 162 in the lower die assembly 120, which accommodate and adjust to different levels of thicknesses along the length of the composite charge 36 and to different levels of thicknesses along the length 21 (see FIG. 1) of the contoured composite structure 16 formed from the composite charge 36. The upper seesaw assemblies 108 and the lower seesaw assemblies 162 are further designed to reduce a polygonal effect, to obtain contours 20 (see FIG. 1) in the contoured composite structure 16 that may be smoother.

Further, disclosed versions of the forming system 10 (see FIGS. 1, 2A, 7A, 8A), with the forming assembly 40 (see FIGS. 1, 2A, 7A, 8A), and the method 250 (see FIG. 9) provide for a male die table 230 having multiple male dies 96, for example, five male dies 96, that can accommodate forming stringers 24 of different shapes and configurations, as the male dies 96 define the shape, for example, the depth, webs, radii, of the hat shape 268 (see FIG. 13) of hat-shaped stringers 26 (see FIG. 13).

Many modifications and other versions of the disclosure will come to mind to one skilled in the art to which this disclosure pertains having the benefit of the teachings presented in the foregoing descriptions and the associated drawings. The versions described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

What is claimed is:

1. A forming system for forming a contoured composite structure having a complex curved configuration, the forming system comprising:
    a receiving station having a receiving assembly designed to receive a composite charge to be formed;
    a forming station having a forming assembly comprising:
        a gantry assembly comprising a movable upper crossbeam movably coupled to a pair of side beams mounted on a plurality of side support members;
        an upper die assembly movably coupled to the gantry assembly, the upper die assembly comprising a plurality of upper actuator assemblies coupled to a pair of lateral pressure plates, and a male die disposed between the pair of lateral pressure plates;
        a lower die assembly coupled to a floor support beam positioned between the pair of side beams of the gantry assembly, the upper die assembly separate from, and independently movable with respect to, the lower die assembly, and the lower die assembly comprising a plurality of lower actuator assemblies designed to be vertically aligned with the plurality of upper actuator assemblies during forming of the composite charge into the contoured composite structure, and the plurality of lower actuator assemblies coupled to a lower pallet having a presser apparatus disposed between pairs of die blocks; and one or more pick-and-place devices movably coupled to the gantry assembly, the one or more pick-and-place devices designed to move the composite charge, and the contoured composite structure formed from the composite charge; and a tray station having a tray assembly designed to receive the contoured composite structure from the forming station.

2. The forming system of claim 1, wherein the contoured composite structure comprises one of, a stringer, a hat-shaped stringer, an aircraft stringer, and a spar.

3. The forming system of claim 1, wherein each side beam of the pair of side beams has one or more tracks extending along a length of each side beam, and the movable upper crossbeam is movable along the one or more tracks of each side beam.

4. The forming system of claim 3, wherein the one or more pick-and-place devices are movably coupled to the gantry assembly, via one or more pick-and-place movable beams, movable along the one or more tracks of each side beam.

5. The forming system of claim 1, wherein the plurality of upper actuator assemblies comprise an upper pogo array, and the plurality of lower actuator assemblies comprise a lower pogo array, and further wherein the upper pogo array and the lower pogo array are designed to move in sync, to define a predetermined complex contour of the contoured composite structure, as the composite charge is formed into the contoured composite structure.

6. The forming system of claim 5, wherein the upper pogo array comprises a plurality of upper pogos, each having one or more upper seesaw assemblies, and the lower pogo array comprises a plurality of lower pogos, each having one or more lower seesaw assemblies.

7. The forming system of claim 1, wherein the presser apparatus comprises one of, a pneumatically controlled presser apparatus, and an electrically controlled presser apparatus.

8. The forming system of claim 1, wherein the one or more pick-and-place devices comprises one or more of, a two-dimensional pick-and-place device designed to move the composite charge from the receiving station to the forming station, and a three-dimensional pick-and-place device designed to move the composite charge from the receiving station to the forming station, and designed to move the contoured composite structure, formed by the forming assembly, from the forming station to the tray station.

9. The forming system of claim 1, wherein the tray assembly comprises a kitting tray designed to move the contoured composite structure from the forming station to one or more processing stations for further processing of the contoured composite structure.

10. A method for forming a contoured composite structure having a hat shape, the method comprising:
providing a forming system comprising:
a receiving station having a receiving assembly designed to receive a composite charge to be formed;
a forming station having a forming assembly comprising:
a gantry assembly comprising a movable upper crossbeam movably coupled to a pair of side beams mounted on a plurality of side support members;
an upper die assembly movably coupled to the gantry assembly, the upper die assembly comprising a plurality of upper actuator assemblies coupled to a pair of lateral pressure plates, and a male die disposed between the pair of lateral pressure plates;
a lower die assembly coupled to a floor support beam positioned between the pair of side beams of the gantry assembly, the upper die assembly separate from, and independently movable with respect to, the lower die assembly, and the lower die assembly comprising a plurality of lower actuator assemblies designed to be vertically aligned with the plurality of upper actuator assemblies during forming of the composite charge into the contoured composite structure, and the plurality of lower actuator assemblies coupled to a lower pallet having a presser apparatus disposed between pairs of die blocks; and
one or more pick-and-place devices movably coupled to the gantry assembly, the one or more pick-and-place devices designed to move the composite charge, and the contoured composite structure formed from the composite charge; and
a tray station having a tray assembly designed to receive the contoured composite structure from the forming station;
delivering, to the receiving assembly at the receiving station, the composite charge to be formed into the contoured composite structure;
using one of the one or more pick-and-place devices to remove the composite charge from the receiving assembly, and to move the composite charge onto the lower die assembly of the forming assembly;
securing the composite charge between the lower die assembly and the upper die assembly;
using the forming assembly to coordinate the plurality of upper actuator assemblies and the plurality of lower actuator assemblies, to define a predetermined complex contour in the composite charge;
using the forming assembly to press a central portion of the composite charge, to form the contoured composite structure having the hat shape; and
using one of the one or more pick-and-place devices to remove the contoured composite structure from the lower die assembly of the forming assembly, and to move the contoured composite structure onto the tray assembly at the tray station.

11. The method of claim 10, further comprising moving the contoured composite structure on the tray assembly to a processing station, for processing of the contoured composite structure.

12. The method of claim 10, wherein using one of the one or more pick-and-place devices to remove the composite charge from the receiving assembly, and to move the composite charge to the lower die assembly, further comprises using one of the one or more pick-and-place devices comprising one of a two-dimensional pick-and-place device movably coupled to the gantry assembly, via a two-dimensional pick-and-place movable beam, and a three-dimensional pick-and-place device movably coupled to the gantry assembly, via a three-dimensional pick-and-place movable beam.

13. The method of claim 10, wherein using the forming assembly to coordinate the plurality of upper actuator assemblies and the plurality of lower actuator assemblies, further comprises using the forming assembly to coordinate the plurality of upper actuator assemblies comprising an upper pogo array, and the plurality of lower actuator assemblies comprising a lower pogo array, the upper pogo array comprising a plurality of upper pogos, each having one or more upper seesaw assemblies, and the lower pogo array comprising a plurality of lower pogos, each having one or more lower seesaw assemblies.

14. The method of claim 10, wherein using the forming assembly to press the central portion of the composite charge, to form the contoured composite structure, further comprises using the forming assembly to press the central portion of the composite charge, to form the contoured composite structure comprising one of a stringer, a hat-shaped stringer, an aircraft stringer, and a spar.

15. The method of claim 10, wherein using one of the one or more pick-and-place devices to remove the contoured composite structure from the lower die assembly, and to move the contoured composite structure to the tray assembly, further comprises using one of the one or more pick-and-place devices comprising a three-dimensional pick-and-place device movably coupled to the gantry assembly, via a three-dimensional pick-and-place movable beam, the three-dimensional pick-and-place device designed to hold the contoured composite structure and to maintain the hat shape of the contoured composite structure.

16. A forming system for forming an aircraft stringer for an aircraft, the aircraft stringer having a complex curved configuration, the forming system comprising:
a receiving station having a receiving assembly designed to receive a composite charge to be formed into the aircraft stringer having the complex curved configuration;
a forming station having a forming assembly comprising:
a gantry assembly comprising a movable upper crossbeam movably coupled to a pair of side beams mounted on a plurality of side support members, each side beam having one or more tracks extending along a length of each side beam, wherein the movable upper crossbeam is movable along the one or more tracks of each side beam;
an upper die assembly movably coupled to the movable upper crossbeam, the upper die assembly comprising a plurality of upper actuator assemblies coupled to a pair of lateral pressure plates, and a male die disposed between the pair of lateral pressure plates;
a lower die assembly coupled to a floor support beam positioned between the pair of side beams of the gantry assembly, the upper die assembly separate from, and independently movable with respect to, the lower die assembly, and the lower die assembly comprising a plurality of lower actuator assemblies designed to be vertically aligned with the plurality of upper actuator assemblies during forming of the composite charge into the aircraft stringer, and the plurality of lower actuator assemblies coupled to a lower pallet having a presser apparatus disposed between pairs of die blocks; and
one or more pick-and-place devices movably coupled to the pair of side support beams of the gantry assembly, via one or more pick-and-place movable beams, the one or more pick-and-place devices designed to move the composite charge, and the aircraft stringer formed from the composite charge; and
a tray station having a kitting tray designed to receive the aircraft stringer from the forming station, via one of the one or more pick-and-place devices.

17. The forming system of claim 16, wherein the plurality of upper actuator assemblies comprise an upper pogo array, and the plurality of lower actuator assemblies comprise a lower pogo array, and further wherein the upper pogo array and the lower pogo array are designed to move in sync, to define a predetermined complex contour of the aircraft stringer, as the composite charge is formed into the aircraft stringer.

18. The forming system of claim 17, wherein the upper pogo array comprises a plurality of upper pogos, each having one or more upper seesaw assemblies, and the lower pogo array comprises a plurality of lower pogos, each having one or more lower seesaw assemblies.

19. The forming system of claim 16, wherein the one or more pick-and-place devices comprise one or more of a two-dimensional pick-and-place device designed to move the composite charge from the receiving station to the forming station, and a three-dimensional pick-and-place device designed to move the composite charge from the receiving station to the forming station, and designed to move the aircraft stringer formed by the forming assembly, from the forming station to the tray station.

20. The forming system of claim 16, wherein the presser apparatus comprises one of a pneumatically controlled presser apparatus, and an electrically controlled presser apparatus.

* * * * *